US012053978B2

(12) United States Patent
Shmaiser et al.

(10) Patent No.: US 12,053,978 B2
(45) Date of Patent: Aug. 6, 2024

(54) DIGITAL PRINTING SYSTEM

(71) Applicant: LANDA CORPORATION LTD., Rehovot (IL)

(72) Inventors: Aharon Shmaiser, Rishon LeZion (IL); Benzion Landa, Nes Ziona (IL); Sagi Moskovich, Petach Tikva (IL); Nir Zarmi, Be+3 erotayim (IL); Yehuda Solomon, Rishon LeZion (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 18/107,874

(22) Filed: Feb. 9, 2023

(65) Prior Publication Data

US 2023/0321972 A1 Oct. 12, 2023

Related U.S. Application Data

(63) Continuation of application No. 17/382,285, filed on Jul. 21, 2021, now Pat. No. 11,607,878, which is a (Continued)

(30) Foreign Application Priority Data

Sep. 11, 2013 (GB) .................................. 1316203.7
Jan. 15, 2015 (GB) .................................. 1500683.6

(51) Int. Cl.

*B41J 2/005* (2006.01)
*B41J 2/01* (2006.01)
*B41J 3/60* (2006.01)

(52) U.S. Cl.

CPC ............ *B41J 2/0057* (2013.01); *B41J 2/005* (2013.01); *B41J 3/60* (2013.01); *B41J 2002/012* (2013.01)

(58) Field of Classification Search

CPC ... B41J 2/0057; B41J 2/005; B41J 3/60; B41J 2002/012; B41J 2/01

See application file for complete search history.

(56) References Cited

U.S. PATENT DOCUMENTS 3,935,055 A 1/1976 Carmien
4,204,471 A 5/1980 Becker
(Continued)

FOREIGN PATENT DOCUMENTS

CN 1703326 A 11/2005
CN 1961015 A 5/2007
(Continued)

OTHER PUBLICATIONS

CN101096455A Machine Translation (EPO, PlatPat and Google) published on Jan. 2, 2008 Fujifilm Corp.
(Continued)

*Primary Examiner* — Lisa Solomon
(74) *Attorney, Agent, or Firm* — Momentum IP; Marc Van Dyke

(57) ABSTRACT

A printing system for printing on a substrate, comprises a movable intermediate transfer member in the form of a flexible, substantially inextensible, belt guided to follow a closed path, an image forming station for depositing droplets of a liquid ink onto an outer surface of the belt to form an ink image, a drying station for drying the ink image on the belt to leave an ink residue film on the outer surface of the belt, first and second impression stations spaced from one another in the direction of movement of the belt, each impression station comprising an impression cylinder for supporting and transporting the substrate and a pressure cylinder carrying a compressible blanket for urging the belt against the substrate supported on the impression cylinder, and a transport system for transporting the substrate from the first impression station to the second impression station. The
(Continued)

pressure cylinder of at least the first impression station is movable between a first position in which the belt is urged towards the impression cylinder to cause the residue film on the outer surface of the belt to be transferred onto the front side of the substrate supported on the impression cylinder, and a second position in which the belt is spaced from the impression cylinder to allow the ink image on the belt to pass through the first impression station and arrive intact at the second impression station for transfer onto the reverse side of the substrate supported on the second impression cylinder.

15 Claims, 32 Drawing Sheets

Related U.S. Application Data continuation of application No. 16/737,859, filed on Jan. 8, 2020, now Pat. No. 11,104,123, which is a continuation-in-part of application No. 16/203,472, filed on Nov. 28, 2018, now Pat. No. 10,569,532, and a continuation-in-part of application No. 16/226,726, filed on Dec. 20, 2018, now Pat. No. 10,569,534, which is a continuation-in-part of application No. 15/871,652, filed on Jan. 15, 2018, now Pat. No. 10,179,447, which is a continuation of application No. 15/287,585, filed on Oct. 6, 2016, now Pat. No. 9,902,147, which is a continuation-in-part of application No. 14/917,020, filed as application No. PCT/IB2014/064277 on Sep. 5, 2014, now Pat. No. 9,505,208, said application No. 15/287,585 is a continuation-in-part of application No. 14/382,756, filed as application No. PCT/IB2013/051717 on Mar. 5, 2013, now Pat. No. 9,568,862, said application No. 16/226,726 is a continuation-in-part of application No. 15/541,478, filed as application No. PCT/IB2016/050170 on Jan. 14, 2016, now Pat. No. 10,214,038, said application No. 16/203,472 is a continuation of application No. 15/871,652, filed on Jan. 14, 2016, now Pat. No. 10,179,447.

(60) Provisional application No. 61/640,493, filed on Apr. 30, 2012, provisional application No. 61/635,156, filed on Apr. 18, 2012, provisional application No. 61/619,546, filed on Apr. 3, 2012, provisional application No. 61/619,016, filed on Apr. 2, 2012, provisional application No. 61/611,286, filed on Mar. 15, 2012, provisional application No. 61/606,913, filed on Mar. 5, 2012.

(56) References Cited

U.S. PATENT DOCUMENTS

| | | | |
|---|---|---|---|
| 4,520,048 | A | 5/1985 | Ranger |
| 4,792,473 | A | 12/1988 | Vitale |
| 4,867,830 | A | 9/1989 | Chung |
| 5,320,214 | A | 6/1994 | Kordis |
| 7,419,257 | B2 | 9/2008 | Mouri et al. |
| 8,632,147 | B2 | 1/2014 | Onishi |
| 8,939,573 | B2 | 1/2015 | Kanasugi et al. |
| 9,044,932 | B2 | 6/2015 | Ohnishi et al. |
| 9,573,361 | B2 | 2/2017 | Tsuji et al. |
| 9,969,182 | B2 | 5/2018 | Torisaka et al. |
| 10,052,865 | B2 | 8/2018 | Goto |
| 10,336,060 | B2 | 7/2019 | Liu |
| 10,703,093 | B2 | 7/2020 | Karlinski et al. |
| 11,607,878 | B2 | 3/2023 | Shmaiser et al. |
| 11,623,440 | B2 | 4/2023 | Chechik et al. |
| 11,628,674 | B2 | 4/2023 | Landa et al. |
| 11,630,618 | B2 | 4/2023 | Levant |
| 2002/0061451 | A1 | 5/2002 | Kita et al. |
| 2003/0103128 | A1 | 6/2003 | Missell et al. |
| 2004/0105971 | A1 | 6/2004 | Parrinello et al. |
| 2004/0177779 | A1 | 9/2004 | Steffen et al. |
| 2004/0221943 | A1 | 11/2004 | Yu et al. |
| 2004/0249327 | A1 | 12/2004 | Sendijarevic et al. |
| 2004/0265016 | A1 | 12/2004 | Kitani et al. |
| 2005/0103437 | A1 | 5/2005 | Carroll |
| 2005/0117859 | A1 | 6/2005 | Suzuki et al. |
| 2006/0066704 | A1 | 3/2006 | Nishida |
| 2006/0175559 | A1 | 8/2006 | Fischer et al. |
| 2007/0025740 | A1 | 2/2007 | Katoh et al. |
| 2008/0066277 | A1 | 3/2008 | Colson et al. |
| 2008/0101895 | A1 | 5/2008 | Holcomb et al. |
| 2008/0247780 | A1 | 10/2008 | Hara |
| 2008/0295724 | A1 | 12/2008 | Lohweg et al. |
| 2009/0073222 | A1 | 3/2009 | Hori |
| 2010/0035501 | A1 | 2/2010 | Prudhomme et al. |
| 2010/0123752 | A1 | 5/2010 | Eun et al. |
| 2011/0069129 | A1 | 3/2011 | Shimizu |
| 2012/0014726 | A1 | 1/2012 | Sekihara et al. |
| 2012/0183756 | A1 | 7/2012 | Higuchi |
| 2012/0236100 | A1 | 9/2012 | Toya |
| 2012/0249630 | A1 | 10/2012 | Bugner et al. |
| 2012/0280447 | A1 | 11/2012 | Kayanuma |
| 2013/0016156 | A1 | 1/2013 | Ooishi et al. |
| 2013/0229457 | A1 | 9/2013 | Yu |
| 2013/0235139 | A1 | 9/2013 | Schnabel et al. |
| 2014/0168313 | A1 | 6/2014 | Ramesh et al. |
| 2014/0176641 | A1 | 6/2014 | Hawryschuk et al. |
| 2015/0097906 | A1 | 4/2015 | Beier et al. |
| 2015/0273835 | A1 | 10/2015 | Arimizu et al. |
| 2015/0343797 | A1 | 12/2015 | Song et al. |
| 2015/0375543 | A1 | 12/2015 | Barnett et al. |
| 2016/0083609 | A1 | 3/2016 | Sisler et al. |
| 2016/0274519 | A1 | 9/2016 | Lim et al. |
| 2017/0282599 | A1 | 10/2017 | Ido |
| 2018/0281382 | A1 | 10/2018 | Umezawa et al. |
| 2019/0232638 | A1 | 8/2019 | Ziegenbalg et al. |
| 2020/0073301 | A1 | 3/2020 | Sakai et al. |
| 2020/0361715 | A1 | 11/2020 | Meier |
| 2020/0376860 | A1 | 12/2020 | Paker et al. |
| 2021/0055666 | A1 | 2/2021 | Landa et al. |
| 2022/0339927 | A1 | 10/2022 | Landa et al. |
| 2022/0379598 | A1 | 12/2022 | Landa et al. |
| 2022/0388315 | A1 | 12/2022 | Landa et al. |
| 2023/0001710 | A1 | 1/2023 | Landa et al. |
| 2023/0016492 | A1 | 1/2023 | Landa et al. |
| 2023/0037462 | A1 | 2/2023 | Burkatovsky |
| 2023/0364905 | A1 | 11/2023 | Landa et al. |
| 2023/0382101 | A1 | 11/2023 | Landa et al. |

FOREIGN PATENT DOCUMENTS

| | | | |
|---|---|---|---|
| CN | 101096455 | A | 1/2008 |
| CN | 101248146 | A | 8/2008 |
| CN | 101433074 | A | 5/2009 |
| CN | 101592896 | A | 12/2009 |
| CN | 101820241 | A | 9/2010 |
| CN | 102341249 | A | 2/2012 |
| CN | 102529257 | A | 7/2012 |
| CN | 102566343 | A | 7/2012 |
| CN | 102673209 | A | 9/2012 |
| CN | 104015415 | A | 9/2014 |
| CN | 105844621 | A | 8/2016 |
| CN | 107879147 | A | 4/2018 |
| DE | 102012011783 | A1 | 12/2013 |
| JP | 48043941 | | 12/1973 |
| JP | S63274572 | A | 11/1988 |
| JP | H01142811 | A | 6/1989 |
| JP | H05249870 | A | 9/1993 |
| JP | H08272224 | A | 10/1996 |
| JP | H09174646 | A | 7/1997 |
| JP | H10130597 | A | 5/1998 |
| JP | 2000094660 | A | 4/2000 |
| JP | 2000141883 | A | 5/2000 |

(56) References Cited

FOREIGN PATENT DOCUMENTS

| | | | |
|---|---|---|---|
| JP | 2000190468 | A | 7/2000 |
| JP | 2000337464 | A | 12/2000 |
| JP | 2003107819 | A | 4/2003 |
| JP | 2003227549 | A | 8/2003 |
| JP | 2004117118 | A | 4/2004 |
| JP | 2004276616 | A | 10/2004 |
| JP | 2005017472 | A | 1/2005 |
| JP | 2005224737 | A | 8/2005 |
| JP | 3712547 | B2 | 11/2005 |
| JP | 2006256087 | A | 9/2006 |
| JP | 2007111891 | A | 5/2007 |
| JP | 2009000916 | A | 1/2009 |
| JP | 2009154377 | A | 7/2009 |
| JP | 2009227909 | A | 10/2009 |
| JP | 2009240925 | A | 10/2009 |
| JP | 2009258587 | A | 11/2009 |
| JP | 2009271422 | A | 11/2009 |
| JP | 2009279808 | A | 12/2009 |
| JP | 2010076214 | A | 4/2010 |
| JP | 2011168024 | A | 9/2011 |
| JP | 2012081770 | A | 4/2012 |
| JP | 2013104044 | A | 5/2013 |
| JP | 2013199114 | A | 10/2013 |
| JP | 2014008609 | A | 1/2014 |
| JP | 2014073675 | A | 4/2014 |
| JP | 2015202616 | A | 11/2015 |
| JP | 2016074206 | A | 5/2016 |
| JP | 2016179678 | A | 10/2016 |
| JP | 2017093178 | A | 5/2017 |
| JP | 2018017429 | A | 2/2018 |
| JP | 2020014350 | A | 1/2020 |
| JP | 2021055093 | A | 4/2021 |
| WO | WO-2015026864 | A1 | 2/2015 |
| WO | WO-2015036865 | A1 | 3/2015 |
| WO | WO-2017208152 | A1 | 12/2017 |
| WO | WO-2019012456 | A1 | 1/2019 |
| WO | WO-2019111223 | A1 | 6/2019 |
| WO | WO-2020003088 | A1 | 1/2020 |
| WO | WO-2020136517 | A1 | 7/2020 |
| WO | WO-2020141465 | A1 | 7/2020 |
| WO | WO-2021137063 | A1 | 7/2021 |

OTHER PUBLICATIONS

CN101248146A Machine Translation (EPO, PlatPat and Google) published on Aug. 20, 2008 Ricoh KK.
CN101433074A Machine Translation (by EPO and Google)—published May 13, 2009; Kyocera Mita Corp [JP].
CN101592896A Machine Translation (by EPO and Google)—published Dec. 2, 2009; Canon KK.
CN101820241A Machine Translation (by EPO and Google)—published Sep. 1, 2010; Canon KK.
CN102341249A Machine Translation (EPO, PlatPat and Google) published on Feb. 1, 2012 Eastman Kodak Co.
CN102529257A Machine Translation (by EPO and Google)—published Jul. 4, 2012; Nippon Synthetic Chem Ind.
CN102566343A Machine Translation (by EPO and Google)—published Jul. 11, 2012; Canon KK.
CN102673209A Machine Translation (by EPO and Google)—published Sep. 19, 2012; Wistron Corp.
CN104015415A Machine Translation (by EPO and Google)—published Sep. 3, 2014; Avery Dennison Corp.
CN105844621A Machine Translation (by EPO and Google)—published Aug. 10, 2016; Fuyang Feiyang Printing Co Ltd.
CN107879147A Machine Translation (by EPO and Google)—published Apr. 6, 2018; Brother Ind Ltd.
CN1703326A Machine Translation (by EPO and Google)—published Nov. 30, 2005; Nissha Printing [JP].
CN1961015A Machine Translation (EPO, PlatPat and Google) published on May 9, 2007 Dainippon Ink & Chemicals.
Co-pending U.S. Appl. No. 18/016,343, inventors Levanon; Moshe et al., filed on Jan. 15, 2023.
Co-pending U.S. Appl. No. 18/069,232, filed Dec. 21, 2022.
Co-pending U.S. Appl. No. 18/076,420, inventor Burkatovsky; Vitaly, filed on Dec. 7, 2022.
Co-pending U.S. Appl. No. 18/083,532, inventors Landa; Benzion et al., filed on Dec. 18, 2022.
DE102012011783A1 Machine Translation (by EPO, PlatPat and Google)—published Dec. 19, 2013; Heidelberger Druckmasch Ag.
JP2000094660A Machine Translation (by EPO and Google)—published Apr. 4, 2000; Brother Ind Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2000337464A Machine Translation (by EPO and Google)—published Dec. 5, 2000; Fuji Xerox Co Ltd.
JP2003107819A Machine Translation (by EPO and Google)—published Apr. 9, 2003; Kanegafuchi Chemical Ind.
JP2003227549A Machine Translation (by EPO, PlatPat and Google)—published Aug. 15, 2003; Xerox Corp.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing Sys Ltd.
JP2007111891A Machine Translation (by EPO and Google)—published May 10, 2007; Mitsubishi Heavy Ind Ltd.
JP2009000916A Machine Translation (by EPO and Google)—published Jan. 8, 2009; Fujifilm Corp.
JP2009154377A Machine Translation (by EPO and Google)—published Jul. 16, 2009; Fujifilm Corp.
JP2009227909A Machine Translation (EPO, PlatPat and Google) published on Oct. 8, 2009 Fujifilm Corp.
JP2009240925A Machine Translation (by EPO and Google)—published Oct. 22, 2009; Fujifilm Corp.
JP2009258587A Machine Translation (by EPO and Google)—published Nov. 5, 2009; Fuji Xerox Co Ltd.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2010076214A Machine Translation (EPO, PlatPat and Google) published on Apr. 8, 2010 Fuji Xerox Co Ltd.
JP2011168024A Machine Translation (EPO, PlatPat and Google) published on Sep. 1, 2011 Ricoh Co Ltd.
JP2012081770A Machine Translation (EPO, PlatPat and Google) published on Apr. 26, 2012 Komori Printing Mach.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP3712547B2 Machine Translation (EPO, PlatPat and Google) published on Nov. 2, 2005 Sasaya Shunji.
JP48043941 Machine Translation (by EPO and Google)—published Dec. 21, 1973.
JPH01142811A Machine Translation (by EPO and Google)—published Jun. 5, 1989; Fanuc Ltd.
JPH05249870A Machine Translation (by EPO, PlatPat and Google)—published Sep. 28, 1993; Matsushita Electric Ind Co Ltd.

(56) References Cited

OTHER PUBLICATIONS

JPH08272224A Machine Translation (by EPO, PlatPat and Google)—published Oct. 18, 1996; Ricoh KK.
JPH09174646A Machine Translation (by EPO and Google)—published Jul. 8, 1997; Kao Corp.
JPH10130597A Machine Translation (by EPO and Google)—published May 19, 1998; Sekisui Chemical Co Ltd.
JPS63274572A Machine Translation (by EPO and Google)—published Nov. 11, 1988; Canon KK.
Co-pending U.S. Appl. No. 18/203,030, filed May 29, 2023.
Co-pending U.S. Appl. No. 18/545,483, filed Dec. 19, 2023.
JP2013199114A Machine Translation (by EPO and Google)—published Oct. 3, 2013; Canon KK.
JP2021055093A Machine Translation (by EPO and Google)—published Apr. 8, 2021; Riso Kagaku Corp.

Computed Using 'Technique A'

DIGITAL PRINTING SYSTEM

REFERENCE TO RELATED APPLICATIONS

Each of the following patent applications is incorporated by reference as if full set forth herein: (i) U.S. patent application Ser. No. 17/382,285 filed on Jul. 21, 2021; (ii) U.S. patent application Ser. No. 16/737,859 filed on Jan. 8, 2020; (iii) U.S. patent application Ser. No. 16/226,726 filed Dec. 20, 2018; (iv) U.S. patent application Ser. No. 16/203,472 filed Nov. 28, 2018; (v) U.S. patent application Ser. No. 15/871,652 filed Jan. 15, 2018; (vi) U.S. patent application Ser. No. 15/287,585, filed Oct. 10, 2016; (vii) U.S. patent application Ser. No. 14/917,020, filed Mar. 6, 2016; (viii) PCT/IB2014/164277 filed Sep. 5, 2014; (ix) U.S. patent application Ser. No. 14/382,756 filed Sep. 3, 2014; (x) PCT/IB2013/051717 filed Mar. 5, 2013; (xi) U.S. Provisional Patent Application 61/640,493 filed Apr. 30, 2012; (xii) U.S. Provisional Patent Application 61/635,156 filed Apr. 18, 2012; (xiii) U.S. Provisional Patent Application 61/619,546 filed Apr. 3, 2012; (xiv) U.S. Provisional Patent Application 61/619,016 filed Apr. 2, 2012; (xv) U.S. Provisional Patent Application 61/611,286 filed Mar. 15, 2012; (xvi) U.S. Provisional Patent Application 61/606,913 filed Mar. 5, 2012; (xvii) U.S. patent application Ser. No. 15/541,478 filed Jan. 14, 2016; and (xviii) PCT/IB2016/50170 filed Jan. 14, 2016, which is incorporated by reference as if full set forth herein.

FIELD OF THE INVENTION

The present invention, in some embodiments thereof, relate to a digital printing system, and in particular to indirect printing systems having a belt serving as an intermediate transfer member. The present invention, in some embodiments thereof, relates to systems and methods for printing ink images—for example, in a manner that compensates image non-uniformity effects.

BACKGROUND

Digital printing techniques have been developed that allow a printer to receive instructions directly from a computer without the need to prepare printing plates. Amongst these are color laser printers that use the xerographic process. Color laser printers using dry toners are suitable for certain applications, but they do not produce images of a photographic quality acceptable for publications, such as magazines.

A process that is better suited for short run high quality digital printing is used in the HP-Indigo printer. In this process, an electrostatic image is produced on an electrically charged image bearing cylinder by exposure to laser light. The electrostatic charge attracts oil-based inks to form a color ink image on the image bearing cylinder. The ink image is then transferred by way of a blanket cylinder onto paper or any other substrate.

Inkjet and bubble jet processes are commonly used in home and office printers. In these processes droplets of ink are sprayed onto a final substrate in an image pattern. In general, the resolution of such processes is limited due to wicking by the inks into paper substrates. The substrate is therefore generally selected or tailored to suit the specific characteristics of the particular inkjet printing arrangement being used. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications, especially for commercial printing. Furthermore, the use of coated substrates creates its own problems in that the surface of the substrate remains wet and additional costly and time consuming steps are needed to dry the ink, so that it is not later smeared as the substrate is being handled, for example stacked or wound into a roll. Furthermore, excessive wetting of the substrate causes cockling and makes printing on both sides of the substrate (also termed perfecting or duplex printing) difficult, if not impossible.

Furthermore, inkjet printing directly onto porous paper, or other fibrous material, results in poor image quality because of variation of the distance between the print head and the surface of the substrate.

Using an indirect or offset printing technique overcomes many problems associated with inkjet printing directly onto the substrate. It allows the distance between the surface of the intermediate image transfer member and the inkjet print head to be maintained constant and reduces wetting of the substrate, as the ink can be dried on the intermediate image member before being applied to the substrate. Consequently, the final image quality on the substrate is less affected by the physical properties of the substrate.

The use of transfer members which receive ink droplets from an ink or bubble jet apparatus to form an ink image and transfer the image to a final substrate have been reported in the patent literature. Various ones of these systems utilize inks having aqueous carriers, non-aqueous carrier liquids or inks that have no carrier liquid at all (solid inks).

The use of aqueous based inks has a number of distinct advantages. Compared to non-aqueous based liquid inks, the carrier liquid is not toxic and there is no problem in dealing with the liquid that is evaporated as the image dries. As compared with solid inks, the amount of material that remains on the printed image can be controlled, allowing for thinner printed images and more vivid colors.

Generally, a substantial proportion or even all of the liquid is evaporated from the image on the intermediate transfer member, before the image is transferred to the final substrate in order to avoid bleeding of the image into the structure of the final substrate. Various methods are described in the literature for removing the liquid, including heating the image and a combination of coagulation of the image particles on the transfer member, followed by removal of the liquid by heating, air knife or other means.

Generally, silicone coated transfer members are preferred, since this facilitates transfer of the dried image to the final substrate. However, silicone is hydrophobic which causes the ink droplets to bead on the transfer member. This makes it more difficult to remove the water in the ink and also results in a small contact area between the droplet and the blanket that renders the ink image unstable during rapid movement.

Surfactants and salts have been used to reduce the surface tension of the droplets of ink so that they do not bead as much. While these do help to alleviate the problem partially, they do not solve it.

The following issued patents and patent publications provide potentially relevant background material, and are all incorporated by reference in their entirety: U.S. Pat. Nos. 6,819,352, 7,565,026, 7,375,740, 7,542,171, 7,120,369, US 2014/085369, US 2003/071866 and JP 2011164622.

SUMMARY OF THE INVENTION

According to the present invention, there is provided a printing system for printing on front and reverse sides of a substrate, comprising a movable intermediate transfer member in the form of a flexible, substantially inextensible, belt guided to follow a closed path, an image forming station for depositing droplets of a liquid ink onto an outer surface of the belt to form an ink image, a drying station for drying the ink image on the belt to leave an ink residue film on the outer surface of the belt, first and second impression stations spaced from one another in the direction of movement of the belt, each impression station comprising an impression cylinder for supporting and transporting the substrate and a pressure cylinder carrying a compressible blanket for urging the belt against the substrate supported on the impression cylinder, and a transport system for transporting the substrate from the first impression station to the second impression station; wherein the pressure cylinder of at least the first impression station is movable between a first position in which the belt is urged towards the impression cylinder to cause the residue film on the outer surface of the belt to be transferred onto the front side of the substrate supported on the impression cylinder, and a second position in which the belt is spaced from the impression cylinder to allow the ink image on the belt to pass through the first impression station and arrive intact at the second impression station for transfer onto the reverse side of the substrate supported on the second impression cylinder.

The printing system of the invention allows different images to be printed consecutively on the same or opposite sides of the substrate. Different images may be printed consecutively on the same side of a substrate for increase the speed of the printing system by using different impression stations to print different color separations. Printing a second image on the same side of the substrate may also be used for the purpose of applying a varnish coating to a first image.

Embodiments of the invention permit the use of a thin belt because the required conformability of the outer surface of the belt to the substrate is predominantly achieved by the thick blanket carried by the pressure cylinders. The thin belt may display some ability to conform to the topography of the surface of the substrate to allow for the roughness of the surface of the substrate and may include layers having some very slight inherent compressibility. For example, the thickness of the compressible layer in the thin belt may be in the range of 100 to 400 μm, being typically around 125 μm, as compared to the thickness of the compressible layer in the blanket which may be in the range of 1 to 6 mm, being typically 2.5 mm.

By "substantially inextensible" it is meant that the belt has sufficient tensile strength in its lengthwise dimension (in the printing direction) to remain dimensionally stable in that direction. Though the printing system herein disclosed may comprise control systems to monitor any such change in the length of the belt, desirably its circumference varies by no more than 2% or no more than 1% or no more than 0.5% during operation of the system.

In each impression station, the compressible blanket on the pressure cylinder may be continuous, but if it does not extend around the entire circumference of the pressure cylinder then it needs to have a circumferential length at least equal to the maximum length of each image to be printed onto a substrate.

In an embodiment of the invention, the compressible blanket surrounds most but not all of the pressure cylinder to leave a gap between its ends, so that when said gap faces the impression cylinder, the pressure cylinder can disengage therefrom.

If the pressure cylinder of the first impression station is continuous, then a lifting mechanism may be provided to lower the pressure cylinder for operation in the first mode and to raise the pressure cylinder for operation in the second mode.

The mechanism may take the form of an eccentric supporting an axle of the pressure cylinder and a motor for rotating the eccentric to raise and lower the pressure cylinder.

The mechanism may alternatively take the form of a linear actuator.

As an alternative, the compressible blanket may extend over less than half of the pressure cylinder. In this case, displacement of the axle of the pressure cylinder is not necessary as operation of the pressure cylinder will automatically switch between the first and the second mode as the pressure cylinder rotates about its axis.

The separation between the impression cylinders may be a whole number multiple of the circumference of the impression cylinder divided by the number of sheets of substrate that can be transported by the impression cylinder at one time but, in some embodiments of the present invention, such a relationship need not apply.

In a printing system designed to print on a sheet substrate, the impression cylinder may have one or more sets of grippers for retaining the leading edge of each substrate sheet. As the substrate transport system has significant inertia, it normally runs at constant speed and cannot be braked or accelerated between sheets. For this reason, the ink images to be printed on the substrate sheets need to positioned along the belt at regular intervals with the spacing between them corresponding to a whole number multiple of the length of the arc between consecutive grippers or the circumference of the impression cylinder if it can only support one substrate sheet at a time. Furthermore, the ink images to be printed on the reverse side of the substrate sheets need to be interleaved with the ink images to be printed on the front side of the substrate sheets and, to maximize the use of the surface of the belt, these images should be located at least approximately midway between the ink images intended for the front side of the substrate.

For correct alignment of the front and rear ink images, it is important to ensure that when a substrate sheet arrives at the second impression station after traveling through the perfecting system, it should be in the correct position to receive an ink image that has followed a substantially straight line between the two impression stations. For this relationship to hold true, the total distance traveled by the trailing edge of the substrate at the first impression station (which becomes the leading edge at the second impression station) should be equal a whole number multiple of the distance on the belt between ink images intended to be printed on the front side of the substrate plus the offset between the images to be printed on the reverse side of the substrate and those to be printed on the front side. This distance is determined by the diameters and relative phasing of the grippers of the various cylinders of the perfecting system.

Some embodiments relate to a digital printing system and method for depositing ink droplets onto a target surface in dependence upon a received electrical printing signal containing data indicating the desired image to be printed while improving the uniformity of intended tone reproduction of the printed image.

Some embodiments relate to a digital printing system and method for depositing ink droplets onto a target surface in dependence upon a received electrical printing signal containing data indicating the desired image to be printed while improving the uniformity of intended tone reproduction of the printed image. The printing system comprises a multi-nozzle and multi-head print bar that defines print and cross-print directions, an image scanner for scanning a calibration image printed by the print bar, and a computing system operative during a calibration phase to analyze the output of the image scanner generated by scanning a calibration image, calibration image data from the scanner being analyzed slice by slice to develop a respective image-correction-function for each slice of the scanned calibration image, and to apply, during a print run, the image-correction function computed during the calibration phase to the received printing signal, on a slice by slice basis, in order to reduce errors between the desired image and the image printed by the print bar.

Embodiments of the present invention relate to methods and systems for correcting image non-uniformity in printing systems where ink images are formed on a target surface by deposition of liquid ink droplets. The target surface may be a printing substrate (e.g., paper, cardboard, plastic, fabric, etc.) or an intermediate transfer member (ITM).

In the latter case, ink images may be formed upon the ITM as part of an indirect printing process where droplets of liquid inks are deposited on the outer surface of the ITM, modified thereon (e.g., chemically or physically treated, evaporated, dried, etc.) and transferred therefrom to a printing substrate. As noted in the previous paragraph, it is understood that the present teachings are similarly applicable to printing systems wherein the ink is directly deposited to the printing substrate.

FIGS. 2A and 2C-2D illustrate diverse apparatus that implement an indirect printing process. In the examples of FIGS. 2A and 2C, the ITM is a blanket mounted over a plurality of rollers, so as to form a continuous belt, while in the example of FIG. 2D the ITM is a rigid drum (or a blanket mounted thereupon). The apparatus of FIGS. 2A and 2C-2D all comprise an image forming system 300 including one or more print bars 302—in the non-limiting examples of FIGS. 2A and 2C-2D each print bar deposits ink droplets of a different respective color (e.g., cyan, magenta, yellow and key (black)). In all of FIGS. 2A and 2C-2D, the outer surface of the ITM is in relative motion along a 'printing direction' relative to print bars 302. In FIGS. 2A and 2C a relatively flat portion of the ITM moves in the 'y' direction. In FIG. 2D, the ITM rotates in the θ direction.

One salient feature of all digital printing systems is the conversion of digital "input" images stored electronically (e.g., in computer memory) into ink-images. FIG. 2B illustrates operation of a printing system (i.e. implementing either an indirect printing process or a direct printing process). In FIG. 2B, a digital input image (e.g., an array of pixels) stored in volatile or non-volatile computer memory or in other suitable storage is printed, yielding an ink-image.

When the digital input image resides in computer memory (or other computer-readable storage), each position in the array of pixels has a different 'input density value' (e.g., a tone value) describing the density of color to be printed. In addition, it is possible to characterize the ink image according to the local color output-density value (or simply 'output density value') at a plurality of physical locations on a two-dimensional grid which overlays the ink image. The orthogonal directions of the grid may correspond to the 'print direction' and the 'cross-print' direction.

One example of an 'input density value' is a tone value. One example of an 'output density value' is a luminance—however, it is possible to work with any input or output color space including but not limited to the RGB space, the CMYK space and the XYZ space. Preferably, the input is in CMYK space. Certain embodiments are discussed below for the specific case where the input density value is a 'tone value' and the output density value is a 'luminance' It is appreciated that this is a specific case and is not intended as limiting—any input density value (e.g., in CMYK space) and any output density value may be substituted for 'tone value' and 'luminance' The discussion below relates to 'tone reproduction functions.' The term 'tone reproduction function' (trf) describes a dependence (i.e. according to the physical and/or chemical parameters of the printing system or the printing process or setup/apparatus) of output density values upon input density values for a plurality of different input density values. One example of an input density value is tone value; one example of an output density value is luminance. However, the trf is not limited to this specific case and can relate to any 'input density value' and 'output density value.'

Additional details about the specific apparatus of FIGS. 2A and 2C-2D is discussed below in the section entitled "Additional Discussion About FIGS. 2A and 2C-2D."

In all cases, the print bar 302 is disposed along an axis perpendicular to the printing direction, referred to as the 'cross-print direction.' In FIGS. 2A and 2C-2D the cross-print direction is along the x-axis (not shown).

As illustrated in FIG. 3, the print bar 302, schematically illustrated from bottom view and "side" view, comprises an array of one or more print heads 600 (preferably, a plurality of print heads 600). FIG. 3 illustrates four such print heads 600A-600D. Within each print head 600 are a plurality of nozzles via which liquid ink is deposited, as droplets, on the target surface. FIG. 4, discussed below, illustrates a single print head 600.

In theory, given the same instruction to deposit the same ink volume, each nozzle should behave like every other nozzle with respect to deposition of such purportedly identical ink droplets. In practice, different nozzles may behave differently even in response to an instruction to deposit a monotone uniform image, leading the non-uniformities in the ink image formed on the target surface, even in situations where it is desired to generate a uniform (i e uniform in the cross-print direction) ink image (or portion thereof) of a single tone. Alternatively or additionally, other factor(s) (e.g., a cross-print-direction-temperature gradient on the target surface, or any other factor) may cause or contribute to image non-uniformity in situations where it is desired to print an image that is uniform in the cross-print direction. It is understood that any image having non-constant tone value or luminance is non-uniform. For the present disclosure, the term 'image non-uniformity' refers to non-uniform luminance observable in a section of an ink-image where the input digital image has a uniform tone value.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice $slice_i$(DOCI) of a plurality {$slice_1$(DOCI), $slice_2$(DOCI) . . . $slice_N$ (DOCI)} of slices of the digital output-calibration-image DOCI, computing a respective slice-specific tone-reproduction-function trf(slice$_i$(DOCI)); and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein A. the printing system is configured so that images produced by the print-bar thereof are dividable into alternating single-print-head slices and interlace slices; B. within the single-print-head slices, the ICF is derived primarily from region-internal DOCI data; and iii. within the interlace slices, the ICF is derived primarily from extrapolation of region external DOCI data.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice slice$_i$(DOCI) of a plurality {slice$_1$(DOCI), slice$_2$(DOCI) . . . slice$_N$ (DOCI)} of slices of the digital output-calibration-image DOCI, computing a respective slice-specific tone-reproduction-function trf(slice$_i$(DOCI)); and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein: A. the printing system is configured so that images produced by the print-bar thereof comprise first and second distinct single-print-head slices and a mediating slice therebetween, the first and second single-print-head slices being respectively exclusive for first and second print-heads of the multi-head print bar; B. the mediating slice includes first and second sets of positions interlaced therein, positions of the first and second set respectively corresponding to nozzle positions for nozzles of the first and second print heads; C. the deriving of the ICF includes computing first and second extrapolation functions respectively describing extrapolation from the first and second single-print-head slices into the mediating region of DOCI data, or a derivative thereof; and iv. within the mediating region, (A) at positions of the first set, the ICF is derived primarily from the first extrapolation function and (B) at positions of the second set, the ICF is derived primarily from the second extrapolation function.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice slice$_i$(DOCI) of a plurality {slice$_1$(DOCI), slice$_2$(DOCI) . . . slice$_N$ (DOCI)} of slices of the digital output-calibration-image DOCI, computing a respective slice-specific tone-reproduction-function trf(slice$_i$(DOCI)); and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein A. the printing system is configured so that images produced by the print-bar thereof comprise first and second of distinct single-print-head slices and a interlace slice therebetween, the first and second single-print-head slices being respectively exclusive for first and second print-heads; B. the interlace slice includes first and second sets of positions interlaced therein, positions of the first and second set respectively corresponding to nozzle positions for nozzles of the first and second print heads; and C. within the interlace region, the ICF is computed by determining if a position in the mediating region corresponds to a nozzle position of the first print-head or the second print-head, and the ICF is computed according to the results of the determining.

A method of digital printing by a printing system that (i) comprises a multi-nozzle and multi-head print bar that defines print and cross-print directions and (ii) is configured to convert digital input images into ink images by droplet deposition onto a target surface is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf (bar) for the entire print bar; iv. for each slice slice$_i$(DOCI) of a plurality {slice$_1$(DOCI), slice$_2$(DOCI) . . . slice$_N$ (DOCI)} of slices of the digital output-calibration-image DOCI, computing a respective slice-specific tone-reproduction-function trf(slice$_i$(DOCI)); and v. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system, wherein: A. the printing system is configured so that images produced by the print-bar thereof comprise first and second of distinct single-print-head slices and a mediating slice therebetween, the first and second single-print-head slices being respectively exclusive for first and second print-heads; B. the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; C. the deriving of the ICF includes computing first and second extrapolation functions respectively describing extrapolation from the first and second single-print-head slices into the mediating region of DOCI data, or a derivative thereof; and D. when computing ICF for the first position, a greater weight is assigned to the second extrapolation function than to the first extrapolation function; and v. when computing ICF for the second position, a greater weight is assigned to the first extrapolation function than to the second extrapolation function.

In some embodiments, i. the calibration further comprises: for each of slice $slice_i$(DOCI) of the slice plurality, applying a respective inverse of a respective slice-specific tone-reproduction-function to the representative print-bar tone-reproduction-function trf(bar) to yield a tone-shift-function-set tsfs(DOCI)={tsf_$slice_1$(DOCI)(tone-value), tsf_$slice_2$(DOCI)(tone-value), . . . tsf_$slice_N$(DOCI)(tone-value)} of slice-specific tone-shift functions; and ii. the print-bar-spanning image-correction-function ICF (cross-print-direction-location, tone-value) is derived from the tone-shift-function-set tsfs(DOCI) of slice-specific tone-shift functions.

A method of digital printing by a printing system configured to convert digital input images into ink images by droplet deposition onto a target surface, the printing system comprising a multi-nozzle and multi-head print bar that defines print and cross-print directions is disclosed. The method comprises: a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf(bar) for the entire print bar; iv. for each slice $slice_i$(DOCI) of a plurality {$slice_1$(DOCI), $slice_2$(DOCI) . . . $slice_N$(DOCI)} of slices of the digital output-calibration-image DOCI, computing a respective slice-specific tone-reproduction-function trf($slice_i$(DOCI)); and v. for each of slice $slice_i$(DOCI) of the slice-plurality, applying a respective inverse of a respective slice-specific tone-reproduction-function to the representative print-bar tone-reproduction-function trf(bar) to yield a tone-shift-function-set tsfs(DOCI)={tsf_$slice_1$(DOCI)(tone-value), tsf_$slice_2$(DOCI)(tone-value), . . . tsf_$slice_N$(DOCI)(tone-value)} of slice-specific tone-shift functions; and vi. deriving a print-bar-spanning image-correction-function ICF (cross-print-direction-location, tone-value) from the tone-shift-function-set tsfs(DOCI) of slice-specific tone-shift functions; b. applying the image-correction-function ICF to a uncorrected digital image UDI so as to compute a corrected digital image CDI; and c. printing the corrected digital image CDI by the printing system.

In some embodiments, i. the printing system is configured so that images produced by the print-bar thereof are dividable into alternating single-print-head slices and interlace slices; ii. within the single-print-head slices, the ICF is derived primarily from region-internal DOCI data; and iii. within the interlace slices, the ICF is derived primarily from extrapolation of region external DOCI data.

In some embodiments, i. the printing system is configured so that images produced by the print-bar thereof comprise first and second distinct single-print-head slices and a mediating slice therebetween, the first and second single-print-head slices being respectively exclusive for first and second print-heads; ii. the mediating slice includes first and second sets of positions interlaced therein, positions of the first and second set respectively corresponding to nozzle positions for nozzles of the first and second print heads; iii. the deriving of the ICF includes computing first and second extrapolation functions respectively describing extrapolation from the first and second single-print-head slices into the mediating region of DOCI data, or a derivative thereof; and iv. within the mediating region, (A) at positions of the first set, the ICF is derived primarily from the first extrapolation function and (B) at positions of the second set, the ICF is derived primarily from the second extrapolation function.

In some embodiments, i. the printing system is configured so that images produced by the print-bar thereof comprise first and second of distinct single-print-head slices and a interlace slice therebetween, the first and second single-print-head slices being respectively exclusive for first and second print-heads; ii. the interlace slice includes first and second sets of positions interlaced therein, positions of the first and second set respectively corresponding to nozzle positions for nozzles of the first and second print heads; and iii. within the interlace region, the ICF is computed by determining if a position in the mediating region corresponds to a nozzle position of the first print-head or the second print-head, and the ICF is computed according to the results of the determining.

In some embodiments, i. the printing system is configured so that images produced by the print-bar thereof comprise first and second of distinct single-print-head slices and a mediating slice therebetween, the first and second single-print-head slices being respectively exclusive for first and second print-heads; ii. the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; iii. the deriving of the ICF includes computing first and second extrapolation functions respectively describing extrapolation from the first and second single-print-head slices into the mediating region of DOCI data, or a derivative thereof; and iv. when computing ICF for the first position, a greater weight is assigned to the second extrapolation function than to the first extrapolation function; and v. when computing ICF for the second position, a greater weight is assigned to the first extrapolation function than to the second extrapolation function.

In some embodiments, the target surface is a surface of an intermediate transfer member (ITM) (for example, a drum or a belt) of the printing system and the ink images formed on the ITM surface by the droplet deposition are subsequently transferred from the ITM to a printing substrate.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar are dividable into alternating single-print-head slices and interlace slices; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i$(DOCI) of a plurality {$slice_1$(DOCI), $slice_2$(DOCI) . . . $slice_N$(DOCI)} of slices of the digital output-calibration-image DOCI, computing a respective slice-specific tone-reproduction-function trf($slice_i$(DOCI)); and D. deriving a print-bar-spanning image-correction-function ICF (cross-print-direction-location, tone-value) from the slice-specific and/or print-bar tone reproduction function(s)

such that within the single-print-head slices, the ICF is derived primarily from region-internal DOCI data and within the interlace slices, the ICF is derived primarily from extrapolation of region external DOCI data; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar comprise first and second distinct single-print-head slices and a mediating slice therebetween, the first and second single-print-head slices being respectively exclusive for first and second print-heads of the multi-head print bar, the mediating slice including first and second sets of positions interlaced therein, positions of the first and second set respectively corresponding to nozzle positions for nozzles of the first and second print heads; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i$(DOCI) of a plurality {$slice_1$(DOCI), $slice_2$ (DOCI) . . . $slice_N$(DOCI)} of slices of the digital output-calibration-image DOCI, computing a respective slice-specific tone-reproduction-function trf($slice_i$(DOCI)); and D. deriving a print-bar-spanning image-correction-function ICF (cross-print-direction-location, tone-value) from the slice-specific and/or print-bar tone reproduction function(s) such that the deriving of the ICF includes computing first and second extrapolation functions respectively describing extrapolation from the first and second single-print-head slices into the mediating region of DOCI data, or a derivative thereof; and within the mediating region, (I) at positions of the first set, the ICF is derived primarily from the first extrapolation function and (II) at positions of the second set, the ICF is derived primarily from the second extrapolation function; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar comprise first and second of distinct single-print-head slices and a mediating slice therebetween, the first and second single-print-head slices being respectively exclusive for first and second of the print-heads of the multi-head print bar, the interlace slice including first and second sets of positions interlaced therein, positions of the first and second set respectively corresponding to nozzle positions for nozzles of the first and second print heads; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i$(DOCI) of a plurality {$slice_1$(DOCI), $slice_2$ (DOCI) . . . $slice_N$(DOCI)} of slices of the digital output-calibration-image DOCI, computing a respective slice-specific tone-reproduction-function trf($slice_i$(DOCI)); and D. deriving a print-bar-spanning image-correction-function ICF (cross-print-direction-location, tone-value) from the slice-specific and/or print-bar tone reproduction function(s) such that within the interlace region, the ICF is computed by determining if a position in the mediating region corresponds to a nozzle position of the first print-head or the second print-head, and the ICF is computed according to the results of the determining; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions and being configured so that ink-images produced by the multi-head print-bar comprise first and second of distinct single-print-head slices and a mediating slice therebetween, the first and second single-print-head slices being respectively exclusive for first and second print-heads, the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i$(DOCI) of a plurality {$slice_1$(DOCI), $slice_2$(DOCI) . . . $slice_N$(DOCI)} of slices of the digital output-calibration-image DOCI, computing a respective slice-specific tone-reproduction-function trf($slice_i$(DOCI)); and D. deriving a print-bar-spanning image-correction-function ICF (cross-print-direction-location, tone-value) from the slice-specific and/or print-bar tone reproduction function(s) such that (i) the deriving of the ICF includes computing first and second extrapolation functions respectively describing extrapolation from the first and second single-print-head slices into the mediating region of DOCI data, or a derivative thereof; and (ii) when computing ICF for the first position, a greater weight is assigned to the second extrapolation function than to the first extrapolation function; and (iii). when computing ICF for the second position, a greater weight is assigned to the first extrapolation function than to the second extrapolation function; and ii. apply the image-correction-function ICF to a uncorrected digital image UDI so as to compute a corrected digital image CDI; and iii. cause the print bar to print the corrected digital image CDI onto the target surface.

A digital printing system comprises: a. a multi-nozzle and multi-head print bar for depositing ink-droplets on a target surface in dependence to received electrical printing signals to form ink-images on the target surface, the multi-nozzle and multi-head print bar defining print and cross-print directions; and b. a computing system for data-processing and for generating the electrical printing signals so as to control the print bar, the computer system configured to: i. perform a calibration by: A. causing the print bar to print a digital input-calibration-image DICI onto the target surface as to generate an ink calibration-image; B. after the DICI is optically imaged into a digital output-calibration-image DOCI representing the ink-calibration image, processing the DOCI to compute therefrom a representative print-bar tone-reproduction-function trf(bar) for the entire print bar; C. for each slice $slice_i$(DOCI) of a plurality {$slice_1$(DOCI), $slice_2$ (DOCI) . . . $slice_N$(DOCI)} of slices of the digital output-calibration-image DOCI, computing a respective slice-specific tone-reproduction-function trf($slice_i$(DOCI)); and D. for each of slice $slice_i$(DOCI) of the slice-plurality, applying a respective inverse of a respective slice-specific tone-reproduction-function to the representative print-bar tone-reproduction-function trf(bar) to yield a tone-shift-function-set tsfs(DOCI)={$tsf\_slice_1$(DOCI)(tone-value), $tsf\_slice_2$ (DOCI)(tone-value), . . . $tsf\_slice_N$(DOCI)(tone-value)} of slice-specific tone-shift functions; and E. deriving a print-bar-spanning image-correction-function ICF (cross-print-direction-location, tone-value) from the tone-shift-function-set tsfs(DOCI) of slice-specific tone-shift functions; ii. apply the image-correction-function ICF to a uncorrected digital image UDI so as to compute a corrected digital image CDI; and iii. cause the print bar to print the corrected digital image CDI onto the target surface.

In some embodiments, i. the computing system is further configured to perform the calibration by, for each of slice $slice_i$(DOCI) of the slice plurality, applying a respective inverse of a respective slice-specific tone-reproduction-function to the representative print-bar tone-reproduction-function trf(bar) to yield a tone-shift-function-set tsfs (DOCI)={$tsf\_slice_1$(DOCI)(tone-value), $tsf\_slice_2$(DOCI) (tone-value), . . . $tsf\_slice_N$(DOCI)(tone-value)} of slice-specific tone-shift functions; and ii. the computing system is further configured to derive the print-bar-spanning image-correction-function ICF (cross-print-direction-location, tone-value) from the tone-shift-function-set tsfs(DOCI) of slice-specific tone-shift functions.

In some embodiments, the system further comprises: c. an intermediate transfer member (ITM) (for example, a drum or a belt); and d. an impression station, wherein: (i) the target surface on which the ink-images are formed by the print bar is a surface of the ITM; (ii) the ITM is guided so that ink images formed on the ITM surface are subsequently to the impression station; and (iii) the ink images are transferred, at the impression station, from the ITM to substrate.

A digital printing system that is capable of both duplex printing onto substrate sheets and simplex printing at a higher speed is now additionally disclosed.

Some embodiments of the present invention relate to a digital printing system having two independently operable printing towers arranged in series to print on sheets of substrate, each substrate sheet passing sequentially through both printing towers, and a perfecting mechanism provided between the two towers to reverse substrate sheets during their transfer from the first printing tower to the second printing tower, the perfecting mechanism being selectively operable to enable the second tower to print either on the same side of a substrate sheet as the first tower or on the opposite side of the substrate sheet, wherein, when the perfecting system is operative to reverse the substrate sheets during transfer between the two towers, each tower is operative to impress a complete image onto a respective side of the substrate, and when the perfecting system is inoperative, the first printing tower serves to impress at least one selected separation of an image onto each substrate sheet to form a partial image and the second printing tower is operative to impress the remaining separations of the same image onto the same side of the substrate sheet in register with the partial image formed by the first printing tower.

Embodiments of the invention will be described herein that rely on the process taught by PCT application No. PCT/IB2013/051716, which claims priority from U.S. Provisional Patent Application No. 61/606,913, (both of which applications are herein incorporated by reference in their entirety). Relevant parts of the disclosure of these applications are included herein for the convenience of the reader.

In accordance with an aspect of the invention, there is provided a digital printing system having two independently operable printing towers each having an endless intermediate transfer member, an image forming system serving under digital control to direct droplets of a water-based ink onto the intermediate transfer member to form an ink image, a drier for drying the ink image while it is being transported by the intermediate transfer member to form a residue film, and an impression station at which the residue film is impressed onto a sheet substrate, wherein the two printing towers are arranged in series such that each substrate sheet passes sequentially through both printing towers, and wherein a selectively operable perfecting mechanism is provided between the two towers to reverse each substrate sheet during transfer from the first printing tower to the second printing tower, the perfecting mechanism selectively enabling the second tower to print either on the same side of each substrate sheet as the first tower or on the opposite side of each substrate sheet, wherein, when the perfecting system acts to reverse the substrate sheets during transfer between the two towers, each tower is operative to impress a complete image onto a respective side of the substrate, and when the perfecting system is inoperative, the first printing tower serves to impress at least one selected separation of an image onto each substrate sheet to form a partial image and the second printing tower is operative to impress the remaining separations of the same image onto the same side of the substrate sheet in register with the partial image formed by the first printing tower.

When operating in this manner, any tower serving to print only selected separations of an image, for instance separate portions or colors of an image, may include a plurality of print bars of the same color circumferentially spaced from one another along the image transfer surface. The image forming system is positioned in the printing system at a location also referred to as the image forming station, and these two terms may be hereinafter interchanged.

In an embodiment of the invention, each printing tower comprises four sequentially disposed print bars and the colors of the print bars are arranged in different sequences in the two printing towers, the colors of the two inner print bars in each printing tower being matched to the colors of the two outer print bars in the other printing tower.

Such a print bar configuration simplifies the changeover from simplex to duplex operation in that it is only then necessary to swap over the two inner or intermediate print bars of the sets in the two printing towers with each other. If such a changeover is performed using an automated print bar positioning system, the time taken for the changeover is significantly reduced in that the transport system may move each pair in one operation The print bar positioning system may take the form of a movable carriage guided on rails and having lifting arms for engaging the print bars. For a changeover, the carriage may be aligned with the first tower and its lifting arms used to raise the two intermediate print bars as a pair. The removed pair of print bars may then be parked in a rest position to free the arms of the carriage, which may then be used to raise the two intermediate print bars of the second tower and transfer them to the first tower. As a last step, the temporarily parked pair of print bars may be transferred from the rest position to the second tower.

It is possible for a printing system of the invention to operate in a mode in which after a complete image has been formed on one side of the substrate by the first printing tower, the second tower is use to apply a varnish to the printed side of the substrate instead of forming an image on the opposite side. In this case, the perfecting mechanism would not be used to invert the substrate between the two towers.

A digital printing system is disclosed having two independently operable printing towers arranged in series such that a substrate sheet passes sequentially through both printing towers, and in which a perfecting mechanism is provided between the two towers to reverse each substrate sheet during transfer from the first printing tower to the second printing tower, the perfecting mechanism being selectively operable to enable the second tower to print either on the same side of each substrate sheet as the first tower or on the opposite side of each substrate sheet. As well as allowing a duplex mode, the system provides a higher speed simplex mode during which different separations of the same image are printed by the two towers.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical components but may not be referenced in the description of all figures.

BRIEF DESCRIPTION OF THE DRAWINGS

The invention will now be described further, by way of example, with reference to the accompanying drawings, in which.

DETAILED DESCRIPTION OF ILLUSTRATED EMBODIMENTS

Discussion of FIGS. 1A to 1D

Relating initially to the embodiment of FIGS. 1A to 1D, though the invention can be used in any indirect printing system having similar configuration, it will be described below with reference to a process where liquid inks are deposited as droplets on the outer surface of an endless belt having repelling properties toward the inks being used. The following examples may refer in particular to the transfer of ink films obtained from the drying of liquid inks having an aqueous carrier typically comprising a coloring agent (e.g., pigments or dyes) and a polymeric resin, these inks having been jetted on a repelling hydrophobic surface of the belt, but the invention need not be limited to such particular embodiments.

Figure 1A:
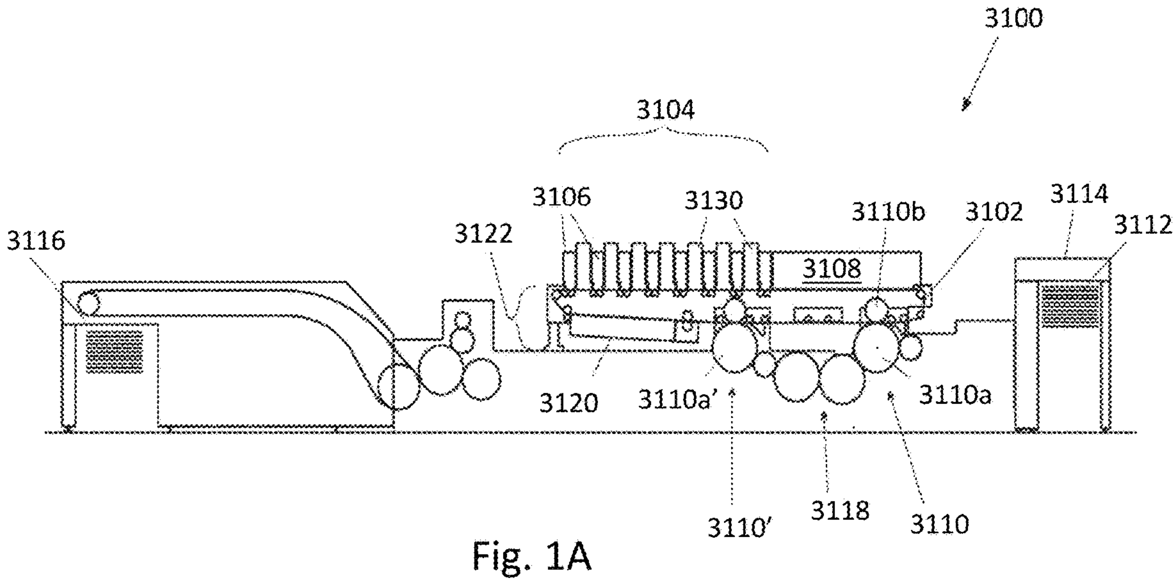
FIG. 1A is a schematic representation of a printing system according to a first embodiment.

In FIG. 1A, there is shown schematically a printing system 3100 having an intermediate transfer member 3102 in the form of a belt having a hydrophobic outer surface guided over various rollers of a belt conveyor system 3122 to travel in an endless loop. While circulating through the loop, the belt 3102 passes through various stations.

At an image forming station 3104, print bars 3106 deposit droplets of inks onto the hydrophobic outer surface of the belt 3102 to form an ink image. The inks of the different bars 3106 are usually of different colors and all the inks have particles of resin and coloring agent in an aqueous carrier, apart from some transparent inks or varnishes which may not contain a pigment.

Though the image forming station illustrated in FIG. 1A comprises eight print bars 3106, an image forming station may comprise fewer or more print bars. For instance, an image forming system may have three print bars each jetting Cyan (C), Magenta (M) or Yellow (Y) inks, or four print bars with the addition of a Black ink (K).

Within the image forming station 3104, a gas (e.g., air) is blown onto the surface of the belt 3102 in between print bars 3106 by means of head units 3130. This is to stabilize the ink droplets to help in fixing them to the belt 3102 and to prevent bleeding.

The belt 3102 then passes through a drying station 3108 where the ink droplets are dried and rendered tacky before they reach impression stations 3110, 3110' where the ink droplets are transferred onto sheets 3112 of substrate. Each impression station 3110 includes an impression cylinder 3110*a*, 3110*a*' and a pressure cylinder 3110*b*, 3110*b*' which have between them a nip within which the belt 3102 is pressed against a substrate. In the illustrated embodiment, the substrate is formed as sheets 3112 that are transferred from an input stack 3114 to an output stack 3116 by a substrate transport system 3118. The substrate transport system 3118 comprises a perfecting system to allow double-sided, or duplex, printing. which will be described below in more detail. Two impression stations 3110, 3110' are provided to enable printing on both sides of the substrate, or twice onto the same side, one impression station being positioned upstream and the other downstream of the transport system 3118.

It should be mentioned, that by way of example there are only two impression stations in the teachings herein however, anyone skilled in the field of digital printing may appreciate that the invention may comprise two or more impression stations. For example, a printing system with four impression stations may be utilized in order to facilitate a higher rate of printing. The use of more than two impression stations may facilitate printing of specialized inks in addition to the traditional pigment-based inks.

It should be mentioned that the invention is equally applicable to printing systems designed to print on a substrate in the form of a continuous web instead of individual sheets. In such cases, the substrate transport system is accordingly adapted to convey the substrate from an input roller to a delivery roller.

After passing through the impression stations 3110, 3110' the belt 3102 in FIG. 1A passes through an optional cleaning and/or conditioning station 3120 before returning to the image forming station 3104. The purpose of the station 3120 is to remove any ink that may still be adhering to the belt 3102 and/or to apply a conditioning agent, to assist in fixing the ink droplets to the outer surface of the belt 3102. For belts having certain silicone based outer surfaces, the conditioning agent may be polyethylenimine (PEI). The outer surface of the belt 3102 is made hydrophobic to assist in a clean transfer of the tacky ink image to the substrate at the impression station(s) 3110. The conditioning station 3120 may also act to cool the belt 3102 before it returns to the image forming station 3104.

The belt 3102 in some embodiments of the invention is a thin belt having an inextensible base layer with a hydrophobic release layer on its outer surface. The base layer may suitably comprise a woven fabric that is stretched and laterally tensioned and guided by means of formations on its lateral edges which engage in guide channels. The lateral tension applied by the guide channels in which the side formations of the belt may engage need only be sufficient to maintain the belt 3102 flat as it passes beneath the print bars 3106 of the image forming station 3104. The thin belt 3102 may further comprise a conformational layer with a thickness of 100 to 400 microns, but the ability to conform to the topography of the surface of a substrate may alternatively or additionally be provided by the composition of the release layer itself. The pressure cylinder 3110*b*, 3110*b*' in each of the impression stations 3110, 3110' carries a thick compressible blanket (not shown) that may typically have a thickness between 1 and 6 mm, typically 2.5 mm, that may be mounted on the cylinder in the same manner as the blanket of an offset litho press or may be a continuous blanket wrapped around or bonded to the entire circumference of the cylinder. The purpose of the blanket on the pressure cylinder is to provide the required overall conformability of the belt to the substrate, serving as a backing cushion to the belt at the impression station. Each of the thin belt and of the compressible blanket may be formed of several layers to modify any other desired capability, such as the mechanical, frictional, thermal and electrical properties of such multi-layered structures.

A printer has previously been demonstrated that had a thick belt, combining the belt 3102 with a blanket but this construction requires the blanket to be replaced whenever the belt is worn despite the fact that the blanket has a greater working life. Separating the blanket from the belt and placing it on the pressure cylinder 3110*b* allows the belt 3102 to be replaced less expensively.

Another important advantage offered by providing a the thin belt 3102 that is separate from the compressible blanket is that the mass of the circulating belt is decreased. The reduction in mass reduces the amount of power needed to drive the belt 3102 thereby improving the energy efficiency of the printing system. The thin belt being devoid of a compressible layer and substantially lacking compressibility is therefore also referred to as a light belt.

The use of a light belt 3102 also results in the intermediate transfer member having a lower thermal inertia, which term represents the product of its mass and its specific heat. As it travels through the various stations, the belt 3102 is heated and cooled. In particular, the belt 3102 is heated as its travels through the heaters of the drying station 3108 and through two further optional heaters 3210 positioned immediately preceding the impression stations 3110 to render the ink film tacky. The temperature of the belt cannot however be high on entering the image forming station 3104 because it could cause the ink droplets to boil on impact. Thus, a function of the treatment station 3120 can be to cool the belt 3102 before it reaches the image forming station 3104. The reduction in its thermal inertia considerably reduces the energy consumption of the printing system as less heat energy is stored in the belt 3102 when the ink images are being heated and therefore less energy needs to be removed, and wasted, by the treatment station 3120.

Figure 1B:
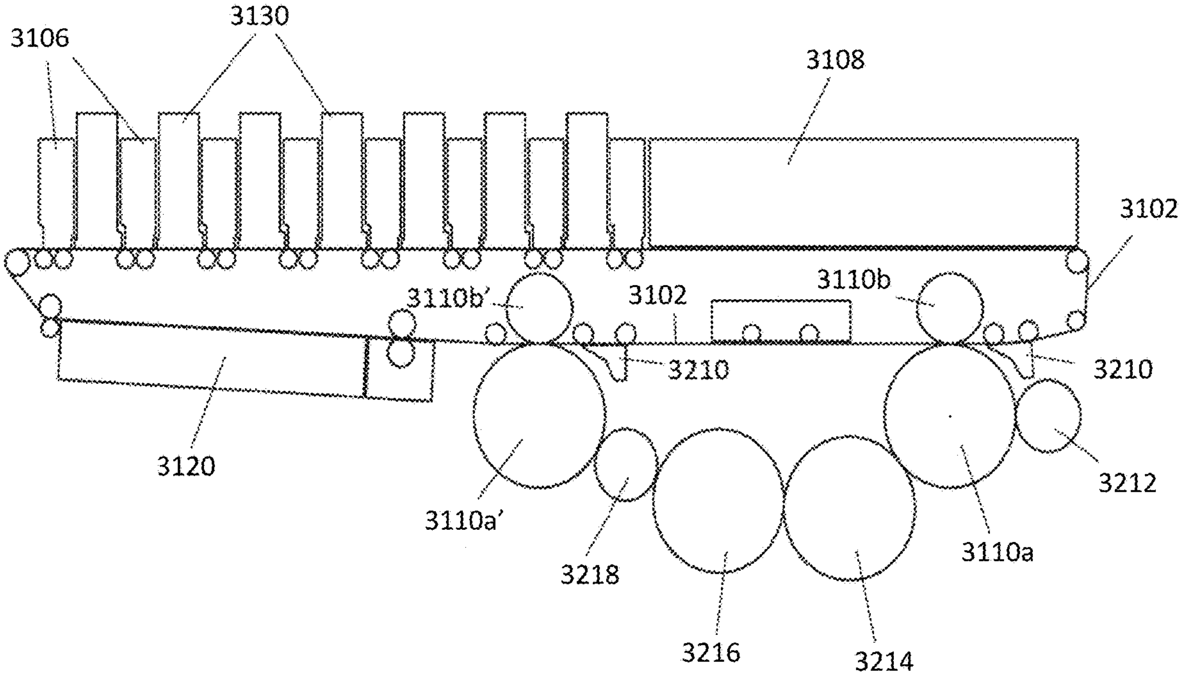
FIG. 1B is a view to an enlarged scale of part of the printing system of FIG. 1A.

The substrate transport system in FIG. 1B comprises a feed cylinder 3212 that feeds substrate sheets 3112 from the stack 3114 (not shown, but previously illustrated in FIG. 1A) to the impression cylinder 3110*a* of the first impression station, at which an image is printed on the front side of each sheet 3112. Two transport cylinders 3214 and 3216 have grippers that hold each sheet by its leading edge and advance each sheet in the manner shown in FIGS. 1C and 1D past a perfecting cylinder 3218. When the leading edge of a sheet 3112 on the transport cylinder 3216 reaches the position shown in FIG. 1C, its trailing edge separates from the transport cylinder 3216 and is caught by grippers on the perfecting cylinder 3218. What was until this point the leading edge of the sheet 3112 is then released by the grippers on the transport cylinder 3216 and the sheet is offered, reverse side up, to the grippers of the impression cylinder 3110*a*' of the second impression station. As well as turning each substrate sheet over, the perfecting cylinder 3218 also inverts the page orientation and this must be taken into account in the manner in which the ink images are formed on the belt 3102. Though the afore mentioned cylinders may each have more than one sets of grippers that could hold more than one sheet of substrate on their respective circumference, for clarity a single set of grippers is schematically illustrated as 3314 and 3314' in impression cylinders 3110*a* and 3110*a'*.

In order for the grippers at the downstream impression station to coincide with the trailing edge of the perfected substrate, the relative phase of the two impression cylinders can be adjusted as a function of the length of the substrate.

In order for an ink image to arrive at the second impression station 3110', it must be capable of passing intact through the first impression station 3110. For this reason, at least the first impression station 3110 must switch between two modes of operation. In the first, the belt 3102 is pressed against the substrate and image transfer takes place and in the second mode a gap remains between belt and the first impression cylinder so that the ink image intended for the second impression station may pass unscathed.

In some embodiments, switching between operating modes is effected by raising the axle of the pressure cylinder 3110*b*. This may be carried out by using two eccentrics (one at each end) to supporting the axle of the pressure cylinder and a motor for rotating the eccentrics to raise and the lower the pressure cylinder. Alternatively, the axle may be journalled in slide blocks that are moved by a linear actuator. Such an approach may be used when the compressible blanket on the pressure cylinder encompasses the whole, or the majority, of the circumference of the pressure cylinder 3110*b*.

In an alternative embodiment, the pressure cylinder 3110*b* is made with a larger diameter and the blanket overlies less than half of the circumference. In this case, the axis of the pressure cylinder may remain stationary as engagement between the pressure cylinder 3110*b* and the impression cylinder 3110*a* will only occur at times when the blanket on the pressure cylinder faces the impression cylinder and in any cycle of the pressure cylinder, the impression stage will alternate between the first and second modes of operation.

Figure 1C:
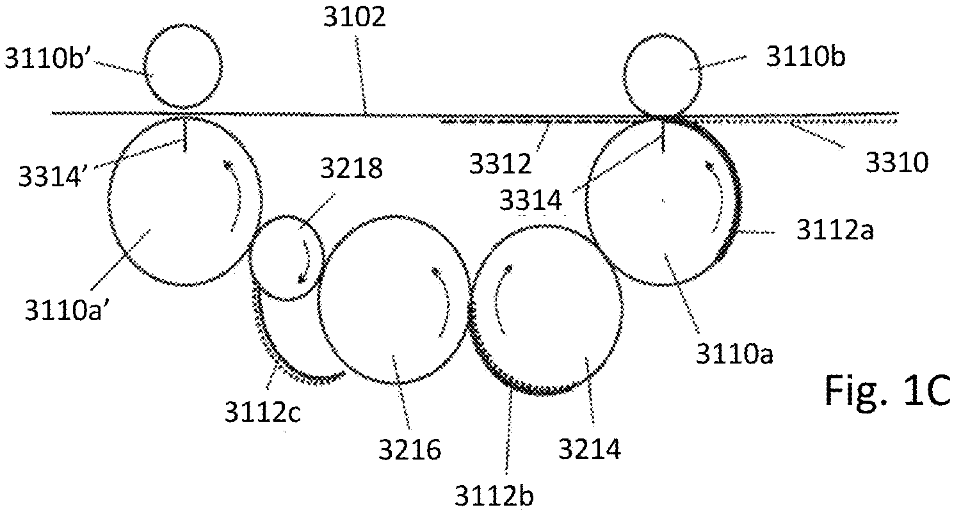
FIGS. 1C and 1D are schematic representations of the two impression stations in FIG. 1B at different times during the operating cycle.
Figure 1D:
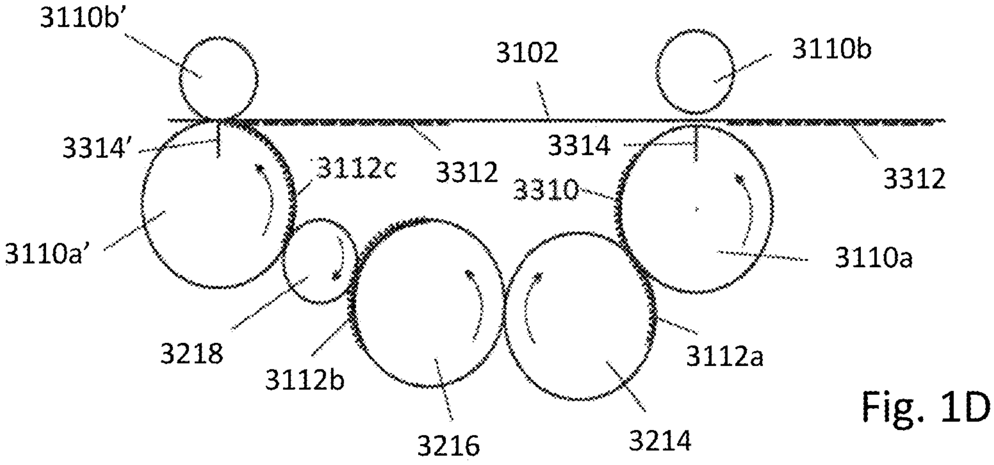

In FIGS. 1C and 1D, ink images to be printed on the front side of the substrate are represented by dots and those to be printed on the reverse side a represented by dashes. FIG. 1C shows the instant at which the nip between the pressure cylinder 3110*b* and the impression cylinder 3110*a* of the first impression station has just been closed. A substrate sheet 3112*a* on the impression cylinder is ready to receive the image 3310, represented by dots, and an image 3312, represented by dashes, has passed intact through the impression station while the nip was still open. At the same time, a sheet 3112*b* is supported front face down on the transport cylinder 3214 and a further sheet 3112*c* is in the process of being transferred from the transport cylinder 3216 to the perfecting cylinder 3218, the sheet 3112*c* being shown at the point where its trailing edge has been captured by the perfecting cylinder 3218 and its leading edge released by the grippers of the transport cylinder 3216.

Continued rotation of the various cylinders in the direction of the illustrated arrows results in the condition shown in FIG. 1D. Here, the nip of the first impression station has been opened to allow a new image 3312 to pass through. The sheet 3112*a* has been transported, front side up, to the transport cylinder 3214 and transferred onto the latter cylinder. The sheet 3112*b* has in the meantime been transferred to the transport cylinder 3216 and the sheet 3112*c* that was inverted by the perfecting cylinder 3218 is now supported by the second impression cylinder 3110*a*' ready to pass through the closed nip of the second impression station to receive the image 3312 onto its reverse side.

FIG. 1C shows the second impression station with its nip open and this avoids the surface of the belt being pressed against the impression cylinder 3110*a*' when no substrate sheet is present. While this is preferable to avoid wear of the belt and possible dirtying of the impression cylinder if any ink remains on the belt, it is not essential.

The spacing between the two impression stations is not critical to correct alignment of the images on the front and reserve sides of the substrate. The length of the path of the substrate sheets through the transport system needs only to match the spacing between the front and reverse ink images on the belt 3102 and this can be achieved by correct dimensioning of the diameters of the various cylinders 3214, 3216 and 3218 and the relative phasing of their grippers.

Discussion of FIGS. 2A-19

Embodiments of the present invention relate to novel techniques for reducing or eliminating such image non-uniformities. Towards this end, it is useful to print a digital calibration input image (DICI) having known properties (i.e. defined tone value as a function of pixel-location) and to compute correction data by analyzing the calibration ink image resulting from printing the digital calibration input image. The printing device then operates in accordance with the correction data, to reduce or eliminate image non-uniformity.

Figure 2A:
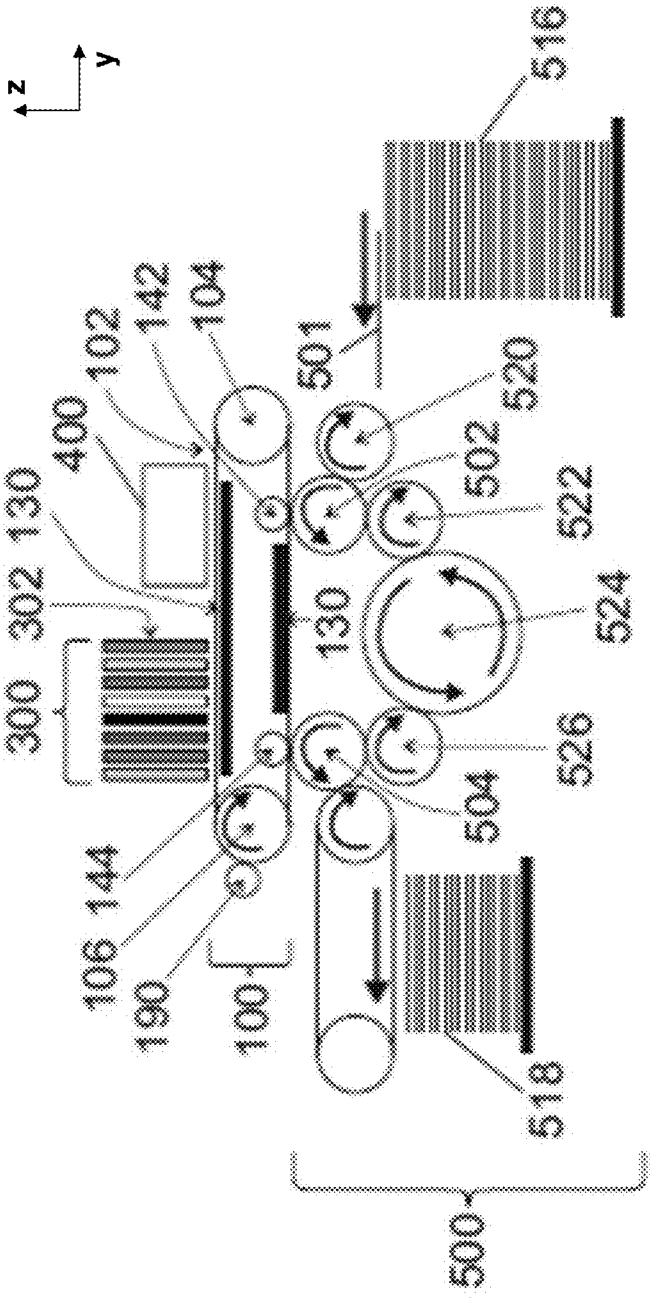
FIGS. 2A and 2C-2D schematically illustrate printing systems according to a second embodiment.
Figure 2B:
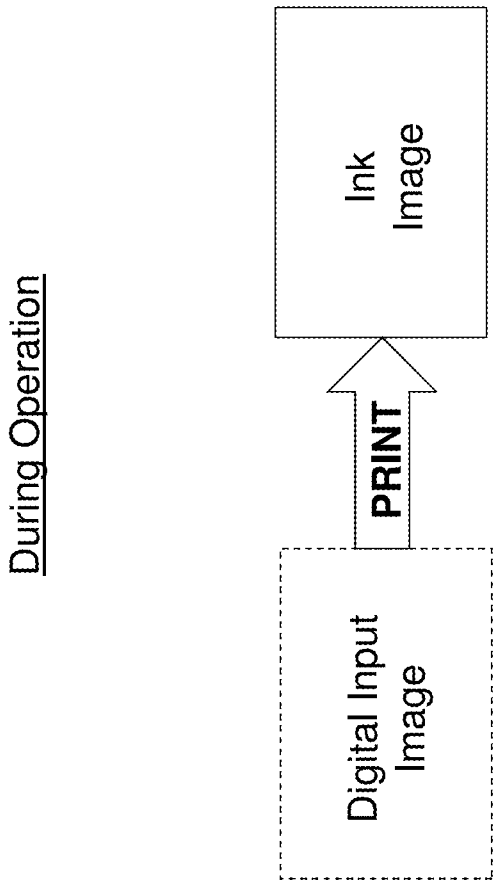
FIG. 2B is a flow chart of a method of operating a printing system according to a second embodiment.
Figure 5:
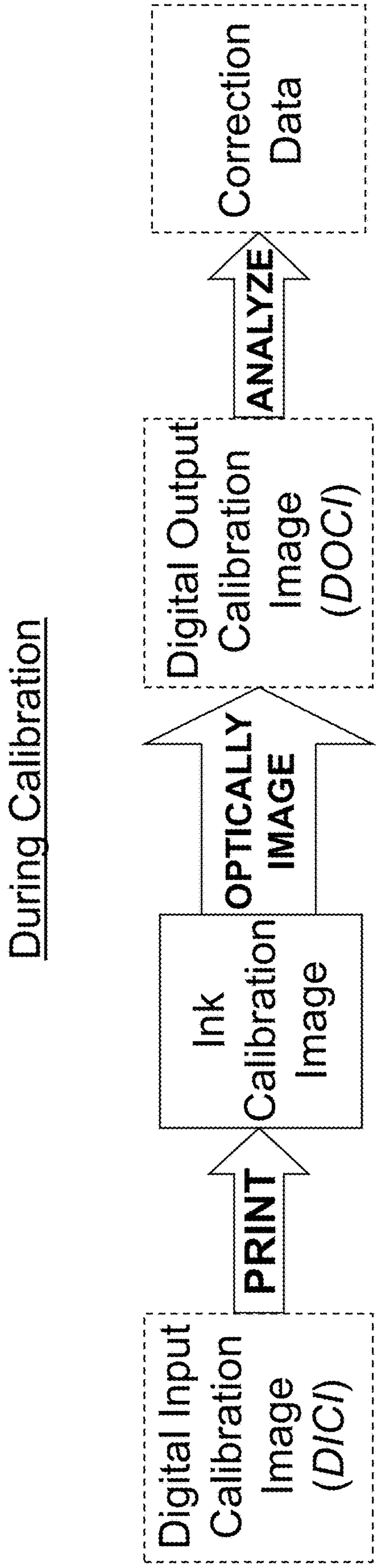
FIG. 5 is a flow chart of a method of calibration.

FIGS. 2B and 5 respectively illustrate operation and calibration of a printing system (i.e. implementing either an indirect printing process or a direct printing process). FIG. 5 relates specifically to calibration—FIG. 2B relates to operation both in the context of calibration and in other contexts. One particular type of digital input image that is printed according to the FIG. 2B is a 'digital input calibration image' (DICI). Non-limiting examples of DICI are discussed below, with reference to FIGS. 9A-9B.

As shown in FIG. 5, the ink image obtained by printing the DICI is referred to as an 'ink calibration image' and may be located either on an ITM or on substrate. The ink calibration image is optically imaged (e.g., scanned or photographed) to acquire a digital output calibration image (DOCI) (e.g., an array of pixels) stored in volatile or non-volatile computer memory or in other storage. The DOCI may be electronically analyzed to yield correction data. As noted above, the printing device then operates in accordance with the correction data, to reduce or eliminate image non-uniformity.

Figure 4:
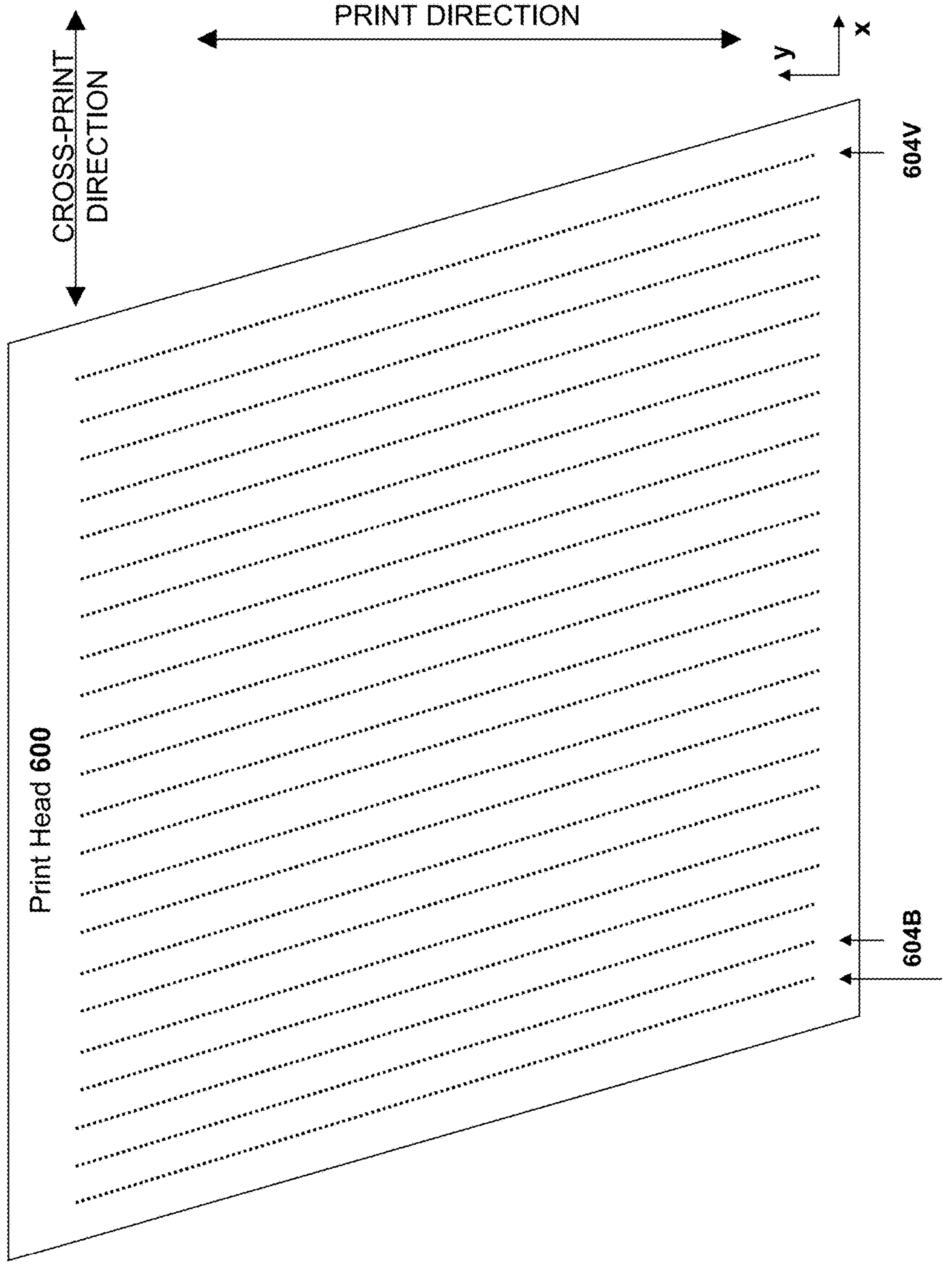
FIG. 4 schematically illustrates nozzles disposed on a print head.

Reference is made, once again, to FIG. 4. As illustrated in FIG. 4, a print head comprises a plurality of nozzles that may form an array of rows and columns with various possibilities of alignment or staggering. In the example of FIG. 4, the nozzles are arranged in lines 604A-604V. In the example of FIG. 4, these lines are 'diagonal' or slanted and are neither in the print direction nor in the cross-print direction.

Figure 3:
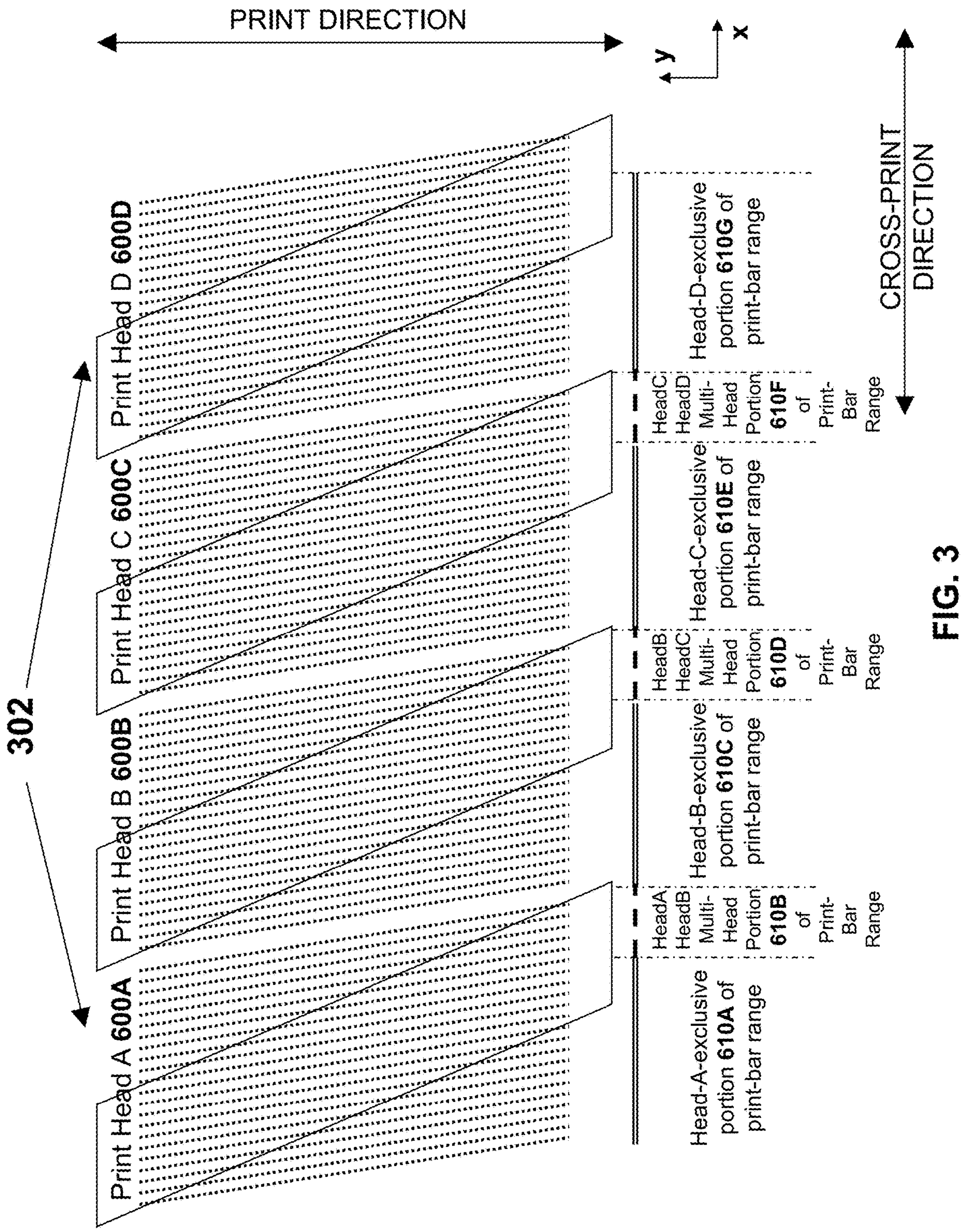
FIG. 3 schematically illustrates an array of print heads.

Referring to FIG. 3, it is noted that each print head of this particular example has a parallelogram shape—the nozzle lines in this example are parallel to two sides of the parallelogram. It is understood that print heads may have different shapes and be positioned in numerous manners in a print bar. Depending on shape and positioning, the nozzles of two adjacent print heads may either exclusively deposit ink droplets in separate segments of the target surface or deposit ink droplets in at least partially overlapping segments. For instance, print heads having square or rectangular shape if aligned to form a single contiguous row may never "interact" with one another as far as the resulting ink image is concerned, namely each affecting different segments and lacking overlap. Print heads with such shapes if aligned on two or more rows staggered among them, e.g., forming a "brick-wall" structure, may "interact" with one another, at least part of their respective nozzles being able to deposit ink droplets on overlapping segments of the target surface. Additional print head shapes that may result in overlapping ink deposition include for example triangles and trapezes which may be each alternatively positioned "head up" and "head down" along the length of a print bar. Print heads having rhomboid shape may also be aligned to form a larger rhomboid, portions of which heads may interfere with portions of adjacent print heads. Such situation where nozzles of one print head are so positioned in relation to nozzles on an adjacent head so that the ink droplets each may deposit can share overlapping segment of target surface is exemplified in FIG. 3.

The print bar 302 is disposed along the cross-print direction i.e. along the X-axis. In the example of FIG. 3, the print bar comprises multiple print heads immediately adjacent to each other and disposed along the axis defined by the cross-print direction.

The print bar spans a certain range along the cross-print direction—this is referred to as the "print bar range" $[x_{min}^{print\text{-}bar}, x_{max}^{print\text{-}bar}]$ or the print bar length. Typically, the print-bar range is commensurate with one dimension of the target surface, and for instance would suit at least one dimension of a sheet of substrate, or the width of a web-substrate, or the cross-print dimension of an ITM. The print-bar range $[x_{min}^{print\text{-}bar}, x_{max}^{print\text{-}bar}]$ may be divided into a plurality of subranges, for instance according to the number and/or geometry of the print heads. Thus, as shown in FIG. 3, the subrange of the print bar range (i.e. a portion of the X-axis) where print heads A-D are located includes the following seven portions: (i) Head-A-exclusive-portion 610A of print-bar range, (ii) Head A-Head B multi-head portion 610B of the print-bar range; (iii) Head-B-exclusive-portion 610C of print-bar range, (iv) Head B-Head C multi-head portion 610D of the print-bar range; (v) Head-C-exclusive-portion 610E of print-bar range, (vi) Head C-Head D multi-head portion 610F of the print-bar range; and (vii) Head-D-exclusive-portion 610G of print-bar range.

Thus, it is noted that (i) in the portion of the print bar 302 having an "x" coordinate within the subrange 610A, only ink droplets from print head A 600A are deposited on the target surface; (ii) in the portion of the print bar 302 having an "x" coordinate within the subrange 610B, a combination of ink droplets from print head A 600A and ink droplets from print head B 600B are deposited on the target surface; (iii) in the portion of the print bar 302 having an "x" coordinate within the subrange 610C, only ink droplets from print head B 600B are deposited on the target surface; (iv) in the portion of the print bar 302 having an "x" coordinate within the subrange 610D, a combination of ink droplets from print head B 600B and ink droplets from print head C 600C are deposited on the target surface; (v) in the portion of the print bar 302 having an "x" coordinate within the subrange 610E, only ink droplets from print head C 600C are deposited on the target surface; (vi) in the portion of the print bar 302 having an "x" coordinate within the subrange 610F, a combination of ink droplets from print head C 600C and ink droplets from print head D 600D are deposited on the target surface; and (vii) in the portion of the print bar 302 having an "x" coordinate within the subrange 610G, only ink droplets from print head D 600D are deposited on the target surface.

Figure 6:
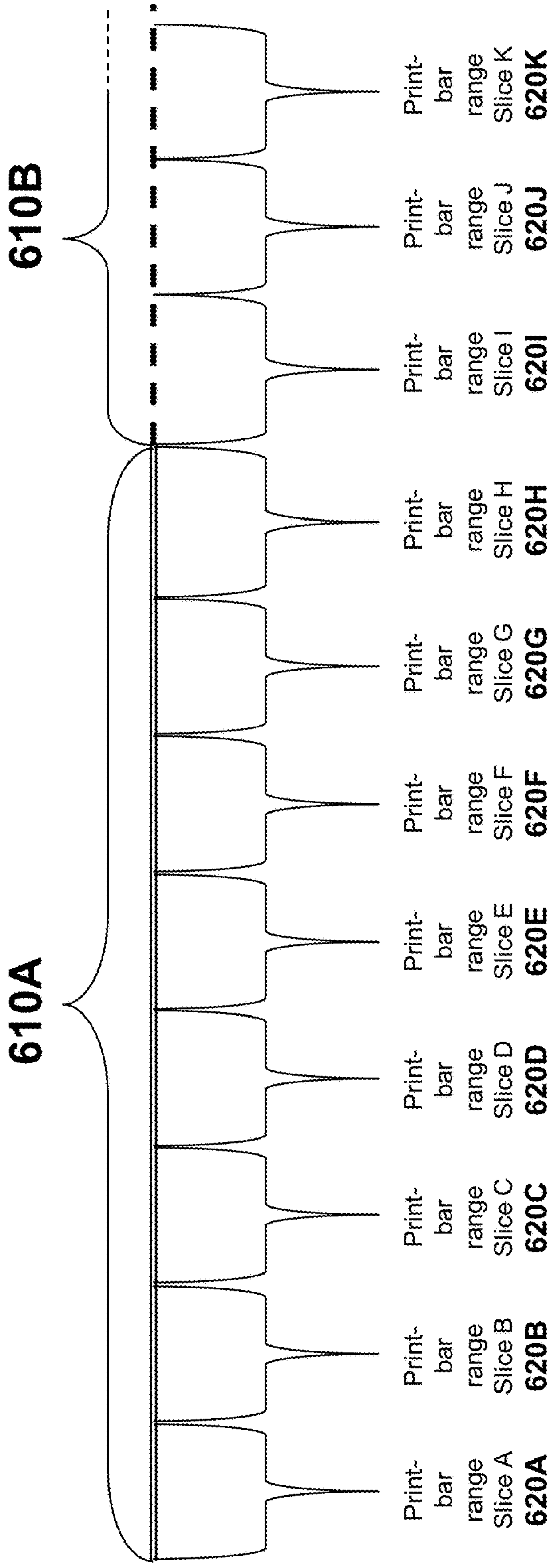
FIG. 6 illustrates slice ranges of a print-bar or portion thereof.

Reference is now made to FIG. 6. As illustrated in FIG. 6, the print-bar range $[x_{min}^{print\text{-}bar}, x_{max}^{print\text{-}bar}]$ may be divided into "smaller subranges" that are even smaller than the subranges 610A-610G described in FIG. 3. These smaller subranges are referred to as the print-bar range slices. FIG. 6 illustrates eleven such 'slices' 620A-620K, eight of which are within subrange 610A and three of which are within subrange 610B. In FIG. 6, the slices all have approximately the same thickness—this is certainly not a limitation, and only relates to that particular example.

The term 'slice' refers to a portion of any 'physical' image (i.e. ink image) or digital image (e.g., DICI or DOCI) defined by a sub-range in the cross-print direction. Thus, a 'slice' is an example of a 'region' or 'sub-region' or 'sub-range' of an ink or digital image. Unless specified otherwise, a slice may be of any thickness. A sub-slice of a slice is also, by definition, a slice. Particular examples of slices are discussed in the present disclosure.

The term 'mediating' slice will now be defined with respect to a first slice defined by a range $[x_{min}^{first}, x_{max}^{first}]$ in the cross-print direction, a second slice defined by a range $[x_{min}^{second}, x_{max}^{second}]$ in the cross-print direction, and a third slice defined by a range $[x_{min}^{third}, x_{max}^{third}]$ in the cross-print direction. In this example, if $x_{min}^{third} \geq x_{max}^{second} \geq x_{min}^{second} \geq x_{max}^{first}$, then the 'second slice' is said to be a 'mediating slice' between the first and third slice.

Figure 7A:
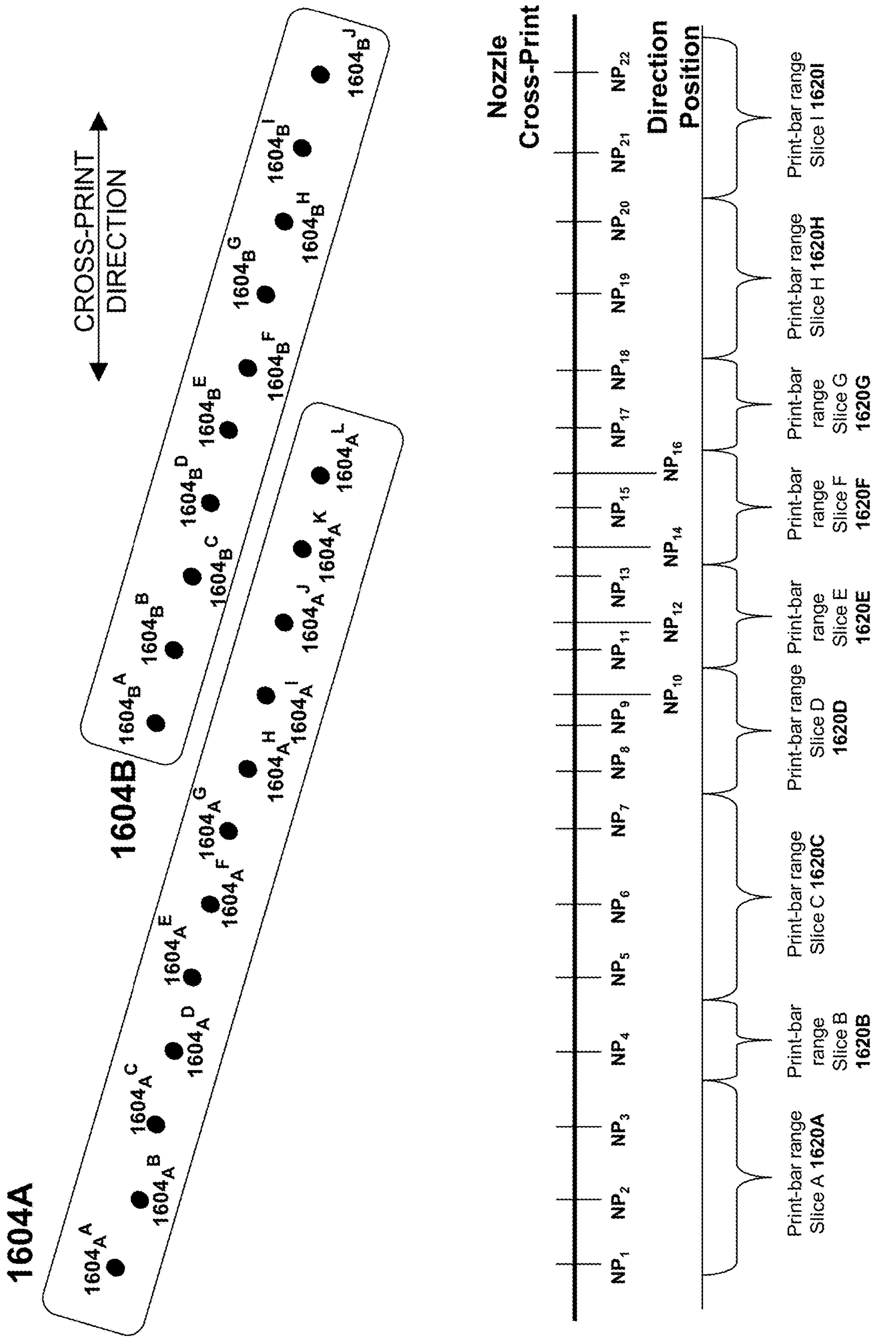
FIG. 7A-7B illustrate nozzle positions and print-bar ranges.
Figure 7B:
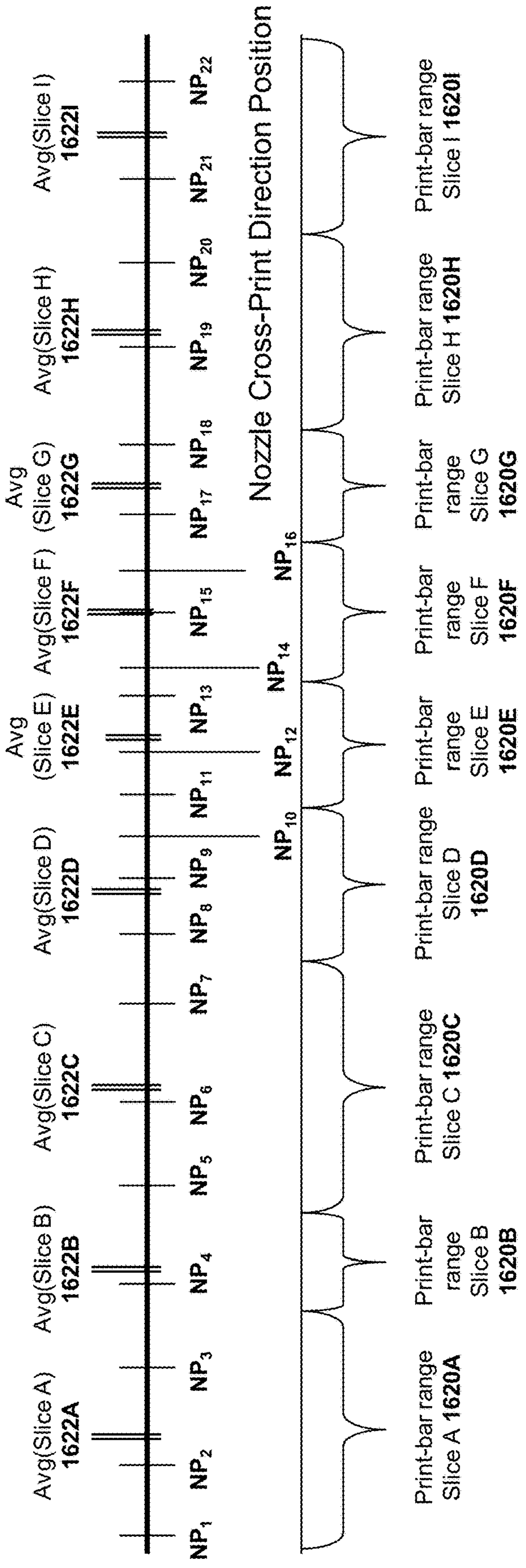

FIGS. 7A-7B refer to yet another example. FIG. 7A illustrates two print heads 1604A and 1604B. In the non-limiting example of FIG. 7A, print head 1604A includes 12 nozzles $\mathbf{1604}_A^A$-$\mathbf{1604}_A^L$ disposed along a first line and print head 1604B includes 10 nozzles $\mathbf{1604}_B^A$-$\mathbf{1604}_B^J$ disposed along a second line. In FIGS. 7A-7B "NP" is an abbreviation for 'nozzle position' (i.e. position in the 'cross-print' direction).

As illustrated in FIGS. 7A-7B, each nozzle has a position ($NP_i$) in the cross-print direction. Assuming that ink droplets are deposited directly beneath each nozzle, each nozzle position on the print head/print bar in the cross-print direction defines a cross-print-direction position of an "ink-image-pixel" in the ink-image that is printed to the target surface (i.e. substrate or ITM).

Twenty-two nozzles are illustrated in FIG. 7A—their respective positions in the cross-print direction from the view point of the target surface are marked as $NP_i$, where i is a positive integer between 1 and 22. Unless specified otherwise (or clear from the context), a nozzle 'position' relates to a position of the nozzle in the cross-print direction. By way of example, slice 1620A contains three nozzle-positions ($NP_1$-$NP_3$), while slice 1620B contains 1 nozzle-position ($NP_4$), and so on.

Also illustrated in FIGS. 7A-7B are 9 slices 1620A-1620I. Within the first slice 1620A are located the positions $NP_1$-$NP_3$ (i.e. positions in the 'cross-print direction') of 3 nozzles $\mathbf{1604}_A^A$-$\mathbf{1604}_A^C$; within the second slice 1620B is located the position $NP_4$ of a single nozzle 1604$_A^D$; within the third slice 1620C are located the positions $NP_5$-$NP_7$ of 3 nozzles 1604$_A^E$-1604$_A^G$; within the fourth slice 1620D are located the positions $NP_8$-$NP_{10}$ of 3 nozzles 1604$_A^H$, 1604$_B^A$ and 1604$_A^I$; within the fifth slice 1620E are located the positions $NP_{11}$-$NP_{13}$ of 3 nozzles 1604$_B^B$, 1604$_A^J$ and 1604$_B^C$; within the sixth slice 1620F are located the positions $NP_{14}$-$NP_{16}$ of 3 nozzles 1604$_A^K$, 1604$_B^D$ and 1604$_A^L$; within the seventh slice 1620G are located the positions $NP_{17}$-$NP_{18}$ of 2 nozzles 1604$_B^E$ and 1604$_B^F$; within the eighth slice 1620H are located the positions $NP_{19}$-$NP_{20}$ of 2 nozzles 1604$_B^G$-1604$_B^H$; and within the ninth slice 1620I are located the positions $NP_{21}$-$NP_{22}$ of 2 nozzles 1604$_B^I$-1604$_B^J$.

As illustrated in FIG. 7A, Slices A-Slices C 1620A-1620C are "single-print head slices"—within each of slices 1620A-1620C are only nozzle positions (i.e. position in the 'cross-print' direction) of nozzles of a single print head—in this case, of print head 1604A. Similarly, Slices H-Slices I 1620H-1620I are also "single-print head slices"—within each of slices 16220H-1620I are only nozzle positions of nozzles of a single print head—in this case of print head 1604B.

In contrast to slices 1620A-1620C and 1620H-1620I, slices 1620D-1620F are 'interlace' or 'stitch' slices. The interlace or stitch slices must include a sequence as follows (i.e. moving in a single direction in the cross-print direction): (i) a nozzle position of a nozzle of a first print head; (ii) a nozzle position of a nozzle of a second print head; and (iii) a nozzle position of a nozzle of the first print head. Thus, for example, for slice 1620D moving from left to right in the cross print direction as illustrated in FIG. 7A, are the following nozzle positions (i) $NP_8$ (i.e. corresponding to the position of nozzle 1604$_A^H$ of print head 1604A) (ii) $NP_9$ (i.e. corresponding to the position of nozzle 1604$_B^A$ of print head 1604B) and (iii) $NP_{10}$ (i.e. corresponding to the position of nozzle 1604$_A^I$ of print head 1604A). Thus, slice 1620D is characterized by the nozzle-position sequence $\{NP_8, NP_9, NP_{10}\}$, by the nozzle sequence {1604$_A^H$, 1604$_B^A$, 1604$_A^I$}, and by the print-head sequence {1604A, 1604B, 1604A}.

Thus, generally speaking a 'stitch' or 'interlace slice' is characterized by the print head sequence { . . . X . . . , Y . . . , X . . . } where X is a first print head and Y is second print head different from the first print head. Specific examples sequences that comply with the { . . . X . . . , Y . . . , X . . . } pattern include but are not limited to: (i) {X, Y,X}; (ii) {Y,Y,Y,X,Y,X}; (iii) {X,X,X,Y,X}; (iv) {X,Y,Y, Y,X}; (v) {X,Y,X,Y,X}; and so on.

Similarly, for a set of positions $\{POS_1,POS_2\}$ where every position corresponds to a nozzle position of a print head X or a print head Y, the set of positions is an 'interlace' or 'stitch set' is the set is characterized by the print head sequence { . . . X . . . , Y . . . , X . . . }.

Figure 8A:
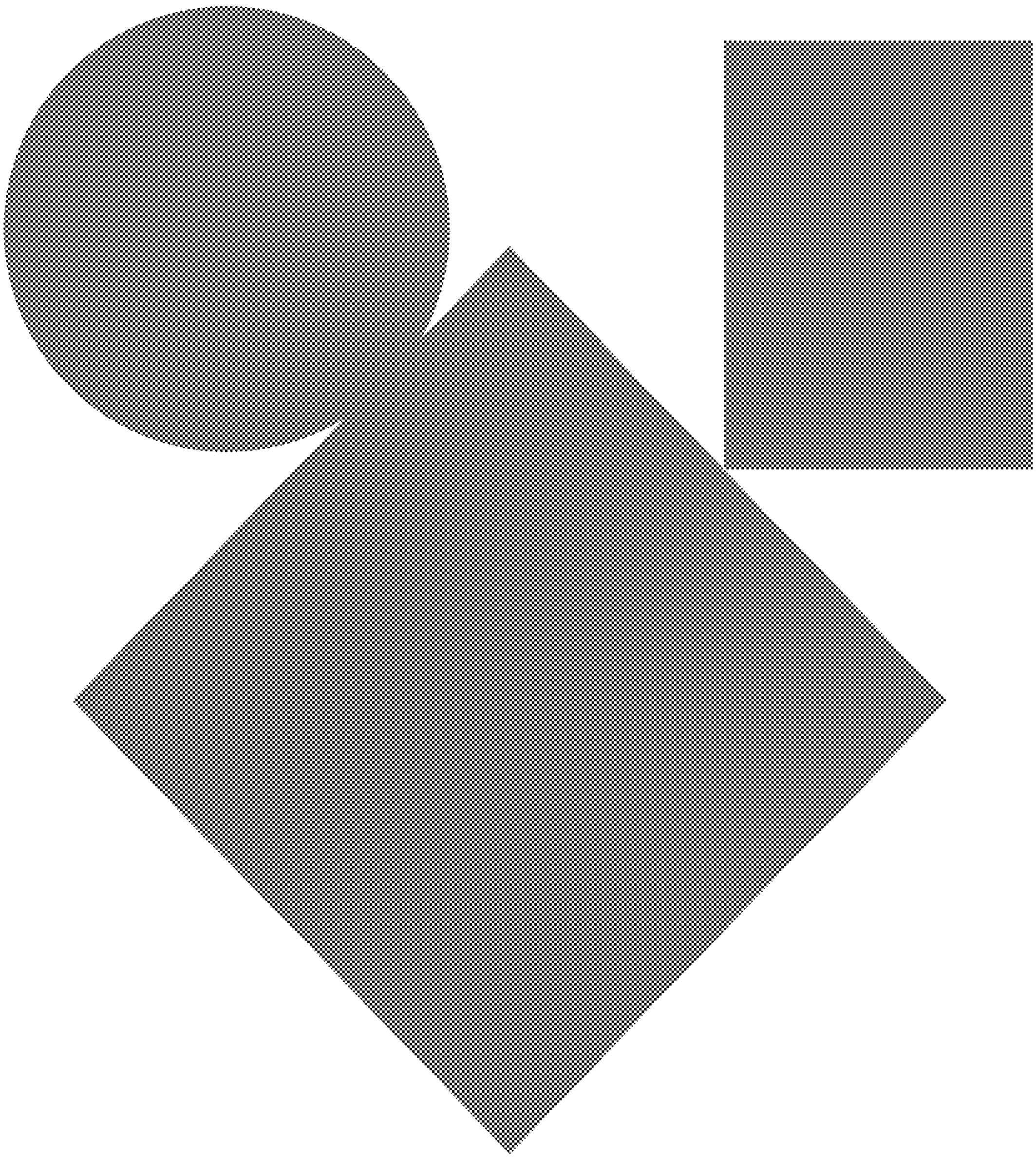
FIG. 8A illustrates an arbitrary image.
Figure 8B:
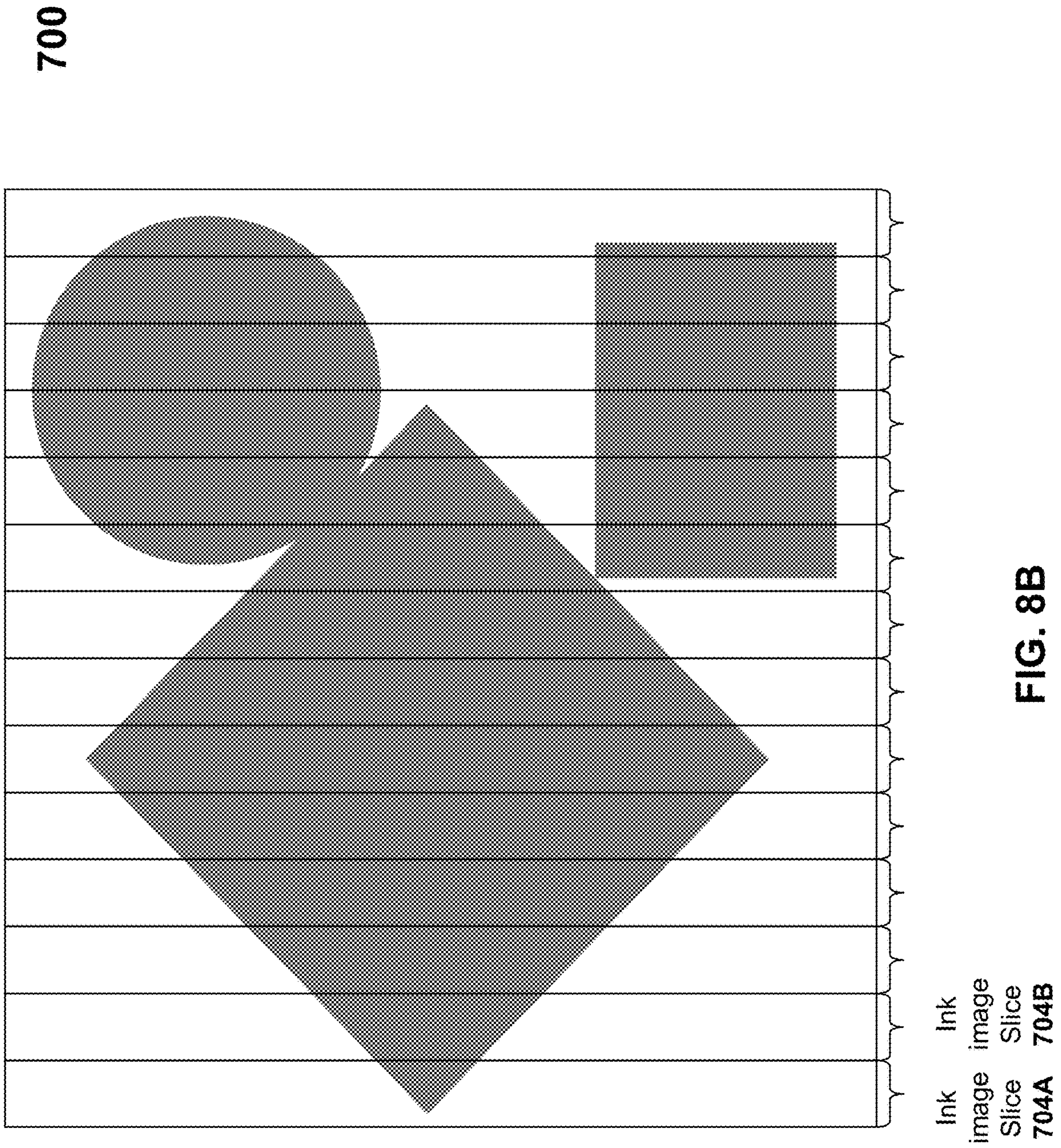
FIG. 8B illustrates slices of the arbitrary image.

As shown in FIG. 7B, each slice has an average position in the cross-print direction. The average position of slice A 1620A is labeled as 1622A, the average position of slice B 1620B is labeled as 1622B, and so on. FIG. 8A illustrates an arbitrary ink-image 700 formed on an ITM or on a substrate. FIG. 8B illustrates the same arbitrary ink-image divided into 'ink-image slices.' The ink-image slices of FIG. 8B correspond to the print-bar range slices of FIG. 7. In particular, ink-image slice 704A is formed only by nozzles disposed within print-bar range slice 1620A, ink-image slice 704B is formed only by nozzles disposed within print-bar range slice 1620B, and so-on. Every image, no matter what its content, may be divided into ink-image slices (e.g., having a central or elongate axis along the 'print direction') that correspond to ink deposited from nozzles in corresponding print-bar range slices.

Figure 9A:
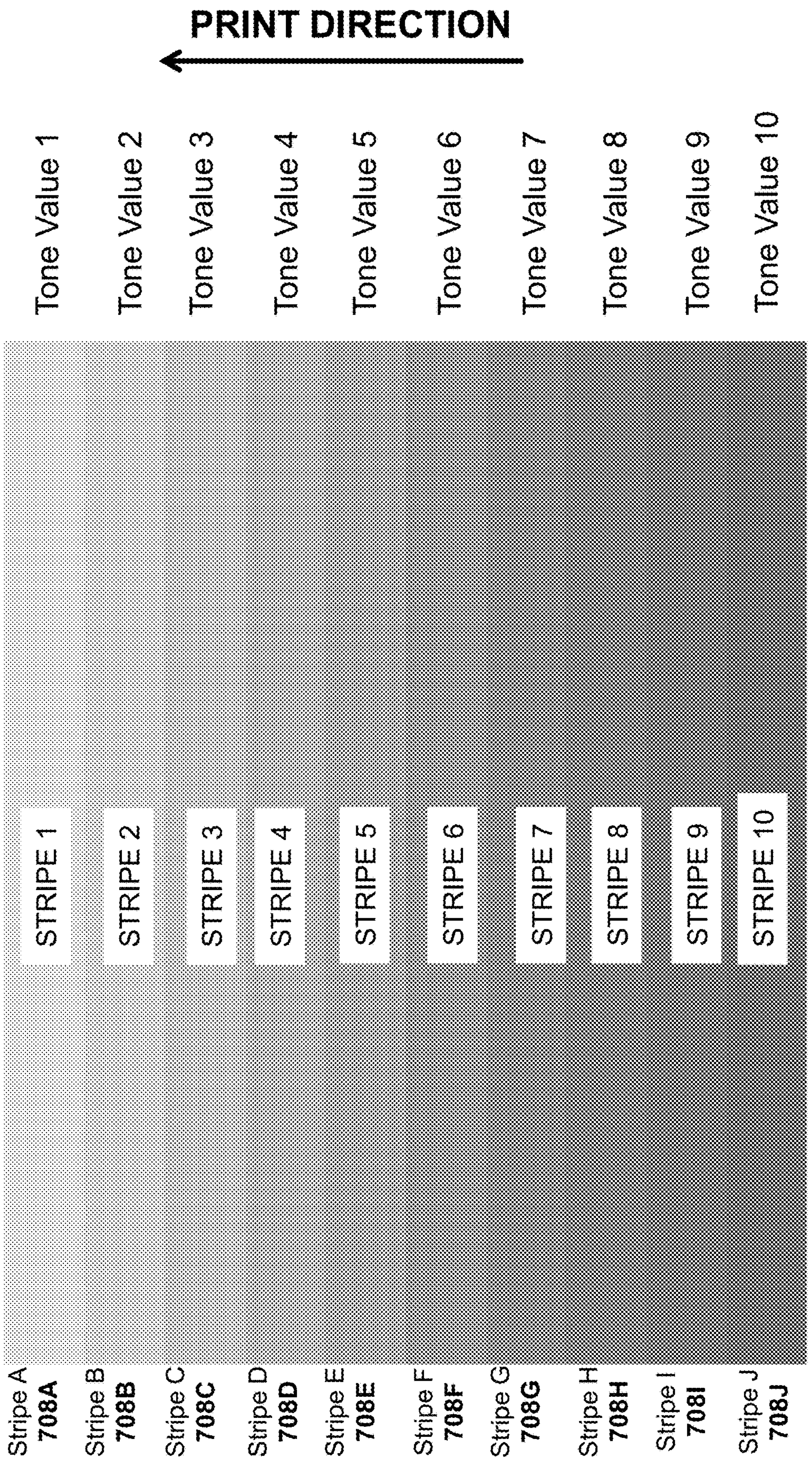
FIG. 9A illustrates a calibration image.

FIG. 9A illustrates a multi-stripe digital input image that is particularly useful as a digital input calibration image (DICI). The image is divided into a plurality of stripes oriented along the cross-print direction. A specific method for computing correction data (see FIG. 5) is now explained in terms of the non-limiting example where the digital image of FIG. 9A is the digital input calibration image (DICI). It is appreciated that the DICI of FIG. 9A is only one specific example of a DICI and is not intended as being limiting.

The stripe divisions of FIG. 9A, illustrated by 708A to 708J, are on the basis of position in the 'printing direction' and according to tone value. As was the case for the image of FIG. 8A, it is possible to further divide the image into slices, illustrated by 704A-704H in FIG. 9B, according to position in the cross-print direction. Because of the unique multi-stripe structure of the image of FIG. 9A, the further slice-subdivision of FIG. 9B yields a plurality of tiles $TILE_A^A$ . . . $TILE_H^J$ numbered as 712(A,A) . . . 712(H,J). In the specific example of FIG. 9B, 80 tiles are defined—80 being the product of the number of slices (8) and the number of stripes (10).

Each stripe of the digital image of FIG. 9A has a uniform tone value. In the non-limiting example of FIG. 9A, the digital input image has 10 stripes at 10 different tone-values. Because the tone-value of each stripe in the digital image is uniform, the average tone value within each tile within a specific stripe is necessarily equal to the average tone value of the slice as a whole. For the digital image, the respective tile-averaged tone values of each tile for all tiles within a particular stripe are all equal to each other.

When the digital image of FIG. 9A is printed to form the ink-image, the resulting image generally has the form of the digital image original—i.e. a plurality of generally monotonic stripes. However, due to printing non-uniformities associated with the physical printing, the properties of the digital image described in the previous paragraph do not necessarily hold for the ink-image (i.e. where luminance values of the ink-image are considered instead of tone-values). Instead, the luminance value within each stripe may fluctuate. Furthermore, when each stripe of the ink-image is divided into analogous tiles (i.e. according to the same slice-ranges used for the digital input image of FIG. 9B), tiles within each of the stripes do not necessarily share same tile-averaged luminance value, as was the case for the corresponding digital input image of FIG. 9B (i.e. where tile-average tone values were considered). In contrast to the corresponding digital input image, there can be a variation among the tile-average luminance values, due to non-uniform luminance within each stripe.

Generally speaking, each tile within a stripe has both (i) an average position x in the cross-print direction (i.e. if the tile is defined by a slice having a range $[x_A,x_B]$ in the cross print direction the average position x in the cross-print direction is $(x_A+x_B)/2$); and (ii) an average luminance value. Thus, N tiles (where N is a positive integer) are characterized by N points—these points are defined as ordered pairs (x,y) where x=the average cross-print-direction position of the each given tile and y=the average luminance value within the tile.

Figure 10:
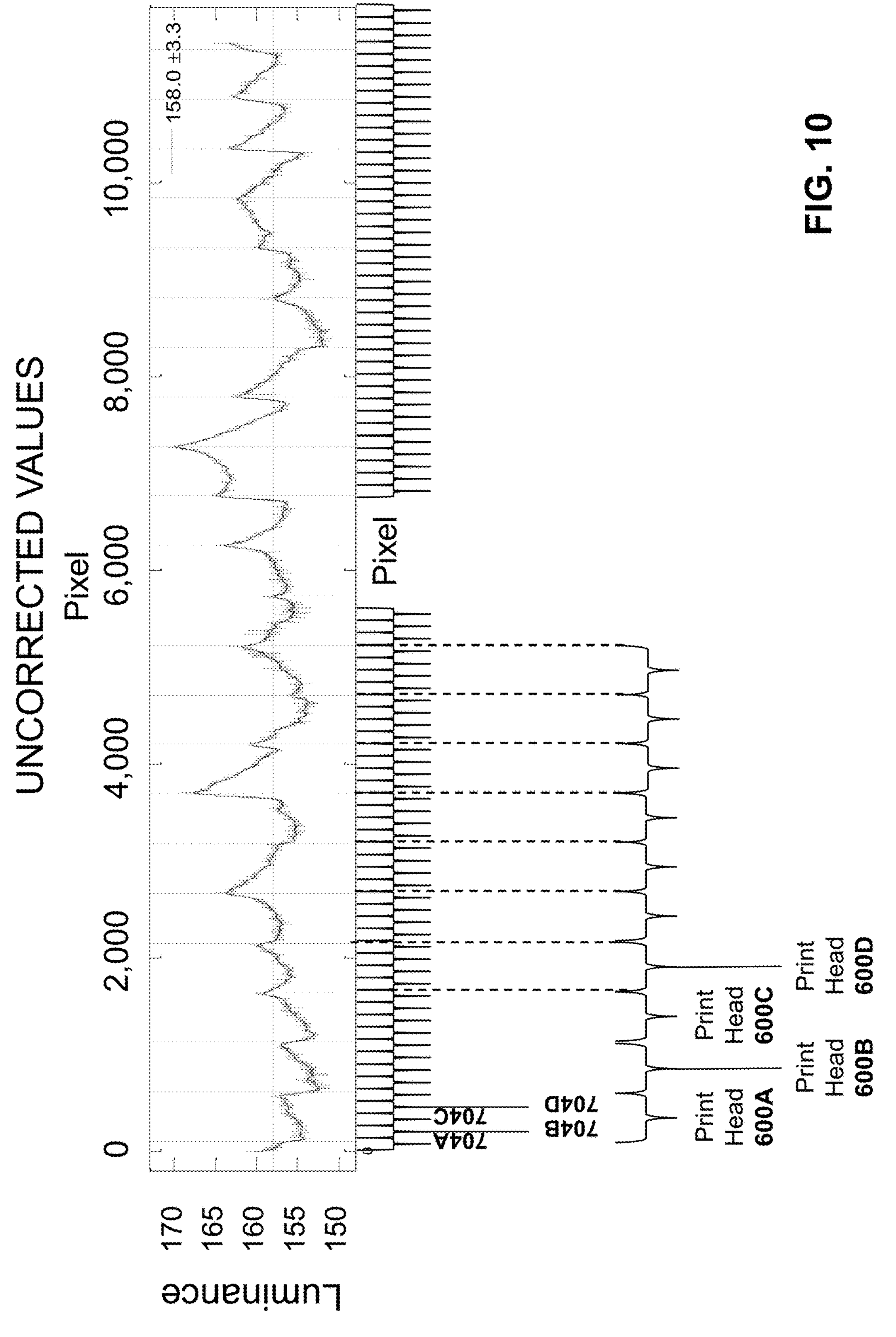
FIG. 10 illustrates luminance as a function position in the cross-print direction for the case of a uniform tone value for an uncorrected image.

FIG. 10 illustrates for an ink image on a printing 'target surface' (i.e. substrate or ITM) the luminance as a function of cross-print-direction position for an example stripe having a tone-value and/or 'intended luminance' of about 158.0. Due to non-uniformity effects, the luminance is not, in fact, constant, but rather fluctuates (standard deviation=3.3 tone value) as a function of position in the cross-print-direction, as shown in FIG. 10.

FIG. 10 was generated by: (i) printing the digital input calibration image (DICI) illustrated in FIG. 9 on a printing substrate (e.g., indirectly through an ITM); (ii) digitizing (e.g., scanning) the ink calibration-image to generate a digital output calibration image (DOCI); (iii) dividing a single stripe of the DOCI of the ink-image into N tiles (not necessarily of the same size); (iv) computing the respective tile-average luminance value for each of the tiles to generate N points (i.e. defined as ordered pairs (x,y) where x=the average cross-print-direction position of the each given tile and y=the average luminance value within the tile) and (v) interpolating luminance in the cross-print direction.

FIG. 10 also illustrates how the print bar length could be divided in subranges, some corresponding to the print heads, exemplified in the figure by 600A to 600 D, other corresponding to further subdivision into smaller slices, exemplified in the figure by 704A to 704D. The width of a slice can be selected for any printing system according to each print bar and constituting print heads. In various embodiments, a slice has a width of no less than 4 pixels and optionally no more than 64 pixels, but this need not be limiting.

For an ideal printing system under ideal conditions, the graph of FIG. 10 is a flat line at constant or "uniform" luminance value. Embodiments of the present invention relate to techniques for correcting for the non-uniformities similar to those presented in FIG. 10. Towards this end (and as discussed above with reference to FIGS. 2B and 5), a two stage method is described: the first stage is a calibration stage where an ink-output is analyzed to generate correction data and the second stage is an 'online' printing stage where the correction data is employed to reduce non-uniformities of the type presented in FIG. 10.

Figure 11:
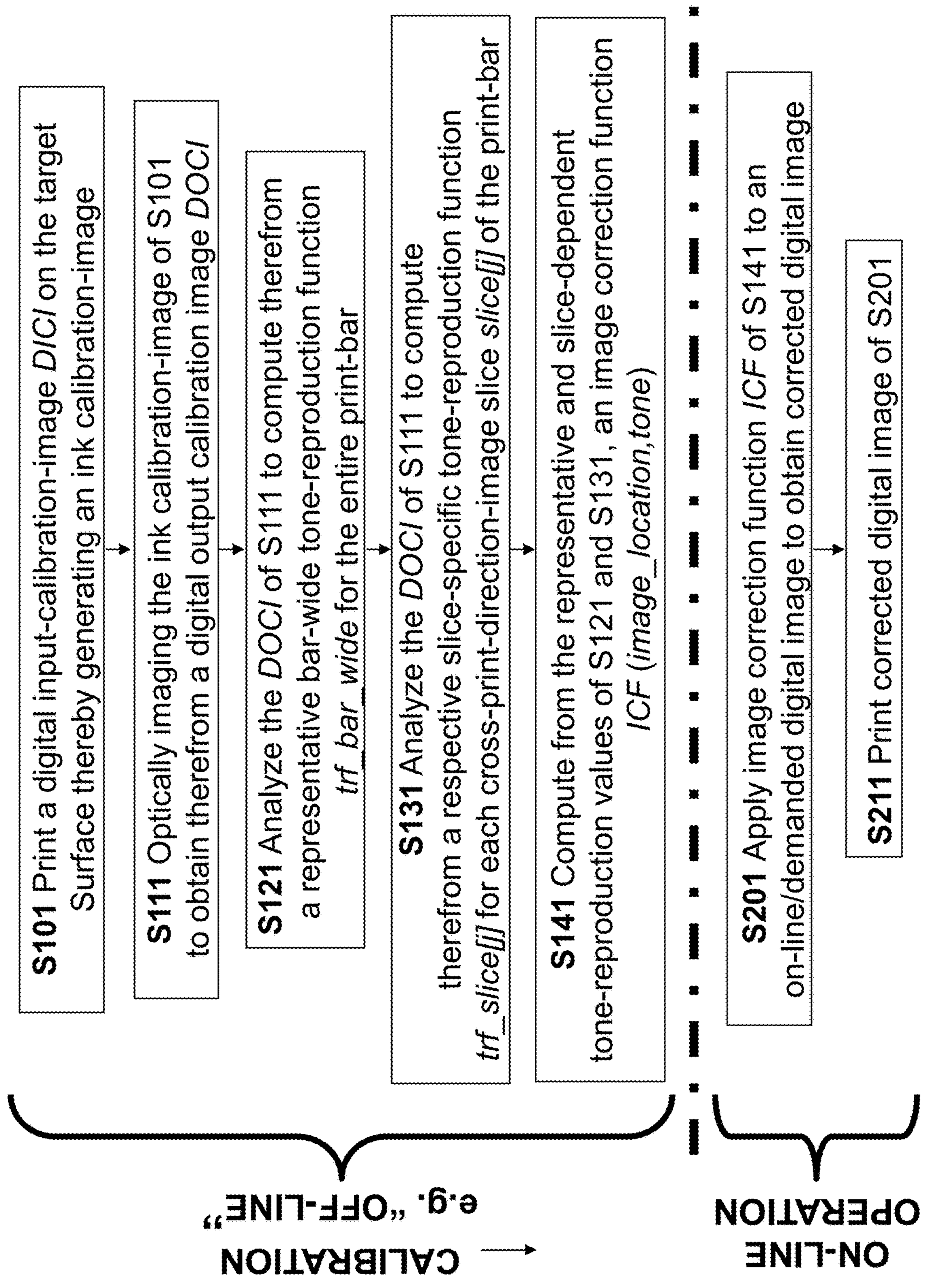
FIGS. 11-13 and 15 are flow charts related to image calibration and/or printing.

Calibration—FIG. 11 is a flow chart of a method for calibration of a digital printer and subsequent on-line operation. FIGS. 12-15 relate to individual steps in FIG. 11. FIGS. 11-15 will now be explained in terms of the digital image of FIGS. 9A-9B—however, once again it is noted that this is just an example and not intended as limiting.

The calibration stage (i.e. steps S101-S141) is based upon computing tone reproduction functions. In particular, it is possible to compute both (i) a print-bar wide tone reproduction function (see step S121 and FIG. 12 which is an example implementation of step S121) and (ii) a slice-specific tone reproduction functions for multiple slices in the cross-print direction see step S131 and FIG. 13 which is an example implementation of step S131). Although the calibration image of FIG. 9A is not a limitation, techniques for computing the tone-reproduction functions will be explained in terms of the example of FIG. 9A.

In step S101 of FIG. 11, a digital input-calibration-image DICI (e.g., that of FIGS. 9A-9B) is printed on the target surface to generate an ink calibration-image. In step S111, the ink calibration-image is optically-imaged (e.g., scanned or photographed) to obtain therefrom a digital output-calibration-image DOCI. In steps S121-S141 the digital output-calibration-image DOCI is analyzed to generate calibration data. More specifically, (i) in steps S121 and S131 tone reproduction functions are computed; and (ii) in step S141, an image correction function ICF is computed from the tone reproduction functions.

The skilled artisan will appreciate that a 'tone reproduction function' describes the luminance obtained (i.e. by printing) in an ink image as a function of the tone-value in the digital image.

FIG. 11 explains calibration and correction stages in terms of 'off-line' and 'on-line.' This is not a limitation as far as the former stage is concerned—any presently disclosed teaching may be implemented in the context of off-line calibration or on-line calibrations (e.g., instead of printing a single calibration image on a single target surface, different portions of the calibration image may be printed on different target surfaces, or portions thereof, or at different locations on a single target surface. Any reference herein to 'off-line' is therefore understood that 'off-line' is just a particular example of calibration stage. Additionally, 'off-line' and 'on-line' calibration may be combined. For example, 'off-line' calibration may be conducted by printing a single calibration image on a single target surface to establish a first correction function, the efficacy of which may be subsequently monitored and/or ascertained using portions of a calibration image (e.g., same or different from first 'off-line' calibration image) printed on portions of different target surfaces (e.g., on the margins surrounding a desired image, to be possibly trimmed off if desired). The data acquired through 'on-line' calibration, possibly in a 'portion-wise' manner on different target surfaces, can be combined to form a 'complete' calibration image to be analyzed as described in the exemplified context of 'off-line' calibration. Such 'on-line' calibration may prompt the generation of a second correction function.

Print-bar-wide tone reproduction function (FIG. 12)—The DOCI (i.e. that was generated in step S111) is analyzed in step S121 (e.g., by electronic circuitry) to compute a representative bar-wide tone-reproduction function trf_bar_wide for the entire print bar.

Figure 12:
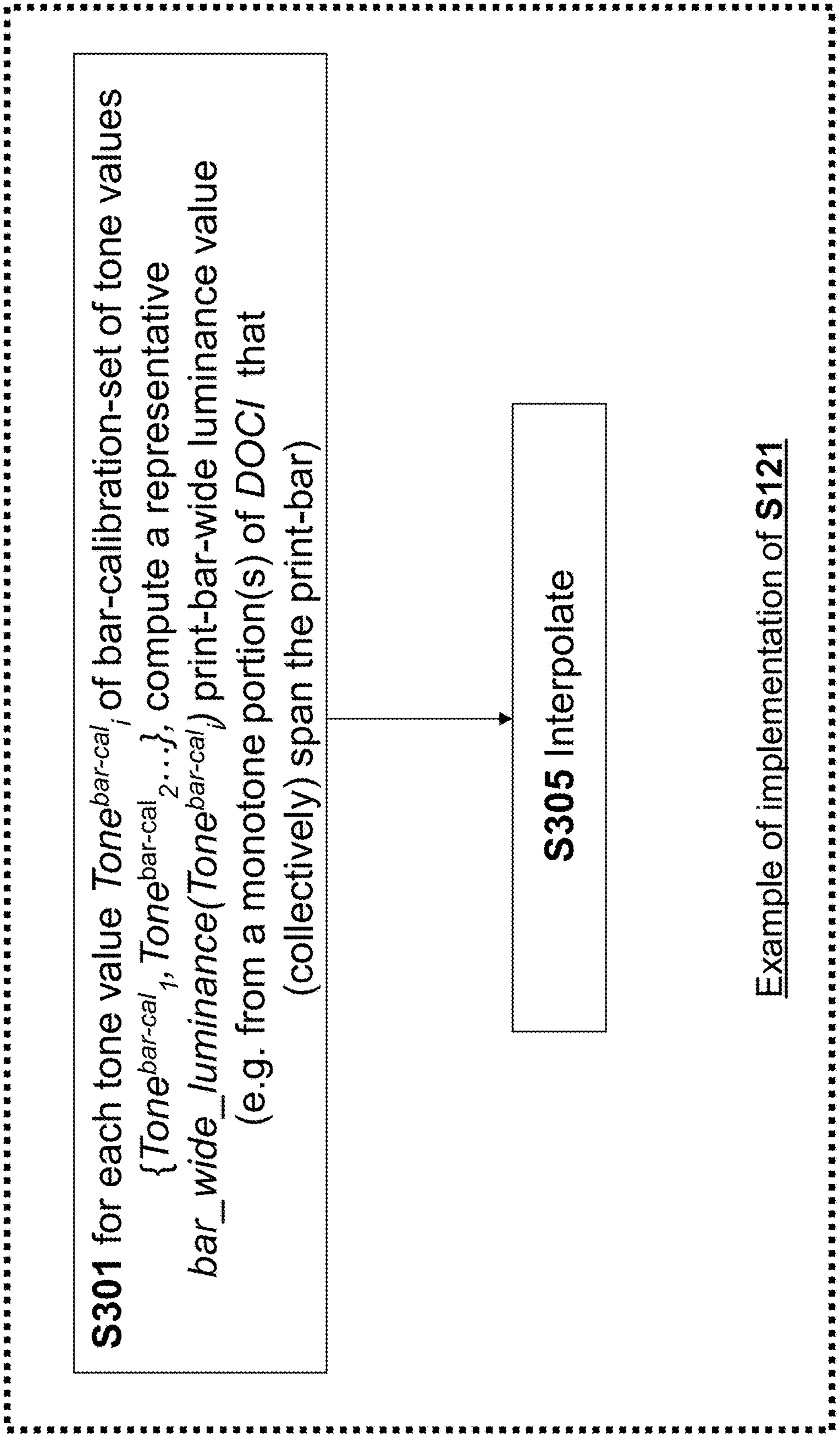

FIG. 12 describes one example of a technique for computing a bar-wide tone-reproduction function trf_bar_wide for the entire print bar. Reference is made to step S301 of FIG. 12. For the non-limiting example of FIG. 9A, there are 10 tone values—thus the cardinality of the bar-calibration-set of tone values $\{Tone_1^{bar\text{-}cal}, Tone_2^{bar\text{-}cal} \ldots\}$ is 10 where $Tone_i^{bar\text{-}cal}$="Tone Value i" (for i=1 . . . 10 where Tone Value 1, Tone Value 2 . . . Tone Value 10 explicitly appear in FIG. 9A). Thus, when the DICI is that presented in FIG. 9A, in step S301 of FIG. 12, 10 ordered pairs are generated from the DOCI derived from this DICT. These 10 ordered pairs are $\{(x_1,y_1),(x_2,y_2) \ldots (x_{10},y_{10})\}$ where for any integer i between 1 and 10, $x_i$=Tone Value i and $y_i$=the average luminance in the $i^{th}$ stripe of the DOCI image derived from the DICI of FIG. 9A. Collectively, these 10 ordered pairs represent the print-bar-wide tone reproduction function.

For the example case of FIG. 9A, each stripe spans the entire image in the cross-print direction and is thus 'print-bar-wide.' Thus, the average luminance value within a particular stripe is one example of a 'print-bar-wide luminance value' of a specific tone value (i.e. the digital input image tone value). Thus, the previous paragraph describes how (for the example of FIG. 9A), a respective representative print-bar-wide luminance value is computed for each tone value (in this example, 10 tone values).

These ordered pairs ($Tone_i^{bar\text{-}cal}$, representative_bar_wide_luminance($Tone_i^{bar\text{-}cal}$)) (there are 10 of these pairs for the current example) may be said to represent the print-bar-wide tone reproduction function. Nevertheless, the function value is exactly represented only for 10 tone values. However, it is possible to interpolate between (or extrapolate past) these tone values and thus the print-bar-wide tone reproduction function may be computed for any arbitrary tone value from the ordered pair representation of the tone reproduction function.

For the present disclosure, a "representative" value of luminance (or of any other parameter) is some central tendency value (e.g., a first-order statistical moment such as an average, or a median value or any other representative value (e.g., a first statistical moment) known in the pertinent art).

Figure 14:
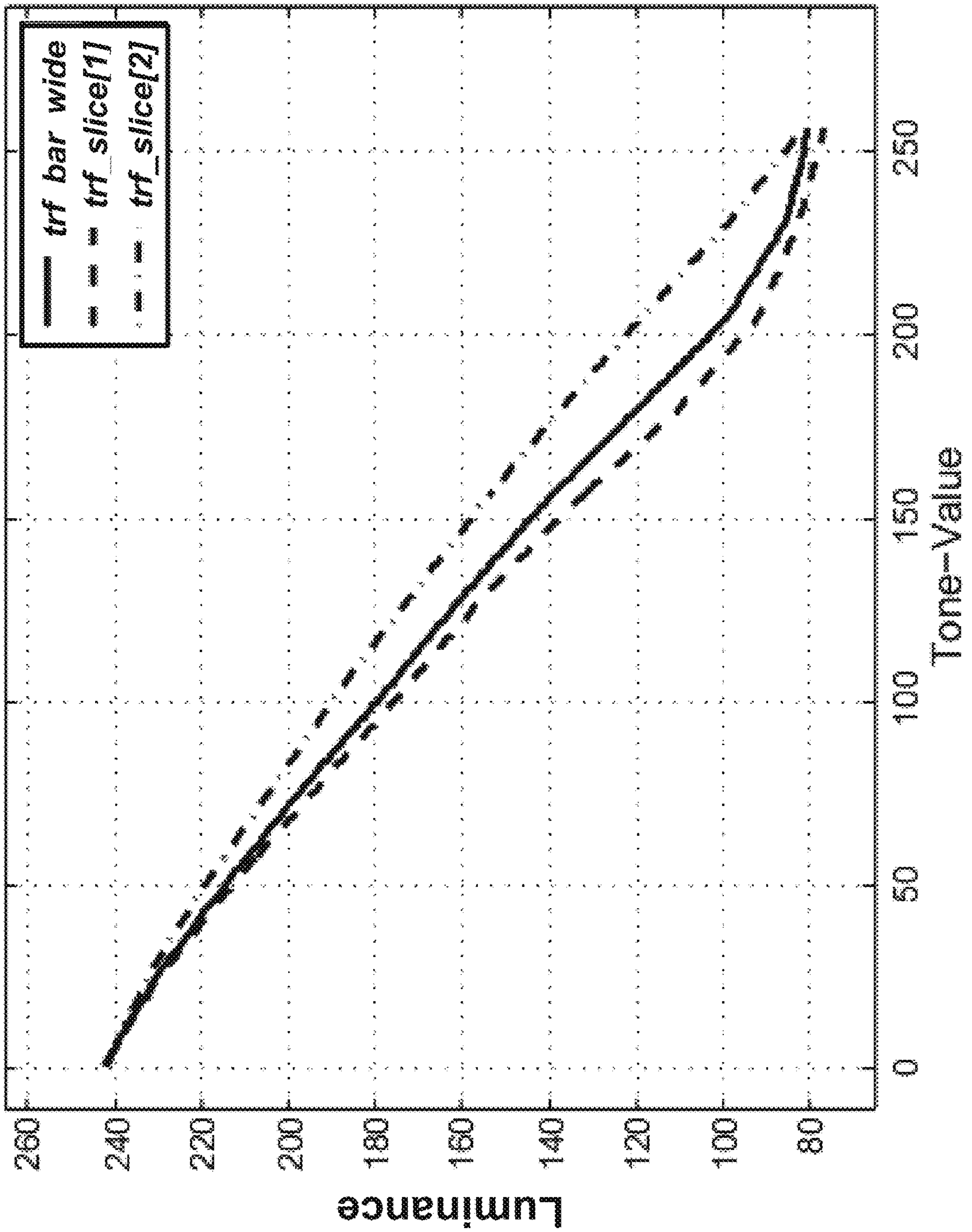
FIG. 14 illustrates both bar-wide and slice-specific TRF functions.

FIG. 14 is a graph of three tone reproduction functions—the tone reproduction function in the solid line is a bar-wide tone-reproduction function of the entire print bar.

Slice-Specific tone reproduction functions (FIG. 13)—The DOCI (i.e. that was generated in step S111) is analyzed in step S131 (e.g., by electronic circuitry) to compute a plurality of slice-specific tone-reproduction functions specific to each slice. For the non-limiting example of FIG. 9B, (i) 8 slice-specific tone reproduction functions are computed for slices 704A-704H; (ii) each tone reproduction function is represented by 10 ordered pairs (tone value, average luminance value within a tile), where it is possible to interpolate between or extrapolate from the values of the 10 ordered pairs.

Figure 9B:
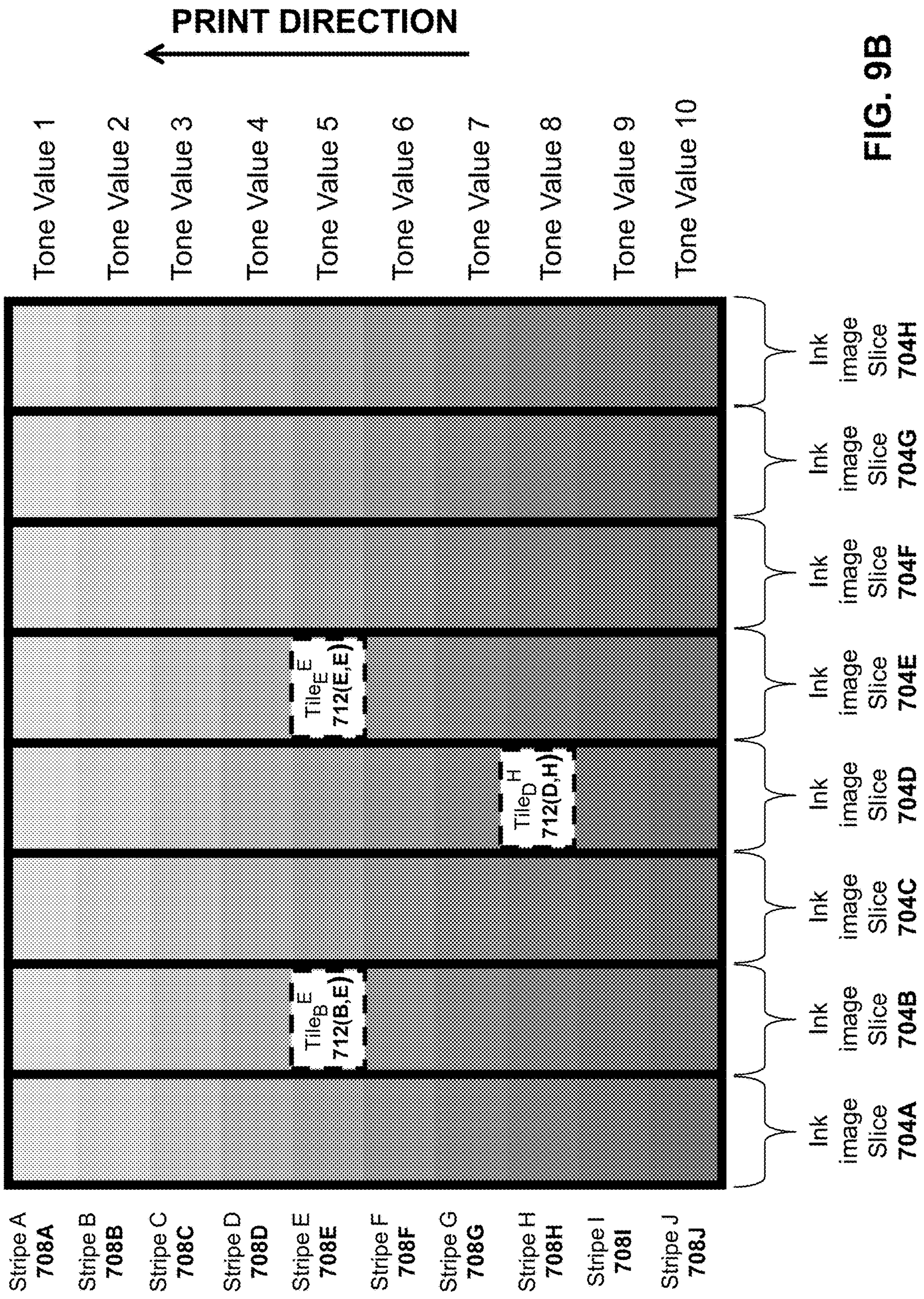
FIG. 9B illustrates slices of the calibration image.

For the non-limiting example of FIG. 9B, 8 slices 704A-704H collectively span the cross-print direction/the print-bar. For each slice slice[j], it is possible to compute a respective slice-specific tone-reproduction function trf_slice [j].

Thus, with reference to the non-limiting example of FIG. 9B, it is noted that the first slice 704A slice[1] of the DOCI can be subdivided into 10 tiles: $TILE_A^A$ . . . $TILE_A^J$. Each of these tiles is associated with a respective tone value of the 10 tone values in FIG. 9A. For each of these tiles, it is possible to compute a respective tile-averaged luminance value.

Figure 13:
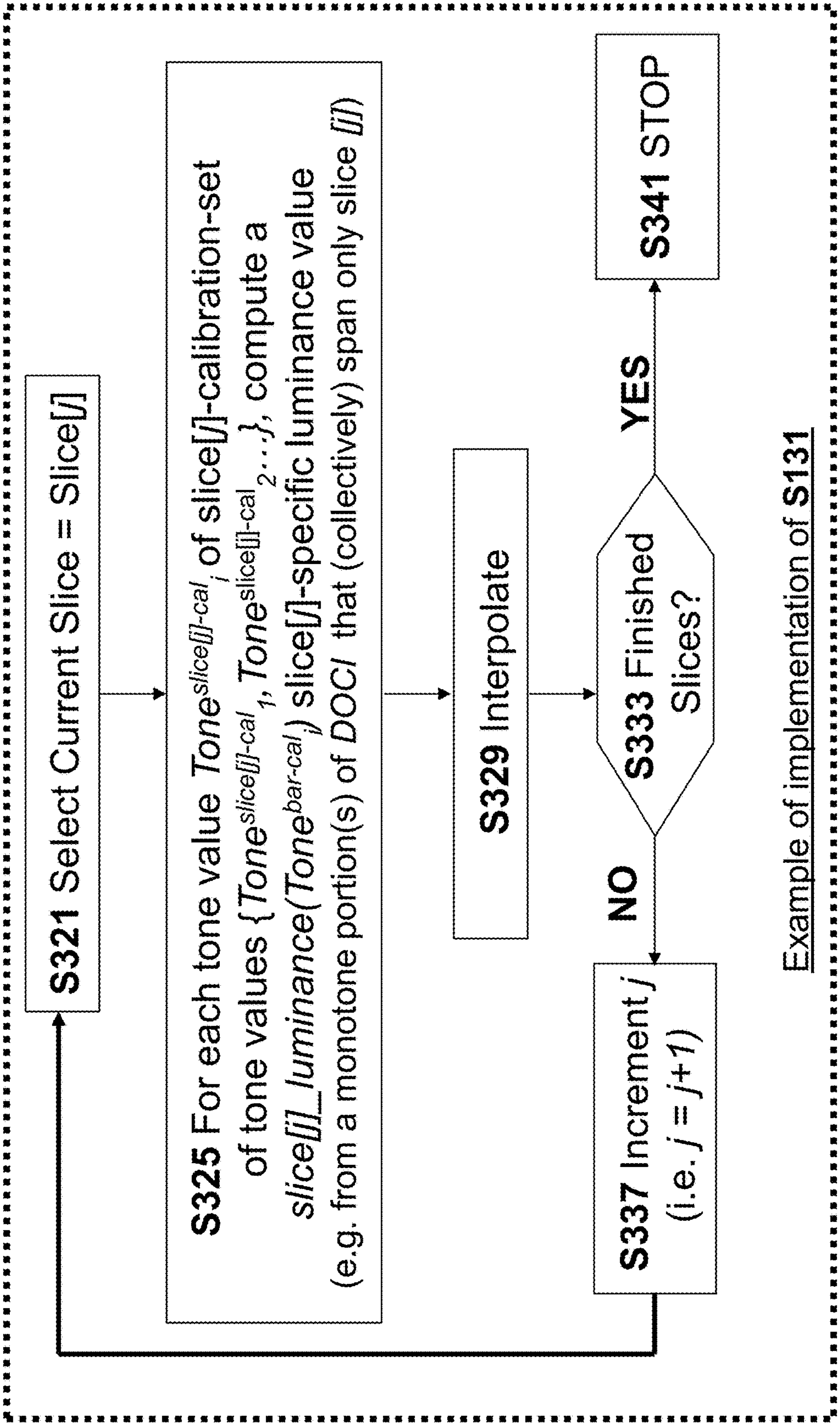

In the present example, the slice[j]-calibration-set of tone values referred to in step S325 of FIG. 13 is the same for each of the slices, and has 10 tone values {Tone Value 1, Tone Value 2 . . . Tone Value 10}, though this is not to be construed as a limitation. In the present example, for each of the slices, the slice[j]-calibration-set of tone values referred to in step S325 of FIG. 13 is also the same as the bar-calibration-set of tone values referred to in FIG. S301 of FIG. 12.

Thus, in the non-limiting example discussed above with reference to FIGS. 9A-9B, it is possible to define 10 ordered pairs first slice 704A slice[1] of the DOCI can—these ordered pairs are {(Tone Value 1, average_luminance ($TILE_A^A$)), (Tone Value 2, average_luminance ($TILE_A^B$)) . . . (Tone Value 10, average_luminance ($TILE_A^J$))} where the function average_luminance is the average luminance within a region of the DOCI (i.e. a region defined by a tile). These 10 ordered pairs serve as a representation of the tone reproduction function for the first slice 704A.

It is clear that this procedure can be repeated for all of the slices. It is clear that even though the aforementioned procedure for computing the ordered pairs only computes values of the tone reproduction function for certain tone values, it is possible to interpolate and/or extrapolate for other tone values.

Thus, in the example of FIG. 13, a slice is selected in step S321. In step S325, the slice-specific tone reproduction function is computed for a plurality of discrete tone values, and in step S329 the slice-specific tone reproduction function may be computed for other tone values by interpolation. If this procedure is complete for all slices (step S333), the procedure terminates in step S341. Otherwise, another slice is selected S337 and the procedure is repeated for the additional slice.

FIG. 14 is a graph of three tone reproduction functions—the tone reproduction function in the solid line is a bar-wide tone-reproduction function of the entire print bar, while two of the functions in the broken line are slice-specific tone reproduction functions.

Computing of an Image Correction Function ICF—In step S141 of FIG. 11, an image correction function ICF is computed from the tone bar-wide and slice-specific tone reproduction functions. One non-limiting implementation of step S141 is described in FIG. 15 which is explained with reference to the example of FIG. 16.

Figure 15:
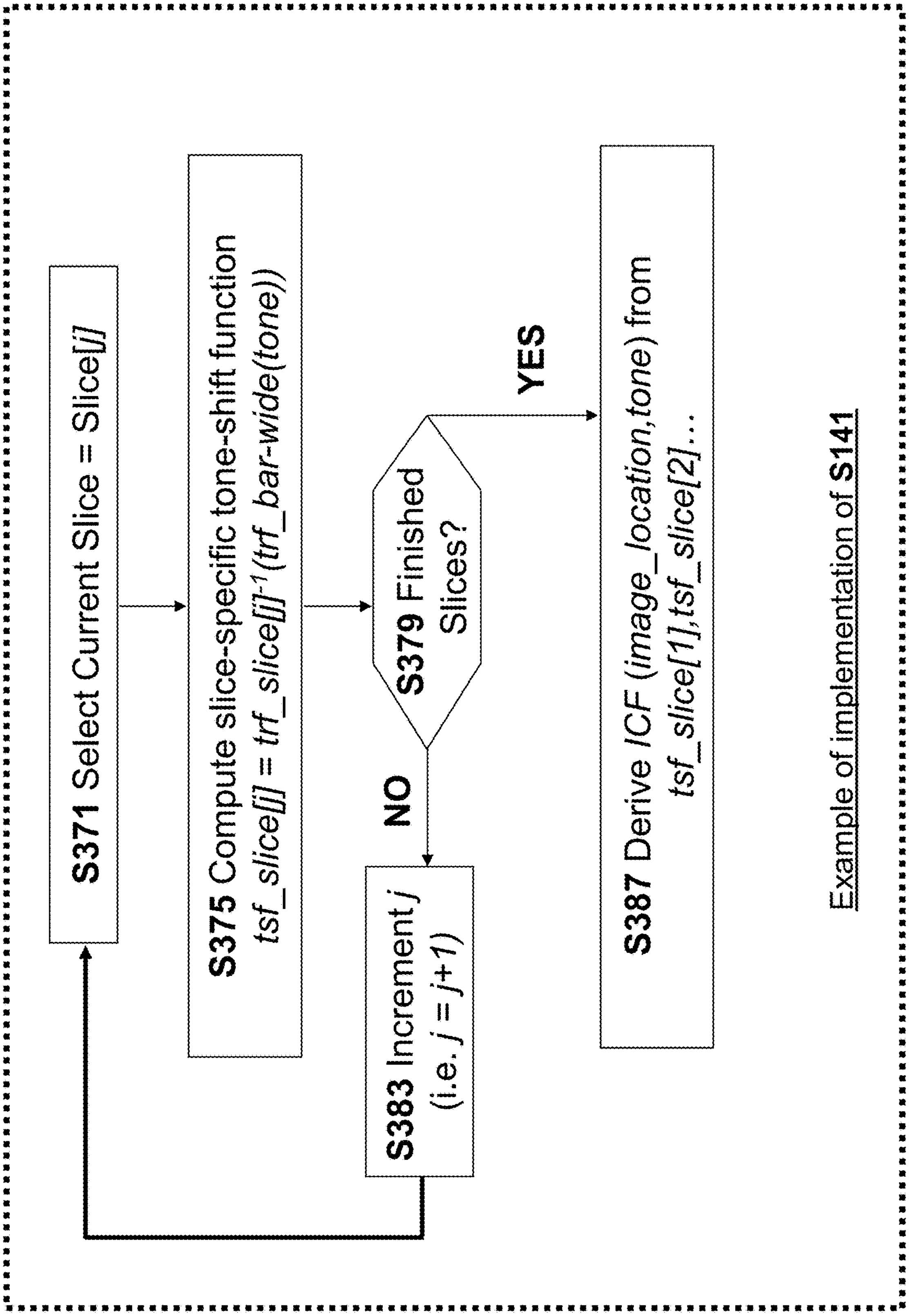

In FIG. 15, an image correction function ICF is computed piecewise for each slice of a plurality of slices. Thus, in step S371, a slice is specified, in step S375 a tone shift function tsf (explained below) is computed for the specified slice, and in steps S379 and S383 the 'current slice' is incremented if required.

The tone shift functions tsf computed in step S375 is now explained.

In the absence of 'non-uniformities,' the luminance value obtained from an input tone value should be independent of location in the cross-print direction, and specified exactly by the print-bar-wide tone reproduction function trf_bar_wide that was computed in step S121 of FIG. 11. In practice, the slice-dependent tone reproduction functions each deviate from the print-bar-wide tone reproduction function trf_bar_wide.

In order to reduce print non-uniformities, it is possible to compute from the slice-dependent tone reproduction functions and the print-bar-wide tone reproduction function trf_bar_wide an image correction function (ICF) which transforms an uncorrected digital image into a corrected digital image. The image correction function assumes that the correction required depends both on tone value as well as position in the cross-print direction—therefore, the functional form of the ICF specified in step S141 of FIG. 11 is ICF(image_location,tone) where image_location requires at least a cross-print-direction position.

Figure 16:
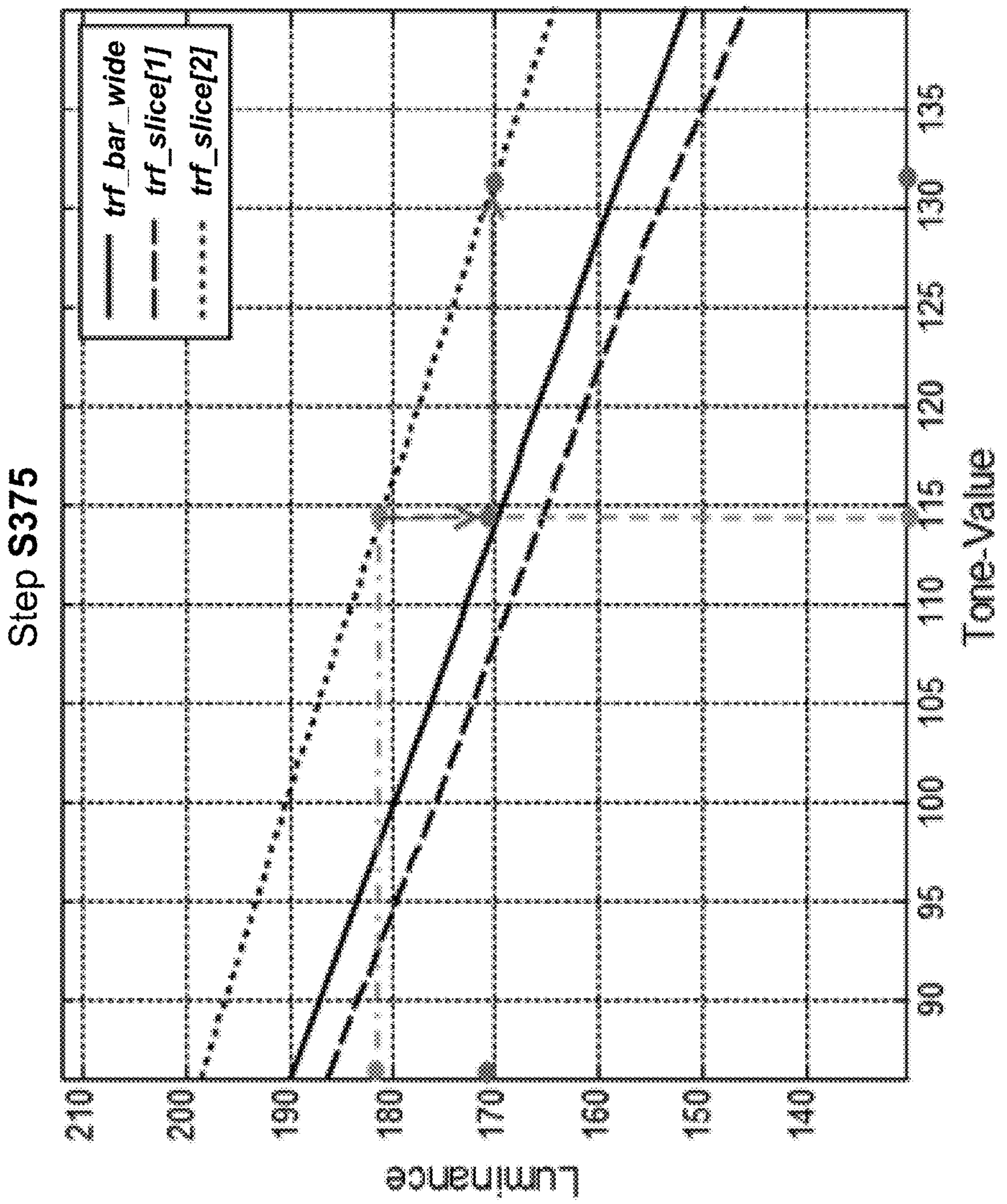
FIG. 16 illustrates tone-shifting according to tone-reproduction functions.

Reference is now made to FIG. 16. In the absence of non-uniformities, a luminance obtained by printing any tone value is given by the print-bar-wide tone reproduction function trf_bar_wide—thus, for the tone-value 114 the luminance is 170. In the absence of non-uniformities, a tone value of 114 in the digital image yields a luminance value of 170 in the ink-image, irrespective of position in the cross-print direction.

However, because of non-uniformities, the tone value required to obtain a luminance of 170 depends on the position in the cross-print direction. Thus, (i) inspection of trf_slice[1] indicates that in slice "1" slice[1], in order to obtain a luminance value of 170 the required tone value is 132 and (ii) inspection of trf_slice[2] indicates that in slice "2" slice[2], in order to obtain a luminance value of 170 the required tone value is 107.

The tone shift functions are slice dependent. For slice 1, the tone shift function tsf_slice[1] should shift a tone value of 115 (which within the corresponding ink image would yield a luminance value of 170 in the absence of non-uniformities) to a tone value of 132. For slice 1, the tone shift function tsf_slice[2] should shift a tone value of 115 (which within the corresponding ink image would yield a luminance value of 170 in the absence of non-uniformities) to a tone value of 107.

This explain why, in step S375, the slice-specific tone-shift function tsf_slice[j] is set equal to trf_slice[j]$^{-1}$ (trf_bar_wide(tone)) where trf is an abbreviation for tone reproduction function, trf_slice[j]$^{-1}$ is the inverse function of the slice-specific tone reproduction function trf_slice[j] computed in step S131 of FIG. 11, and is trf_bar_wide the representative print-bar-wide tone reproduction function computed in step S121 of FIG. 11.

Thus, for slice 1 slice[1],tsf_slice[1](115)=trf_slice[1]$^{-1}$ (trf_bar_wide(115))=trf_slice[1]$^{-1}$ (170)=132, the desired result.

For slice 2 slice[1], tsf_slice[1](115)=trf_slice[j]$^{-1}$ (trf_bar_wide(115))=trf_slice[2]$^{-1}$ (170)=107, the desired result.

Based on these tone shift functions, it is possible, in step S387, to derive the image correction function ICF—for example, for a given tone function and position in the cross-print direction the ICF may first require determining the relevant slice relevant_slice corresponding to the position in the cross-print direction, and then applying tsf_slice [relevant_slice] to the tone (i.e. shifting the tone).

Steps S201-211 relate to on-line operation according to the image correction function ICF corrected during the calibration stage.

In step S201, the ICF is applied to a digital image to obtain a corrected digital image which, when printed by the printing system in step S211, is characterized by reduced deviations related to 'image non-uniformities.'

DOCI data and 'derivatives thereof'—The term DOCI data (or DOCI luminance data) relates to output density values (e.g., luminance values) of the DOCI at location(s) therein. DOCI data of a 'slice' relates to output density values within the slice of the DOCI. It was already noted, above, that 'luminance' is only one example of an output density and whenever the term 'luminance' (or luminance data) appears it may refers to any output density (or data/values of any type of output density) including but not limited to 'luminance.'

For the present disclosure, a 'derivative' of a function $f$ is not limited to its meaning in differential calculus $$\left(\text{i.e. } f' \text{ or } \frac{df}{dx}\right),$$

but rather refers to any function 'derived' from the function $f$. By way of example (and referring to FIG. 11), the following functions may be considered a 'derivative' of DOCI data within a slice: (i) tone-reproduction functions as derived from DOCI data of the slice (ii) the tone-shift function as derived from DOCI data of the slice; and (iii) the image correlation function ICF as derived from DOCI of the slice.

The subsequent sections describe 'interpolation' and 'extrapolation.' The examples presented in these sections may relate to interpolations or extrapolations of trf functions or tsf functions or ICF functions on a 'slice'—these interpolations or extrapolations are all examples of interpolating or extrapolating a 'derivative of DOCI data.'

Interpolation and Extrapolation—In the above examples, the trf_slice functions may be computed for any slice from the luminance of the DOCI within the slice. By way of example, trf_slice[1] may be computed from the luminance of DOCI within slice[1], trf_slice[2] may be computed from the luminance of DOCI within slice[2], and so on. Since a slice of the DOCI is a 'region' of the DOCI, computing the trf function on a slice from luminance data within that slice is an example of computing the trf function from 'regional-internal' data.'

Alternatively or additionally, it is possible to base the value of the trf_slice[i]function (or any slice[i] derivative of trf_slice[i]) on the luminance of regions of the DOCI outside of slice slice[i] (i is a positive integer).

Interpolation: In one example related to interpolation, it is possible to compute the function trf_slice[i] function by the following steps: (i) determining trf_slice[j] function from luminance data within the DOCI(slice[j]) (where j is a positive integer, j<i); (ii) determining trf_slice[k] function from luminance data within the DOCI(slice[k]) (where k is a positive integer, k>i) and (iii) interpolating between the trf_slice[j] function on slice[j] and the function on slice[k] to compute the function on trf_slice[i]. When computing the trf_slice[i], luminance data within DOCI(slice[i]) is considered 'regional-internal' and luminance data from portions of DOCI outside of DOCI(slice[i]) (e.g., in DOCI(slice[j]) and in DOCI(slice[k])) is considered 'region-external.'

Thus, in one example related to FIG. 7A, it is possible to (i) compute the slice-specific trf for slice 1620A from the luminance of the DOCI within slice 1620A; (ii) compute the slice-specific trf for slice 1620C from the luminance of the DOCI within slice 1620C; and (iii) to compute the trf on slice 1620B or at a location therein (i.e. at $NP_4$) by interpolating between (A) the slice-specific trf for slice 1620A and (B) the slice-specific trf for slice 1620C. Thus, in this example, rather than relying on the luminance of the DOCI within slice 1620B it is possible to compute the slice-specific trf for slice 1620B from region-external luminance of the DOCI in slices 1620A and 1620C.

Although in theory it is possible to operate in this manner, this may not be the preferable modus operandi. In practice, it may be preferable to derive trf on slice 1620B from 'region-internal' DOCI luminance data within slice 1620B since this 'region-internal' luminance data typically more accurately reflects printing within the slice 1620B than interpolations from regions that are 'external' to slice 1620B. In this example, luminance data of DOCI from slice 1620B is 'region-internal' with respect to slice 1620B; luminance data of DOCI from slices 1620A and 1620C are 'region-external' with respect to slice 1620B.

Extrapolation: In one example related to extrapolation, it is possible to compute the function trf_slice[i] function by to the following steps: (i) determining trf_slice[j] function from the DOCI(slice[j]) (where j is a positive integer, j<i); (ii) determining trf_slice[k] function from the DOCI(slice [k]) and (iii) extrapolating from trf_slice[j] function on slice[j] and the function trf_slice[k] on slice[k] to compute the function on trf_slice[i] on slice[j].

In one example related to FIG. 7A, it is possible to (i) compute the slice-specific trf for slice 1620B from the luminance of the DOCI within slice 1620B; (ii) compute the slice-specific trf for slice 1620C from the luminance of the DOCI within slice 1620C; and (iii) to compute the trf at locations in slice 1620D (i.e. at $NP_8$ and $NP_{10}$) by extrapolating the trf computed from DOCI luminance data in slices 1620B and 1620C.

Computing a trf from a combination of region-internal and region-external luminance data—In the preceding paragraphs, it is noted that it is possible to either computer trf from region-internal luminance data of the DOCI or from region-external luminance data of the DOCI (i.e. by extrapolation or interpolation). It is appreciated that these two approaches may be combined—i.e. the trf may be computed by a mathematical combination (e.g., from multiple functions, each weighted by an appropriate weight). For the present disclosure, assigning a 'lesser weight' to a function applies to the case where a smaller non-zero weight is used, or by assigning a 'zero weight'—i.e. not using the function.

Image Correction in Interlace Regions (and use of function extrapolation)—As discussed above with reference to FIGS. 4 and 7A-7B, (i) some portions of the range of the cross-print direction are exclusive to a 'single print head' (i.e. region 610A is exclusive to Head A, region 610C is exclusive to Head B, region 610E is exclusive to Head C, region 610G is exclusive to Head D), and (ii) some portions of the range of the cross-print direction are print-head 'interlace regions' including nozzles from two neighboring print heads—thus, region 610B includes nozzles from print heads A and B, region 610D includes nozzles from print heads B and C, and region 610F includes nozzles from print heads C and D.

In FIG. 7A, slices 1620D-1620G form the 'mediating' region which mediates between (i) the single-print-head-region exclusive to print head 1604A which is formed by slices 1620A-1620C and (ii) the single-print-head-region exclusive to print head 1604B which is formed by slices 1620H-1620I. In addition, each slice 1620D-1620G is individually an 'interlace region' with respect to print heads 1604A, 1604B.

Within the mediating slice (i.e. formed by slices 1620D-1620G), it is possible to compute a slice-specific trf (or a slice-specific derivative thereof) function (hereinafter a "trf-related function" trf_related) as follows:

A) "Print head 1604A-nozzle locations" within this mediating slice—some locations within the mediating slice (i.e. formed by slices 1620D-1620G) are occupied by nozzles from print head 1604A—as shown in FIG. 7A, these locations are $NP_8$, $NP_{10}$, $NP_{12}$, $NP_{14}$ and $NP_{16}$). At these print head 1604A-nozzle locations, the trf-related function is computed from "region-external" DOCI luminance data (i.e. DOCI luminance data of slices 1620A-1620C) rather than by relying only on region-internal DOCI luminance data of the mediating slice formed by slices 1620D-1620G. In particular, it is possible to (i) compute the slice-specific trf_related function for slices 1620A-1620C (i.e. which form the single-print-head region exclusive to print head 1604A) from DOCI luminance data of slices 1620A-1620C; and (ii) extrapolate the trf_related function into the mediating slice formed by slices 1620D-1620G and (iii) employ this extrapolation of related function at locations $NP_8$, $NP_{10}$, $NP_{12}$, $NP_{14}$ and $NP_{16}$—i.e. the locations in the mediating slice formed by slices 1620D-1620G which are occupied by nozzles from print head 1604A.

B) "Print head 1604B-nozzle locations" within this mediating slice—some locations within the mediating slice (i.e. formed by slices 1620D-1620G) are occupied by nozzles from print head 1604B—as shown in FIG. 7A, these locations are $NP_9$, $NP_{11}$, $NP_{13}$, $NP_{15}$ and $NP_{17}$). At these print head 1604B-nozzle locations, the trf-related function is computed from "region-external" DOCI luminance data (i.e. DOCI luminance data of slices 1620H-1620I) rather than by relying only on region-internal DOCI luminance data of the mediating slice formed by slices 1620D-1620G. In particular, it is possible to (i) compute the slice-specific trf_related function for slices 1620H-1620I (i.e. which form the single-print-head region exclusive to print head 1604B) from DOCI luminance data of slices 1620H-1620I; and (ii) extrapolate the trf_related function into the mediating slice formed by slices 1620D-1620G and (iii) employ this extrapolation of related function at locations $NP_9$, $NP_{11}$, $NP_{13}$, $NP_{15}$ and $NP_{17}$—i.e. the locations in mediating slice formed by slices 1620D-1620G are occupied by nozzles from print head 1604B.

Figure 17A:
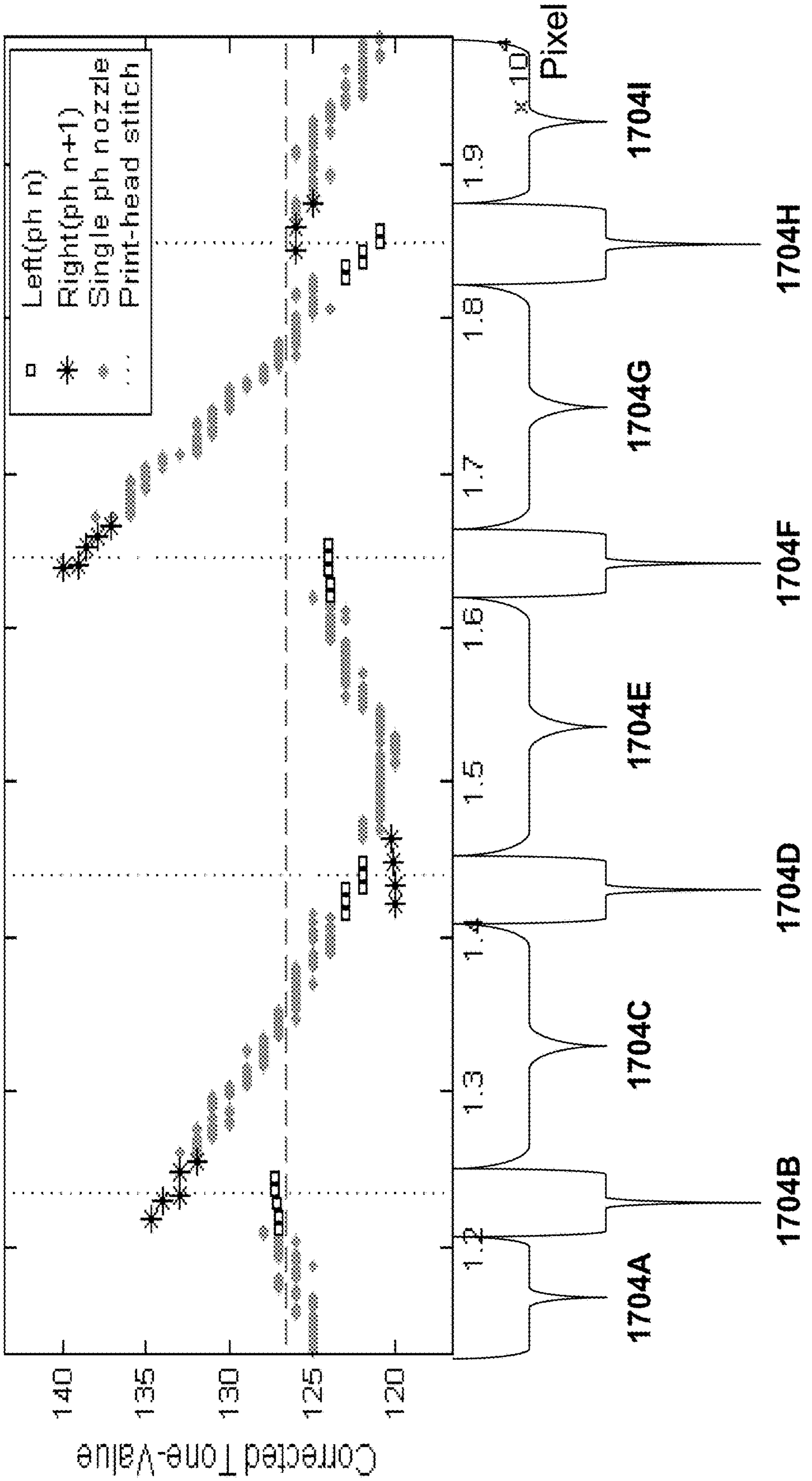
FIGS. 17A-17B and 18 illustrate corrected tone-value as a function of position in the cross-print direction for one example.
Figure 17B:
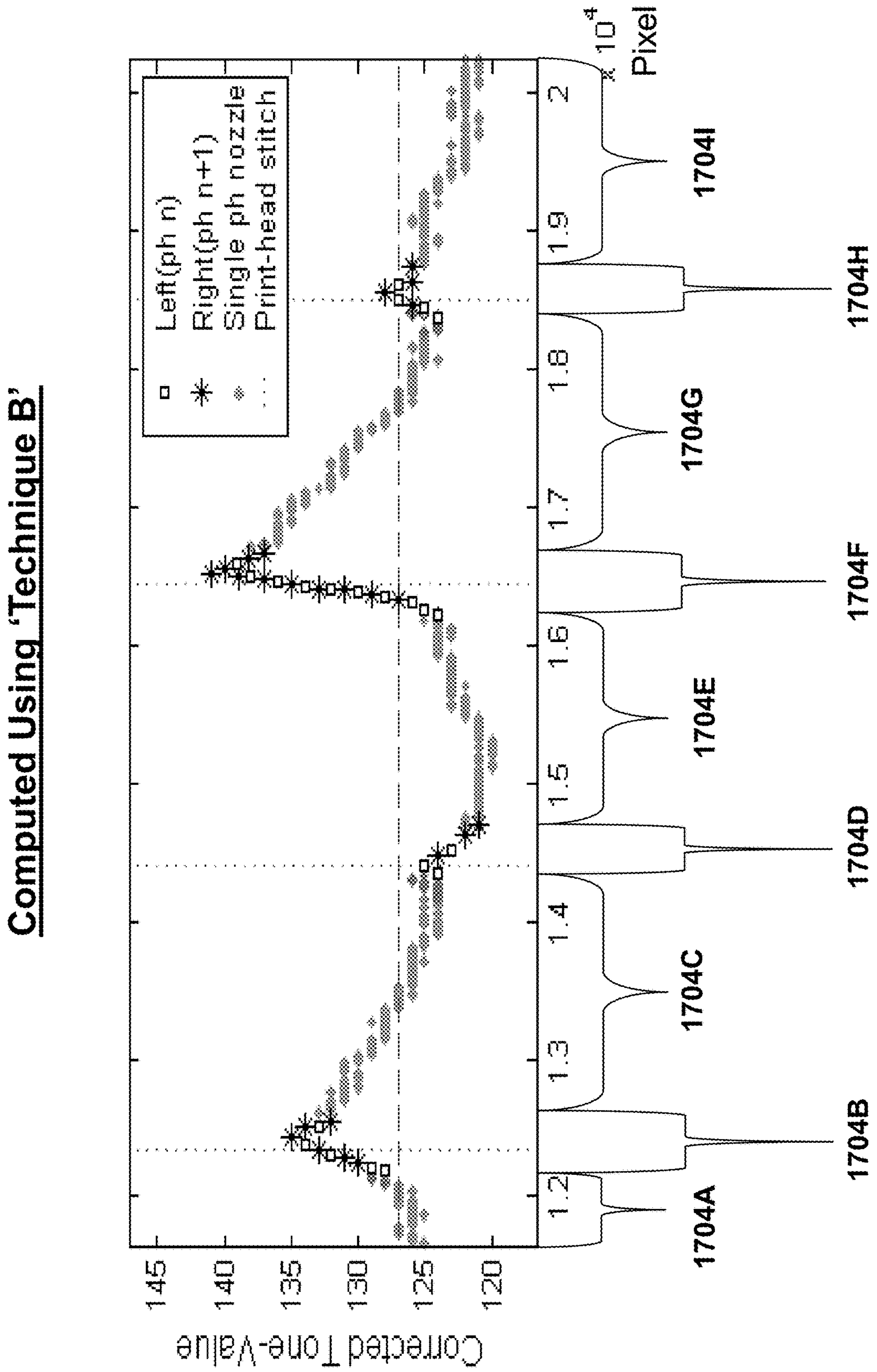
Figure 18:
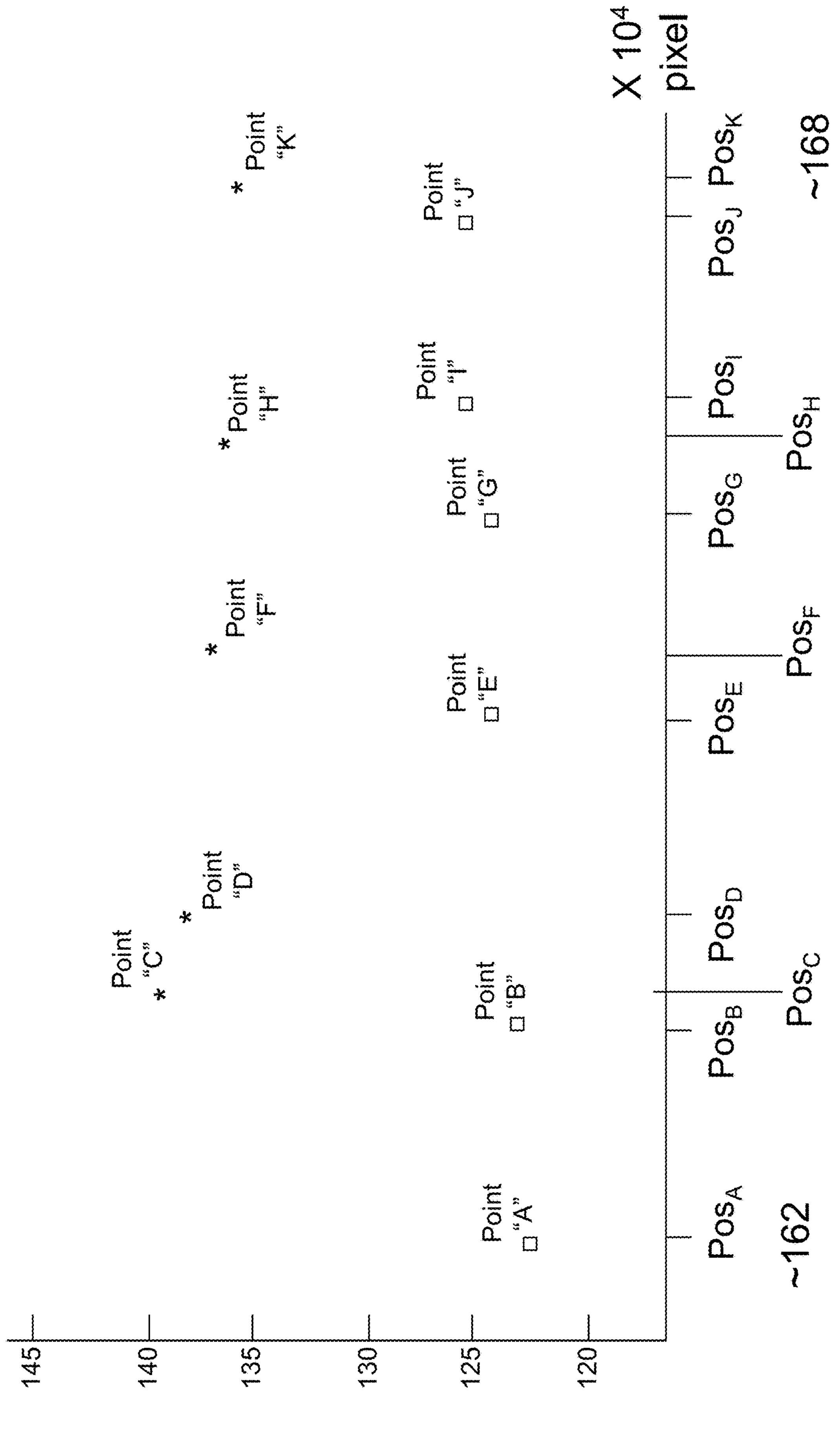

A Discussion of FIGS. 17A-17B and 18

Reference is now made to FIGS. 17A-17B which illustrate, for a tone value of about 128, the 'corrected tone value' for different locations in the cross-print direction according to Technique A and Technique B. Techniques A and B are discussed below—presently, Technique A is presently preferred though in other embodiments, Technique B may be employed.

In FIGS. 17A-17B, the corrected tone value as a function of position in the cross-print direction is illustrated. The corrected tone value is the tsf(tone value) where (as noted above) tsf is an abbreviation for tone shift function. Thus, a 'corrected tone value' of 128 indicates that no shift is required.

In the examples of FIGS. 17A-17B, 7 slices are illustrated—slices 1704A-1704I. Slices 1704A, 1704C, 1704E, 1704G and 1704I are single-print-head slices and slices 1704B, 1704D, 1704F and 1704H are interlace slices which mediate between neighboring single-print-head slices. Thus, slice 1704B mediates between neighboring slices 1704A and 1704C, slice 1704D mediates between neighboring slices 1704C and 1704E, and so on. It is clear from FIGS. 17A-17B that the ink image may be divided into alternating single-print-head slices and interlace or stitch slices.

In this example, within the single-print head slice 1704A are the nozzle positions only of nozzles of print head PH_A, within the single-print head slice 1704C are the nozzle positions only of nozzles of print head PH_C (in this example, there is no print head labeled 'PH_B'), and so on. Within mediating region 1704B are nozzle positions of both print head PH_A and PH_C (i.e. interlaced), within mediating region 1704D are nozzle positions of both print head PH_C and PH_E (i.e. interlaced) and so-on.

Within the single-print print head slices 1704A, 1704C, 1704E, 1704G and 1704I, the tone-shift function (i.e. illustrated by the 'corrected tone' value) and the ICF are computed primarily from DOCI luminance data within the respective single-print head slice. Thus, the tone-shift function (and the derived ICF) within 1704A is computed primarily from DOCI data of the slice 1704A, the tone-shift function (and the derived ICF) within 1704C is computed primarily from DOCI data of the slice 1704C, and so on. The interlace slices 1704B, 1704D, 1704F and 1704H are handled differently. For example, within the range of slice 1704B, instead of computing the tone-shift function (and the derived ICF) from the 'region-internal' DOCI data of slice 1704B, it is possible to rely primarily on extrapolation of DOCI data (or a derivative thereof) from neighboring slices 1704A, 1704C—the DOCI data of slices 1704A, 1704C is 'region external' with respect to slice 1704B.

There are two techniques to compute corrected tone value or ICF within mediating slice (e.g., interlace slices) from region external data that are set forth respectively in FIGS. 17A and 17B. Consider mediating slice 1704B which mediates between slices 1704A and 1704C. According to 'Technique A' (illustrated in FIG. 17A) within mediating slice 1704B (e.g., a slice that is not a single print-head slice like 1704A and 1704C—e.g., slice 1704B is an interlacing or stitch slice), there are two extrapolation functions—a first extrapolation function from one of the neighboring single-print-head slices 1704A (having a "left position" relative to mediating slice 1704B) and a second extrapolation function from the other of the neighboring single-print-head slices 1704C (having a "right position" relative to mediating slice 1704B). In FIG. 17A, 'left extrapolations' (i.e. extrapolations from the left neighbor of a mediating or interlace slice—for mediating slice 1704B this refers to extrapolation from single-print-head slice 1704A) are illustrated by the 'square' symbol, and 'right extrapolations' (i.e. extrapolations from the right neighbor of a mediating or interlace slice—for mediating slice 1704B this refers to extrapolation from single-print-head slice 1704C) are illustrated by the 'asterisk' symbol.

This is true for all mediating slices illustrated therein (i.e. 1704B, 1704D, 1704F and 1704H).

Thus, according to Technique A of FIG. 17A, within each mediating slice two extrapolation functions co-exist—the first illustrated by squares and the second illustrated by asterisks. In contrast, according to Technique B of FIG. 17B, within each mediating slice the function (i, e. tsf or ICF) is computed by interpolating between the left neighboring slice and the right-neighboring slice.

Consider slice 1704F. According to Technique B, the corrected tone value (designated by the asterisks) within 1704F is, roughly speaking, approximated by a line between (1.65, 125) and (1.71, 140) and is monotonically increasing on most of the slice 1704F (i.e. most of the portion between about 1.65 and 1.71x10 4 pixel of the X-axis. In contrast, according to Technique A, the corrected tone value 'jumps' between (i) values of a 'first approximation function' appropriate for 'print head A' nozzles (i.e. all values below a luminance of about 125—this is an extrapolation only of the value of the corrected tone value function on slice 1704E without influence from slice 1704G) and is illustrated in by hollow squares; and (ii) values of a 'second approximation function' appropriate for 'print head B' nozzles (i.e. all values above a luminance of about 135—this is an extrapolation only of the value of the corrected tone value function on slice 1704G without influence from slice 1704E) and is illustrated in by asterisks.

Thus, in the example of FIG. 17A (Technique A), no points in the slice 1704F are approximated by corrected tone values between 125 and 135—this is in contrast to the example of FIG. 17B (Technique B) where a substantial majority of positions within slice 1704F are assigned corrected tone values between 125 and 135.

FIG. 18 illustrates the function of FIG. 17A (i.e. computed according to 'Technique A') within slice 1704F for 10 points. Each point of FIG. 18 is an ordered pair (x,y) where x is position in the cross-print direction and y is the corrected tone value. The points of FIG. 8 are thus ($Pos_A$, corrected_tone_value($Pos_A$)), ($Pos_B$, corrected_tone_value($Pos_B$)), and so on. The positions $Pos_A$, $Pos_B$, $Pos_E$, $Pos_G$, $Pos_I$ and $Pos_J$ (which define x values of points A, B, E, G, I and J) all correspond to positions of a nozzle of print-head PH_E. The positions $Pos_C$, $Pos_D$, $Pos_F$, $Pos_H$ and $Pos_K$ (which define x values of points C, D, F, H and K) all correspond to positions of a nozzle of print-head PH_G.

Within slice 1704F the corrected tone-value function is thus computed as follows:

I) At positions $Pos_A$, $Pos_B$, $Pos_E$, $Pos_G$, $Pos_I$ and $Pos_J$ (i.e. all corresponding to positions of a nozzle of print-head PH_E), the corrected tone-value function is computed by extrapolating the 'corrected tone-value function' of slice 1704E;

II) At positions $Pos_C$, $Pos_D$, $Pos_F$, $Pos_H$ and $Pos_K$ (i.e. all corresponding to positions of a nozzle of print-head PH_G), the corrected tone-value function (i.e. and hence the ICF) is computed by extrapolating the 'corrected tone-value function' of slice 1704G.

The technique described for computing the corrected tone value (and hence ICF) described (and exemplified) with respect to FIGS. 17A-17B and 18 has the following features (and in different embodiments, any combination of these features is provided including combinations explicitly listed or any other combination even those not explicitly listed):

First Feature Set: In some embodiments, Features A-C are provided together (though this is not a requirement).

Feature A—The printing system is configured so that images produced by the print-bar thereof are dividable into alternating single-print-head slices and interlace slices—i.e. moving from left to right one alternatively passes through single-print-head slices and interlace slices.

Feature B—Within the single-print-head slices (i.e. within slices 1704A, 1704C, 1704E, 1704G and 1704I), the ICF is derived primarily from region-internal DOCI data. In the example of FIGS. 17A-17B: within slice 1704A the ICF is derived primarily from DOCI data of slice 1704A, within slice 1704C the ICF is derived primarily from DOCI data of slice 1704C, and so on.

Feature C—Within the interlace slices (i.e. within slices 1704B, 1704D, 1704F and 1704H), the ICF is derived primarily from extrapolation of region-external DOCI data. Within slice 1704B the ICF is derived primarily from extrapolation of DOCI data from region-external DOCI data (i.e. DOCI data from slices 1704A and/or 1704C is 'region-external' with respect to slice 1704B), within slice 1704D the ICF is derived primarily from extrapolation of DOCI data from region-external DOCI data (i.e. DOCI data from slices 1704C and/or 1704E is 'region-external' with respect to slice 1704D), and so on.

Second Feature Set: In some embodiments, Features D-G are provided together (though this is not a requirement).

Feature D—The printing system is configured so that images produced by the print-bar thereof comprise first 1704E and second 1704G distinct single-print-head slices and a mediating slice 1704F (e.g., this also may be an 'interlacing' slice) therebetween—for example, slices 1704E and 1704G are respectively exclusive for first PH_E and second PH_G print-head.

Feature E—The mediating slice 1704F includes first {$Pos_A$, $Pos_B$, $Pos_E$, $Pos_G$, $Pos_I$ and $Pos_J$} and second {$Pos_C$, $Pos_D$, $Pos_F$, $Pos_H$ and $Pos_k$} sets of positions interlaced therein, positions of the first and second set respectively corresponding to nozzle positions for nozzles of the first PH_E and second PH_G print heads.

Feature F—The deriving of the ICF includes computing first (illustrated by hollow squares) and second (illustrated by asterisks) extrapolation functions respectively describing extrapolation from the first 1704E and second 1704G single-print-head slices into the mediating region 1704F of DOCI data, or a derivative thereof—in this case the 'derivative' of the DOCI data is the corrected tone-value function which is derived from DOCI data (see, for example, FIGS. 11 and 15).

Feature G—Within the mediating region 1704F, (A) at positions {$Pos_A$, $Pos_B$, $Pos_E$, $Pos_G$, $Pos_I$ and $Pos_J$} of the first set, the ICF is derived primarily from the first extrapolation function (illustrated by hollow squares) and (B) at positions {$Pos_C$, $Pos_D$, $Pos_F$, $Pos_H$ and $Pos_K$} of the second set, the ICF is derived primarily from the second extrapolation function (illustrated by the asterisks)

Third Feature Set: In some embodiments, Features H-J are provided together (though this is not a requirement).

Feature H—The printing system is configured so that images produced by the print-bar thereof comprise first 1704E and second 1704G of single-print-head slices (e.g., distinct, non-overlapping slices) and a slice 1704F therebetween (i.e. a mediating slice—e.g., an interlace slice), the first and second single-print-head slices being respectively exclusive for first PH_E and second PH_G print-heads.

Feature I—The interlace 1704F slice includes first {$Pos_A$, $Pos_B$, $Pos_E$, $Pos_G$, $Pos_I$ and $Pos_J$} and second {$Pos_C$, $Pos_D$, $Pos_F$, $Pos_H$ and $Pos_K$} sets of positions interlaced therein, positions of the first and second set respectively corresponding to nozzle positions for nozzles of the first PH_E and second PH_G print heads Feature J—Within the interlace 1704F region, (i) the ICF is computed by determining if a position in the mediating region corresponds to a nozzle position of the first print-head (e.g., if a position within 1704F corresponds to a nozzle-position of a nozzle of print head PH_E, the 'hollow square' extrapolation from slice 1704E is used) or of the second print-head (e.g., if a position within 1704F corresponds to a nozzle-position of a nozzle of print head PH_G, the 'asterisk' extrapolation from slice 1704G is used) print-head and the ICF is computed according to the results of the determining (i.e. the determining of the 'print head' source of a nozzle position within interlace region 1704G).

Fourth Feature Set: In some embodiments, Features H and K-N are provided together (though this is not a requirement).

Feature K—The mediating region 1704F includes a first $P_1$ and a second $P_2$ positions (e.g., in FIG. 18, the 'first' position can be $Pos_D$ and the 'second' position can be $Pos_E$), the first position $P_1$ being closer than the second $P_2$ position to the first single-print-head slice 1704E (e.g., in FIG. 18, $Pos_D$ is closer to slice 1704E than $Pos_E$ is to slice 1704E), the second position $P_2$ being closer to the second single-print-head slice 1704G than the first position $P_1$ is to the second single-print-head slice (e.g., in FIG. 18, $Pos_E$ is closer than $Pos_D$ to slice 1704G).

Feature L—The deriving of the ICF includes computing first and second extrapolation functions (e.g., the first extrapolation function being illustrated in FIG. 18 by hollow squares and the second extrapolation function being illustrated by asterisks) respectively describing extrapolation from the first 1704E and second 1704G single-print-head slices into the mediating region 1704G of DOCI data, or a derivative thereof (i.e. a derivative of the DOCI data—e.g., corrected-tone value function).

Feature M—When computing ICF for the first position, a greater weight is assigned to the second extrapolation function than to the first extrapolation function—e.g., when computing the ICF for $Pos_D$ of FIG. 18, a greater weight is assigned to extrapolation from slice 1704G (i.e. asterisks) than to extrapolation from slice 1704E (i.e. hollow squares).

Feature N—When computing ICF for the second position, a greater weight is assigned to the first extrapolation function than to the second extrapolation function—e.g., when computing the ICF for POS E of FIG. 18, a greater weight is assigned to extrapolation from slice 1704E (i.e. hollow squares) than to extrapolation from slice 1704G (i.e. asterisks).

Figure 19:
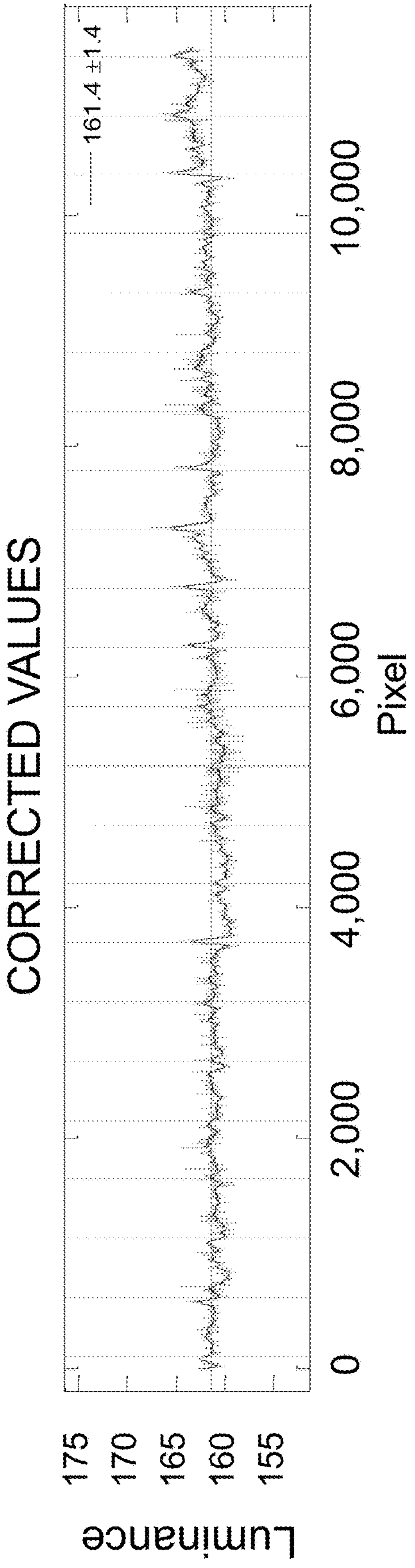
FIG. 19 illustrates luminance as a function position in the cross-print direction for the case of a uniform tone value for the case where the image of FIG. 10 is corrected.

A Discussion of FIG. 19

As noted above, FIG. 10 illustrates (according to one example) for an ink image on a printing 'target surface' (i.e. substrate or ITM) the luminance as a function of cross-print-direction position for an example stripe having a tone-value and/or 'intended luminance' of about 158.0. Due to non-uniformity effects, the luminance is not, in fact, constant, but rather fluctuates as a function of position in the cross-print-direction, as shown in FIG. 10.

In contrast, FIG. 19 illustrates (according to one example) the luminance as a function of cross-print-direction position when instead of printing the uncorrected digital input image, the digital input image is first corrected according to teachings disclosed herein. In contrast to FIG. 10 wherein the standard deviation luminance (i.e. indicating fluctuations around a mean) is 3.3 (or around 2.1%), in FIG. 19 the standard deviation is 1.4 (or less than 1%).

It is to be understood that the methods above described and exemplified for any given ink color of a printing system, can be repeated for each additional ink color in use in the system being considered.

Figure 2D:
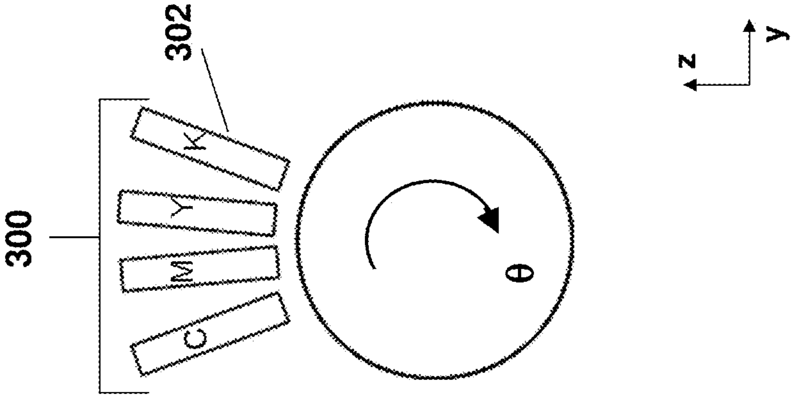
Figure 2C:
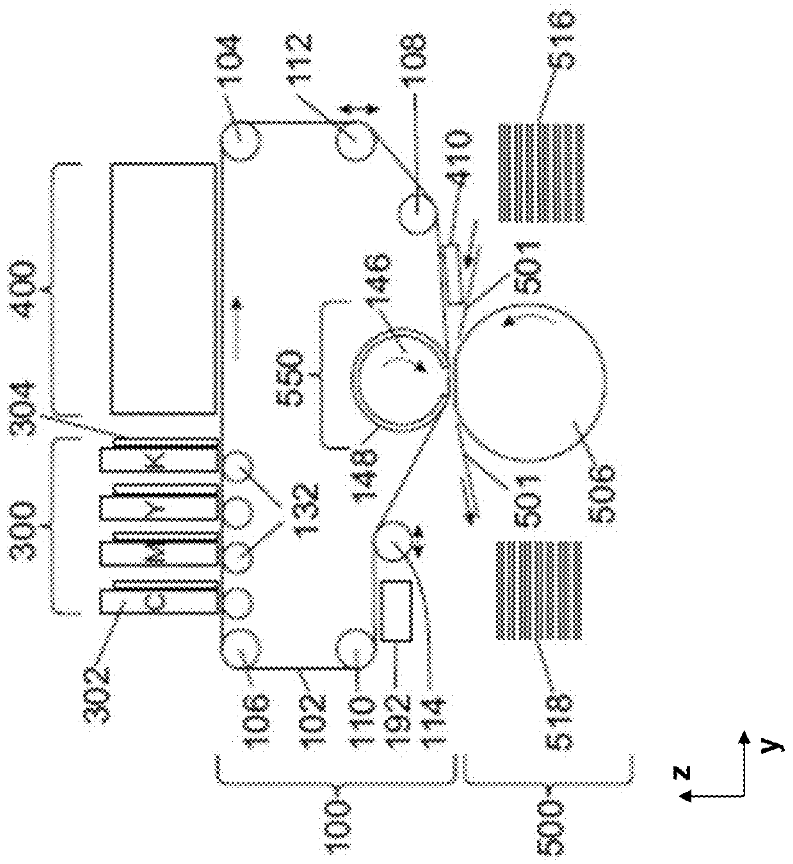

Additional Discussion about FIGS. 2A and 2C-2D

The printing systems schematically illustrated in FIGS. 1 and 2 essentially includes three separate and mutually interacting systems, namely a blanket support system 100, an image forming system 300 above the blanket system 100, and a substrate transport system 500 below the blanket system 100. While circulating in a loop, the blanket passes through various stations including a drying station 400 and at least one impression station 550. Though the below description is provided in the context of the intermediate transfer member being an endless flexible belt, the present invention is equally applicable to printing systems wherein the intermediate transfer member is a drum (schematically illustrated in FIG. 3), the specific designs of the various stations being accordingly adapted.

The blanket system 100 includes an endless belt or blanket 102 that acts as an intermediate transfer member (ITM) and is guided over two or more rollers. Such rollers are illustrated in FIG. 2A as elements 104 and 106, whereas FIG. 2C displays two additional such blanket conveying rollers as 108 and 110. One or more guiding roller is connected to a motor, such that the rotation of the roller is able to displace the blanket in the desired direction, and such cylinder may be referred to as a driving roller. As used herein, the term "printing direction" means a direction from the image forming station where printing heads apply ink to outer surface of the ITM towards the location of the impression station, where the ink image is ultimately transferred to the printing substrate. In FIGS. 1 and 2, the printing direction is illustrated as clockwise.

Though not illustrated in the Figures, the blanket can have multiple layers to impart desired properties to the transfer member. Thus in addition to an outer layer receiving the ink image and having suitable release properties, hence also called the release layer, the transfer member may include in its underlying body any one of a reinforcement layer (e.g., a fabric) to provide desired mechanical characteristics (e.g., resistance to stretching), a compressible layer so that the blanket or the drum surface can conform to the printing substrate during transfer, a conformational layer to provide to the surface of the release layer sufficient conformability toward the topography of a substrate surface, and various other layers to achieve any desired friction, thermal and electrical properties or adhesion/connection between any such layers. When the body of the transfer member comprises a compressible layer, the blanket can be looped to form what can be referred to hereinafter as a "thick belt". Alternatively, when the body is substantially devoid of a compressible layer, the resulting structure is said to form a "thin belt". FIG. 2A illustrates a printing system suitable for use with a "thick belt", whereas FIG. 2C illustrates a printing system suitable for a "thin belt".

Independently of exact architecture of the printing system, an image made up of droplets of an aqueous ink is applied by image forming system 300 to an upper run of blanket 102 at a location referred herein as the image forming station. In this context, the term "run" is used to mean a length or segment of the blanket between any two given rollers over which the blanket is guided. The image forming system 300 includes print bars 302 which may each be slidably mounted on a frame positioned at a fixed height above the surface of the blanket 102 and include a strip of print heads with individually controllable print nozzles through which the ink is ejected to form the desired pattern. The image forming system can have any number of bars 302, each of which may contain an ink of a different or of the same color, typically each jetting Cyan (C), Magenta (M), Yellow (Y) or Black (K) inks. It is possible for the print bars to deposit different shades of the same color (e.g., various shades of gray, including black) or customized mix of colors (e.g., brand colors) or for two print bars or more to deposit the same color (e.g., black). Additionally, the print bar can be used for pigmentless liquids (e.g., decorative or protective varnishes) and/or for specialty inks (e.g., achieving visual effect, such as metallic, sparkling, glowing or glittering look, or even scented effect).

Within each print bar, the ink may be constantly recirculated, filtered, degassed and maintained at a desired temperature and pressure, as known to the person skilled in the art without the need for more detailed description. As different print bars 302 are spaced from one another along the length of the blanket, it is of course essential for their operation to be correctly synchronized with the movement of blanket 102. It is important for the blanket 102 to move with constant speed through the image forming station 300, as any hesitation or vibration will affect the registration of the ink droplets of different colors.

If desired, it is possible to provide a blower 304 following each print bar 302 to blow a slow stream of a hot gas, preferably air, over the intermediate transfer member to commence the drying of the ink droplets deposited by the print bar 302. This assists in fixing the droplets deposited by each print bar 302, that is to say resisting their contraction and preventing their movement on the intermediate transfer member, and also in preventing them from merging into droplets deposited subsequently by other print bars 302. Such post jetting treatment of the just deposited ink droplets, need not substantially dry them, but only enable the formation of a skin on their outer surface.

The image forming station illustrated in FIG. 2C comprises optional rollers 132 to assist in guiding the blanket smoothly adjacent each printing bar 302. The rollers 132 need not be precisely aligned with their respective print bars and may be located slightly (e.g., few millimeters) downstream or upstream of the print head jetting location. The frictional forces can maintain the belt taut and substantially parallel to the print bars. The underside of the blanket may therefore have high frictional properties as it is only ever in rolling contact with all the surfaces on which it is guided.

Following deposition of the desired ink image by the image forming system 300 on an upper run of the ITM, the image is dried by a drying system 400 described below in more details. A lower run of the blanket then selectively interacts at an impression station where the transfer member can be compressed to an impression cylinder to impress the dried image from the blanket onto a printing substrate. FIG. 2A shows two impression stations with two impression cylinders 502 and 504 of the substrate transport system 500 and two respectively aligned pressure or nip rollers 142, 144, which can be raised and lowered from the lower run of the blanket. When an impression cylinder and its corresponding pressure roller are both engaged with the blanket passing there-between, they form an impression station 550. The presence of two impression stations, as shown in FIG. 2A, is to permit duplex printing. In this figure, the perfecting of the substrate is implemented by a perfecting cylinder 524 situated in between two transport rollers 522 and 526 which respectively transfer the substrate from the first impression cylinder 502 to the perfecting cylinder 524 and therefrom on its reverse side to the second impression cylinder 504. Though not illustrated, duplex printing can also be achieved with a single impression station using an adapted perfecting system able to refeed to the impression station on the reverse side a substrate already printed on its first side. In the case of a simplex printer, only one impression station would be needed and a perfecting system would be superfluous. Perfecting systems are known in the art of printing and need not be detailed.

FIG. 2C illustrates an alternative printing system suitable for a "thin belt" looped blanket which is compressed during engagement with the impression cylinder 506 by a pressure roller 146 which to achieve intimate contact between the release layer of the ITM and the substrate comprises the compressible layer substantially absent from the body of the transfer member. The compressible layer of the pressure roller 146 typically has the form of a replaceable compressible blanket 148. Such compressible layer or blanket is releasably clamped or attached onto the outer surface of the pressure cylinder 146 and provides the conformability required to urge the release layer of the blanket 102 into contact with the substrate sheets 501. Rollers 108 and 114 on each side of the impression station, or any other two rollers spanning this station closer to the nip (not shown), ensure that the belt is maintained in a desired orientation as it passes through the nip between the cylinders 146 and 506 of the impression station 550.

In this system, both the impression cylinder 506 and the pressure roller 146 bearing a compressible layer or blanket 148 can have as cross section in the plane of rotation a partly truncated circular shape. In the case of the pressure roller, there is a discontinuity where the ends of the compressible layer are secured to the cylinder on which it is supported. In the case of the impression cylinder, there can also be a discontinuity to accommodate grippers serving to hold the sheets of substrate in position against the impression cylinder. The impression cylinder and pressure roller of impression station 550 rotate in synchronism so that the two discontinuities line up during cycles forming periodically an enlarged gap at which time the blanket can be totally disengaged from any of these cylinders and thus be displaced in suitable directions to achieve any desired alignment or at suitable speed that would locally differ from the speed of the blanket at the image forming station. This can be achieved by providing powered tensioning rollers or dancers 112 and 114 on opposite sides of the nip between the pressure and impression cylinders. Although roller 114 is illustrated in FIG. 2C as being in contact with the inner/underneath side of the blanket, alignment can similarly be achieved if it were positioned facing the release layer. This alternative, as well as additional optional rollers positioned to assist the dancers in their function, are not shown. The speed differential will result in slack building up on one side or the other of the nip between the pressure and impression cylinders and the dancers can act at times when there is an enlarged gap between the pressure and impression cylinders 146 and 506 to advance or retard the phase of the belt, by reducing the slack on one side of the nip and increasing it on the other.

Independently of the number of impression stations, their configuration, the layer structure of the ITM and the presence or absence of a perfecting mechanism in such printing systems, in operation, ink images, each of which is a mirror image of an image to be impressed on a final substrate, are printed by the image forming system 300 onto an upper run of blanket 102. While being transported by the blanket 102, the ink is heated to dry it by evaporation of most, if not all, of the liquid carrier. The carrier evaporation may start at the image forming station 300 and be pursued and/or completed at a drying station 400 able to substantially dry the ink droplets to form a residue film of ink solids remaining after evaporation of the liquid carrier. The residue film image is considered substantially dry or the image dried if any residual carrier they may contain does not hamper transfer to the printing substrate and does not wet the printing substrate. The dried ink image can be further heated to render tacky the film of ink solids before being transferred to the substrate at an impression station. Such optional pre-transfer heater 410 is shown in FIG. 2C.

FIGS. 2A and 2C depict the image being impressed onto individual sheets 501 of a substrate which are conveyed by the substrate transport system 500 from an input stack 516 to an output stack 518 via the impression cylinders 502, 504 or 506. Though not shown in the figures, the substrate may be a continuous web, in which case the input and output stacks are replaced by a supply roller and a delivery roller. The substrate transport system needs to be adapted accordingly, for instance by using guide rollers and dancers taking slacks of web to properly align it with the impression station.

The Drying System

Printing systems wherein the present invention may be practiced can comprise a drying system 400. As noted any drying system able to evaporate the ink carrier out of the ink image deposited at the image forming station 300 to substantially dry it by the time the image enters the impression station is suitable. Such system can be formed from one or more individual drying elements typically disposed above the blanket along its path. The drying element can be radiant heaters (e.g., IR or UV) or convection heaters (e.g., air blowers) or any other mean known to the person of skill in the art. The settings of such a system can be adjusted according to parameters known to professional printers, such factors including for instance the type of the inks and of the transfer member, the ink coverage, the length/area of the transfer member being subject to the drying, the printing speed, the presence/effect of a pre-transfer heater etc.

Operating Temperatures

Each station of such printing systems may be operated at same or different temperatures. The operating temperatures are typically selected to provide the optimal temperature suitable to achieve the purported goal of the specific station, preferably without negatively affecting the process at other steps. Therefore as well as providing heating means along the path of the blanket, it is possible to provide means for cooling it, for example by blowing cold air or applying a cooling liquid onto its surface. In printing systems in which a treatment or conditioning fluid is applied to the surface of the blanket, the treatment station may serve as a cooling station.

The temperature at various stage of the process may also vary depending on the exact composition of the ITM, the inks and the conditioning fluid, if needed, being used and may even fluctuate at various locations along a given station. In some embodiments, the temperature on the outer surface of the ITM at the image forming station is in a range between 40° C. and 160° C., or between 60° C. and 90° C. In some embodiments, the temperature at the drying station is in a range between 90° C. and 300° C., or between 150° C. and 250° C., or between 180° C. and 225° C. In some embodiments, the temperature at the impression station is in a range between 80° C. and 220° C., or between 100° C. and 160° C., or of about 120° C., or of about 150° C. If a cooling station is desired to allow the ITM to enter the image forming station at a temperature that would be compatible to the operative range of such station, the cooling temperature may be in a range between 40° C. and 90° C.

As mentioned, the temperature of the transfer member may be raised by heating means positioned externally to the blanket support system, as illustrated by any of heaters 304, 400 and 410, when present in the printing system. Alternatively and additionally, the transfer member may be heated from within the support system. Such an option is illustrated by heating plates 130 of FIG. 2A. Though not shown, any of the guiding rollers conveying the looped blanket may also comprise internal heating elements.

Blanket and Blanket Support System

The ITM can be a belt formed of an initially flat elongate blanket strip of which the ends can be releasably fastened or permanently secured to one another to form a continuous loop. A releasable fastening for blanket 102 may be a zip fastener or a hook and loop fastener that lies substantially parallel to the axes of rollers 104 and 106 over which the blanket is guided. A zip fastener, for instance, allow easy installation and replacement of the belt. A permanent securing may be achieved by soldering, welding, adhering, and taping the ends of the blanket to one another. Independently of the mean elected to releasably or permanently secure these ends to form a continuous flexible belt, the secured ends, which cause a discontinuity in the transfer member, are said to form a seam. The continuous belt may be formed by more than one elongated blanket strip and may therefore include more than one seam.

In order to avoid a sudden change in the tension of the belt as the seam passes over rollers or other parts of the support system, it is desirable to make the seam, as nearly as possible, of the same thickness as the remainder of the blanket. It is desirable to avoid an increase in the thickness or discontinuity of chemical and/or mechanical properties of the belt at the seam. Preferably, no ink image or part thereof is deposited on the seam, but only as close as feasible to such discontinuity on an area of the belt having substantially uniform properties/characteristics. Desirably, the seam passes impression stations at a time their impression rollers are not engaged with their corresponding pressure rollers. Alternatively, the belt may be seamless.

Blanket Lateral Guidance

In some instances, the blanket support system further includes a continuous track that can engage formations on the side edges of the blanket to maintain the blanket taut in its width ways direction. The formations may be spaced projections, such as the teeth of one half of a zip fastener sewn or otherwise attached to each side edge of the blanket. Such lateral formations need not be regularly spaced. Alternatively, the formations may be a continuous flexible bead of greater thickness than the blanket. The lateral formations may be directly attached to the edges of the blanket or through an intermediate strip that can optionally provide suitable elasticity to engage the formations in their respective guiding track, while maintaining the blanket flat in particular at the image forming station. The lateral track guide channel may have any cross-section suitable to receive and retain the blanket lateral formations and maintain it taut. To reduce friction, the guide channel may have rolling bearing elements to retain the projections or the beads within the channel.

The lateral formations may be made of any material able to sustain the operating conditions of the printing system, including the rapid motion of the blanket. Suitable materials can resist elevated temperatures in the range of about 50° C. to 250° C. Advantageously, such materials are also friction resistant and do not yield debris of size and/or amount that would negatively affect the movement of the belt during its operative lifespan. For example, the lateral projections can be made of polyamide reinforced with molybdenum disulfide.

As the lateral guide channels ensure accurate placement of the ink droplets on the blanket, their presence is particularly advantageous at the image forming station 300. In other areas, such as within the drying station 400 and an impression station 550, lateral guide channels may be desirable but less important. In regions where the blanket has slack, no guide channels are present. Further details on exemplary blanket lateral formations or seams that may be suitable for intermediate transfer members according to the present invention are disclosed in PCT Publication No. WO 2013/136220.

Such lateral formations and corresponding guide channels are typically not necessary when the intermediate transfer member is mounted on a rigid support.

The ends of the blanket strip are advantageously shaped to facilitate guiding of the belt through the lateral channels and over the rollers during installation. Initial guiding of the belt into position may be done for instance by securing the leading edge of the belt strip introduced first in between the lateral channels to a cable which can be manually or automatically moved to install the belt. For example, one or both lateral ends of the belt leading edge can be releasably attached to a cable residing within each channel. Advancing the cable(s) advances the belt along the channel path. Alternatively or additionally, the edge of the belt in the area ultimately forming the seam when both edges are secured one to the other can have lower flexibility than in the areas other than the seam. This local "rigidity" may ease the insertion of the lateral formations of the belt strip into their respective channels.

The blanket support system may comprise various additional optional subsystems.

Blanket Conditioning Station

In some printing systems, the intermediate transfer member may be optionally treated to further increase the interaction of the compatible ink with the ITM, or further facilitate the release of the dried ink image to the substrate, or provide for a desired printing effect. The treating station may apply a physical treatment or a chemical treatment. In some cases, the ITM is treated with a chemical agent also termed conditioning agent. The compositions being applied to the intermediate transfer member are often referred to as treatment solutions or conditioning fluids and the station at which such treatment may take place is referred to as a conditioning station. This station is typically located upstream the image forming station and the treatment is applied before an ink image is jetted.

Such a station is schematically illustrated in FIG. 2A as roller 190 positioned on the external side of the blanket adjacent to roller 106 and in FIG. 2C as applicator 192. Such a roller 190 or applicator 192 may be used to apply a thin even film of treatment solution containing a conditioning chemical agent. The conditioning fluid can alternatively be sprayed onto the surface of the blanket and optionally spread more evenly, for example by the application of a jet from an air knife. Alternatively, the conditioning solution may be applied by passing the blanket over a thin film of conditioning solution seeping through a cloth having no direct contact with the surface of the release layer. Surplus of treatment solution, if any, can be removed by air knife, scrapper, squeegee rollers or any suitable manner. As the film of conditioning solution being applied is typically very thin, the blanket surface is substantially dry upon entry through the image forming station. Typically, when needed, the conditioning solution is applied with every cycle of the belt. Alternatively, it may be applied periodically at intervals of suitable number of cycles.

Blanket Cleaning Station

Though not shown in the figures, the blanket system may further comprise a cleaning station which may be used to gently remove any residual ink images or any other trace particle from the release layer. Such cleaning step may for instance be applied in between printing jobs to periodically "refresh" the belt. The cleaning station may comprise one or more devices each individually configured to remove same or different types of undesired residues from the surface of the release layer. In one embodiment, the cleaning station may comprise a device configured to apply a cleaning fluid to the surface of the transfer member, for example a roller having cleaning liquid on its circumference, which preferably should be replaceable (e.g., a pad or piece of paper). Residual particles may optionally be further removed by an absorbent roller or by one or more scraper blades.

The Control Systems

The above descriptions are simplified and provided only for the purpose of enabling an understanding of exemplary printing systems and processes with which the presently claimed invention may be used. In order for the image to be properly formed on the blanket and transferred to the final substrate and for the alignment of the front and back images in duplex printing to be achieved, a number of different elements of the system must be properly synchronized. In order to position the images on the blanket properly, the position and speed of the blanket must be both known and controlled. For this purpose, the blanket can be marked at or near its edge with one or more markings spaced in the direction of motion of the blanket. One or more sensors can be located in the printing system along the path of the blanket to sense the timing of these markings as they pass the sensor. Signals from the sensor(s) can be sent to a controller which may also receive an indication of the speed of rotation and angular position of any of the rollers conveying the blanket, for example from encoders on the axis of one or both of the impression rollers. The sensor(s) may also determine the time at which the seam of the blanket passes the sensor. For maximum utility of the usable length of the blanket, it is desirable that the images on the blanket start as close to the seam as feasible. For a successful printing system, the control of the various stations of the printing system is important but need not be considered in detail in the present context. Exemplary control systems that may be suitable for printing systems in which the present invention can be practiced are disclosed in PCT Publication No. WO 2013/132424.

A method of digital printing by a printing system configured to convert digital input images into ink images by droplet deposition onto a target surface is disclosed. The printing system comprises a multi-nozzle and multi-head print bar that defines print and cross-print directions. The method comprises a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf(bar) for the entire print bar; iv. for each slice $slice_i$(DOCI) of a plurality {$slice_1$(DOCI), $slice_2$ (DOCI) . . . $slice_N$(DOCI)} of slices of the digital output-calibration-image DOCI, computing a respective slice-specific tone-reproduction-function trf($slice_i$(DOCI)); and v. for each of slice $slice_i$(DOCI) of the slice-plurality, applying a respective inverse of a respective slice-specific tone-reproduction-function to the representative print-bar tone-reproduction-function trf(bar) to yield a tone-shift-function-set tsfs(DOCI)={tsf_$slice_1$(DOCI)(tone-value), tsf_$slice_2$ (DOCI)(tone-value), . . . tsf_$slice_N$ (DOCI)(tone-value)} of slice-specific tone-shift functions; and vi. deriving a print-bar-spanning image-correction-function ICF (cross-print-direction-location, tone-value) from the tone-shift-function-set tsfs(DOCI) of slice-specific tone-shift functions; b. applying the image-correction-function ICF to a uncorrected digital image UDI so as to compute a corrected digital image CDI; and c. printing the corrected digital image CDI by the printing system.

A method of digital printing by a printing system configured to convert digital input images into ink images by droplet deposition onto a target surface is disclosed. The printing system comprises a multi-nozzle and multi-head print bar that defines print and cross-print directions. The method comprises a. performing a calibration by: i. printing on the target surface a digital input-calibration-image DICI by the print-bar of the printing system so as to generate an ink calibration-image; ii. optically imaging the ink calibration-image to obtain a digital output-calibration-image DOCI; iii. computing from the digital output-calibration-image DOCI a representative print-bar tone-reproduction-function trf(bar) for the entire print bar; iv. for each slice $slice_i$(DOCI) of a plurality {$slice_1$(DOCI), $slice_2$ (DOCI) . . . $slice_N$(DOCI)} of slices of the digital output-calibration-image DOCI, computing a respective slice-specific tone-reproduction-function trf($slice_i$(DOCI)); and v. and vi. deriving a print-bar-spanning image-correction-function ICF (cross-print-direction-location, tone-value) from the slice-specific and/or print-bar tone reproduction function(s); b. applying the image-correction-function ICF to a uncorrected digital image UDI so as to compute a corrected digital image CDI; and c. printing the corrected digital image CDI by the printing system.

In some embodiments, i. the printing system is configured so that images produced by the print-bar thereof are dividable into alternating single-print-head slices and interlace slices; ii. within the single-print-head slices, the ICF is derived primarily from region-internal DOCI data; and iii. within the interlace slices, the ICF is derived primarily from extrapolation of region external DOCI data.

In some embodiments, i. the printing system is configured so that images produced by the print-bar thereof comprise first and second distinct single-print-head slices and a mediating slice therebetween, the first and second single-print-head slices being respectively exclusive for first and second print-heads; ii. the mediating slice includes first and second sets of positions interlaced therein, positions of the first and second set respectively corresponding to nozzle positions for nozzles of the first and second print heads; iii. the deriving of the ICF includes computing first and second extrapolation functions respectively describing extrapolation from the first and second single-print-head slices into the mediating region of DOCI data, or a derivative thereof; and iv. within the mediating region, (A) at positions of the first set, the ICF is derived primarily from the first extrapolation function and (B) at positions of the second set, the ICF is derived primarily from the second extrapolation function.

In some embodiments, i. the printing system is configured so that images produced by the print-bar thereof comprise first and second of distinct single-print-head slices and a interlace slice therebetween, the first and second single-print-head slices being respectively exclusive for first and second print-heads; ii. the interlace slice includes first and second sets of positions interlaced therein, positions of the first and second set respectively corresponding to nozzle positions for nozzles of the first and second print heads; and iii. within the interlace region, the ICF is computed by determining if a position in the mediating region corresponds to a nozzle position of the first print-head or the second print-head, and the ICF is computed according to the results of the determining.

In some embodiments, i. the printing system is configured so that images produced by the print-bar thereof comprise first and second of distinct single-print-head slices and a mediating slice therebetween, the first and second single-print-head slices being respectively exclusive for first and second print-heads; ii. the mediating region includes first $P_1$ and second $P_2$ positions, the first position $P_1$ being closer to the first single-print-head slice than the second $P_2$ position is to the first single-print-head slice, the second position $P_2$ being closer to the second single-print-head slice than the first position $P_1$ is to the second single-print-head slice; iii. the deriving of the ICF includes computing first and second extrapolation functions respectively describing extrapolation from the first and second single-print-head slices into the mediating region of DOCI data, or a derivative thereof; and iv. when computing ICF for the first position, a greater weight is assigned to the second extrapolation function than to the first extrapolation function; and v. when computing ICF for the second position, a greater weight is assigned to the first extrapolation function than to the second extrapolation function.

In some embodiments, the target surface is a surface of an intermediate transfer member (ITM) of the printing system and the ink images formed on the ITM surface by the droplet deposition are subsequently transferred from the ITM to a printing substrate.

In some embodiments, the ITM is a drum.

In some embodiments, the ITM is a belt.

In some embodiments, the ink and/or target surface may provide any feature or combination of features disclosed in any of the following published patent applications, each of which are incorporated herein by reference in its entirety: WO 2013/132439; WO 2013/132432; WO 2013/132438; WO 2013/132339; WO 2013/132343; WO 2013/132345; and WO 2013/132340.

In some embodiments, the calibration image comprises a plurality of stripes, each having a uniform tone value.

In some embodiments, the stripes of the calibration image having same tone value span the entire print-bar.

In some embodiments, the digital input-calibration-image or portions thereof is printed on a single target surface.

In some embodiments, the digital input-calibration-image or portions thereof is printed on two or more different target surfaces.

In some embodiments, the calibration is performed off-line. In such embodiments, the target surface consists of the calibration image or portions thereof that may be subsequently combined.

In some embodiments, the calibration is performed on-line. In such embodiments, the target surface consists of a desired image and of the calibration image or portions thereof. In particular embodiments, the calibration image, or portions thereof that may be subsequently combined, is printed on two or more different target surfaces. In such embodiments, the calibration image or portions thereof can be printed on areas of the target surface not overlapping the desired image (e.g., in margins).

In some embodiments, the printing system comprises a plurality of print bars, each said print-bar depositing an ink having same or different color, the calibration being performed separately for each ink having a different color and/or for each print bar.

In some embodiments, the calibration is performed sequentially more than once to further refine the computing of the corrected digital image CDI—for example, after affecting a first correction the results may be analyzed and, if appropriate, an additional correction may be performed.

In some embodiments, the calibration is sequentially performed by sequences of any of off-line and on-line calibration stages that may be the same or different. For instance, the sequences of calibration can be off-line and off-line calibration, off-line and on-line calibration, on-line and off-line calibration, on-line and on-line calibration, and further combinations. Such multiple calibrations need not be immediately sequential, the "sequence" being "interrupted" by the printing of desired images on the target surfaces, such printing being devoid of calibration.

In some embodiments, the droplet deposition is by ink jetting.

In some embodiments, the ink images are deposited at a resolution between 100 dpi and 2000 dpi.

In some embodiments, the width of a slice of any slice disclosed herein (e.g., a single-, or a single-print-head, or a 'mediating', or an 'interlace slice') is no less than 5 pixels, or is no less than 10 pixels, or no less than 20 pixels, or no less than 40 pixels, or no less than 60 pixels, or no less than 100 pixels. In some embodiments, the target surface is a surface of an intermediate transfer member (ITM) (e.g., a drum or belt) of the printing system and the ink images formed on the ITM surface by the droplet deposition are subsequently transferred from the ITM to a printing substrate.

In some embodiments, the ink images are deposited on a target surface being a printing substrate (e.g., selected from fibrous and non fibrous, coated and uncoated, flexible and rigid, sheets and webs delivered substrate of paper, cardboard, plastic and additional suitable material).

In some embodiments, the calibration is done upon installation or change of one or more print-heads within a print-bar.

Discussion of FIGS. 20 to 23

FIGS. 20 to 23 show a printing system as described in PCT Application No. PCT/IB2013/051716 and are similar to FIGS. 1 to 4 in the latter application. Their description is reproduced below to provide a detailed understanding of the process of indirect inkjet printing using water-based inks. FIGS. 20 to 23 are not, however, in accordance with embodiments of the invention, but differ from it in that they show a single intermediate transfer member having two spaced impression stations. By contrast, in embodiments of the invention, as will be described below by reference to FIGS. 24 to 26, each impression station forms part of a separate printing tower that includes its own intermediate transfer member and its own image forming system.

Essentially the printing system illustrated in FIGS. 20 to 23 comprises three separate and mutually interacting systems, namely a blanket system 1100, an image forming system 1300 above the blanket system 1100 and a substrate transport system 1500 below the blanket system 1100.

The blanket system 1100 comprises an endless belt or blanket 1102 that acts as an intermediate transfer member and is guided over two rollers 1104, 1106. As will be described with reference to FIGS. 9 and 10, it is alternatively possible to use a rigid drum to support the blanket. An image made up of dots of an ink is applied by the image forming system 1300 to an upper run of the blanket 1102. A lower run selectively interacts at two impression stations with two impression cylinders 1502 and 1504 of the substrate transport system 1500 to impress an image onto a substrate compressed between the blanket 1102 and the respective impression cylinder 1502, 1504 by the action of respective pressure rollers 1140, 1142. The purpose of there being two impression cylinders 1502, 1504 in the illustrated printing system is to permit duplex printing using a single intermediate transfer member. It should be noted by contrast that in the present invention only one impression station is present per transfer member.

In operation, ink images, each of which is a mirror image of an image to be impressed on a final substrate, are printed by the image forming system 1300 onto the upper run of blanket 1102. In this context, the term "run" refers to a length or segment of the blanket between any two given rollers over which the blanket is guided. While being transported by the blanket 1102, the ink is heated to dry it by evaporation of most, if not all, of its liquid carrier. The ink image is furthermore heated to render tacky the film of ink solids remaining after evaporation of the liquid carrier, this film being referred to as a residue film, to distinguish it from the thicker liquid film formed by flattening of each ink droplet upon impact with the transfer member. At the impression cylinders 1502, 1504 the image is impressed onto individual sheets 1501 of a substrate which are conveyed by substrate transport system 1500 from an input stack 1506 to an output stack 1508 via the impression cylinders 1502, 1504. The residue film is rendered tacky typically when a polymeric resin of a suitable ink composition is softened so as to increase the subsequent ability of the film to adhere to the substrate as compared to its ability to adhere to the transfer member.

Image Forming System

In an embodiment of the invention, the image forming system 1300 comprises print bars 1302 each slidably mounted on a frame 1304 positioned at a fixed height above the surface of the blanket 1102. Each print bar 1302 may comprise a strip of print heads as wide as the printing area on the blanket 1102 and comprises individually controllable print nozzles. The image forming system can have any number of bars 1302, each of which may contain an ink of a different color.

As some print bars may not be required during a particular printing job, the heads can be moved between an operative position, in which they overlie the blanket 1102 and an inoperative position. A mechanism is provided for moving print bars 1302 between their operative and inoperative positions, but the mechanism is not illustrated and need not be described herein as it is not relevant to the printing process. It should be noted that the bars preferably remain stationary during printing.

When moved to their inoperative position, the print bars can be covered for protection and to prevent the nozzles of the print bar from drying or clogging. In an embodiment of the invention, the print bars are parked above a liquid bath (not shown) that assists in this task. Print bars that are in the inoperative position can be changed and accessed readily for maintenance, even while a printing job is in progress using other print bars.

Within each print bar, the ink may be constantly recirculated, filtered, degassed and maintained at a desired temperature and pressure. As the design of the print bars may be conventional, or at least similar to print bars used in other inkjet printing applications, their construction and operation will be clear to the person skilled in the art without the need for more detailed description.

As different print bars 1302 are spaced from one another along the length of the blanket, it is of course essential for their operation to be correctly synchronized with the movement of blanket 1102. Further details of suitable control systems for such printing systems are disclosed in PCT Application No. PCT/IB2013/051727.

If desired, it is possible to provide a blower 1306 following each print bar 1302 to blow a slow stream of a hot gas, preferably air, over the intermediate transfer member to commence the drying of the ink droplets deposited by the print bar 1302. This assists in fixing the droplets deposited by each print bar 1302, that is to say resisting their contraction and preventing their movement on the intermediate transfer member, and also in preventing them from merging into droplets deposited subsequently by other print bars 1302.

In one embodiment of the invention, the inks used in the print heads comprise nano-particles of organic polymeric resin and coloring agent (e.g. pigment or dye) suspended or dissolved in an aqueous carrier. The nano-pigments can have an average particle size $D_{50}$ of at least 10 nm and of at most 300 nm, however such range may vary for each ink color and in some embodiments the pigments may have a $D_{50}$ of at most 200 nm or of at most 100 nm. Acrylic polymers and acrylic-styrene co-polymers with an average molecular weight around 60,000 g/mole have been found to be suitable resins. Further details of non-limiting examples of ink compositions suitable for the printing processes and systems of the present invention are disclosed in PCT Application No. PCT/IB2013/051755.

Blanket and Blanket Support System

The blanket 1102, in one embodiment of the invention, is seamed. In particular, the blanket is formed of an initially elongate flat strip of which the ends are releasably or permanently fastened to one another to form a continuous loop. The releasable fastening may be a zip fastener or a hook and loop fastener that lies substantially parallel to the axes of rollers 1104 and 1106 over which the blanket is guided. Permanent fastening may be achieved, for example following installation of the blanket over its rollers, by adhering its opposite ends one to another to form a continuous belt loop by soldering, gluing, taping (e.g. using Kapton® tape, RTV liquid adhesives or PTFE thermoplastic adhesives with a connective strip overlapping both ends of the strip), or any other method commonly known. Any method of joining the ends of the blanket may cause a discontinuity, referred to herein as a seam, and it is desirable to avoid an increase in the thickness or discontinuity of chemical and/or mechanical properties of the belt at the seam. In order to avoid a sudden change in the tension of the blanket as the seam passes over these rollers, it is desirable to incline the fastener relative to the axis of the roller but this enlarges the non-printable image area. In an alternative embodiment, the blanket forms a continuous and seamless loop, the belt having the same properties along its circumference.

The primary purpose of the blanket is to receive an ink image from the image forming system and to transfer that image dried but undisturbed to the impression stations. To allow easy transfer of the ink image at each impression station, the blanket has a thin upper release layer that is hydrophobic. The outer surface of the transfer member upon which an aqueous ink can be applied may comprise a silicone material. A silanol-terminated polydialkylsiloxane material, as well as other silanol-, sylyl- or silane-modified or terminated polydialkylsiloxane curable silicone polymers, and amino silicones have been found to work well, but it is believed that the exact formulation of the silicone is not critical and any material that allows for release of the image from the transfer member to a final substrate is believed to be suitable. Further details of non-limiting examples of release layers and intermediate transfer members are disclosed in PCT Applications No. PCT/IB2013/051743 and No. PCT/IB2013/051751. Suitably, the materials forming the release layer allow it to be not absorbent. Preferably, the material is selected so that the transfer member does not swell (or is not solvated) by the carrier liquid of the ink or of any other fluid that may be applied to the release layer.

The strength of the blanket can be derived from a reinforcement layer. In one embodiment, the reinforcement layer is formed of a fabric. If the fabric is woven, the warp and weft threads of the fabric may have a different composition or physical structure so that the blanket should have, for reasons to be discussed below, greater elasticity in its width ways direction (parallel to the axes of the rollers 1104 and 1106) than in its lengthways direction, in which it is preferably substantially non-extendible. In one embodiment, the fibers of the reinforcement layer in the longitudinal direction are substantially aligned with the printing direction and are made of high performance fibers (e.g. aramid, carbon, ceramic, glass fibers etc.)

The blanket may comprise additional layers between the reinforcement layer and the release layer, for example to provide conformability and compressibility of the release layer to the surface of the substrate, to act as a thermal reservoir or a thermal partial barrier and/or to allow an electrostatic charge to the applied to the release layer. An inner layer may further be provided to control the frictional drag on the blanket as it is rotated over its support structure. Other layers may be included to adhere or connect the afore-mentioned layers one with another or to prevent migration of molecules therebetween.

The structure supporting the blanket is shown in FIGS. 7 and 8. Two elongate outriggers 1120 are interconnected by a plurality of cross beams 1122 to form a horizontal ladder-like frame on which the remaining components are mounted.

The roller 1106 is journalled in bearings that are directly mounted on outriggers 1120. At the opposite end, however, the roller 1104 is journalled in pillow blocks 1124 that are guided for sliding movement relative to outriggers 1120. Motors 1126, for example electric motors, which may be stepper motors, act through suitable gearboxes to move pillow blocks 1124, so as to alter the distance between the axes of rollers 1104 and 1106, while maintaining them parallel to one another.

Thermally conductive support plates 1130 are mounted on cross beams 1122 to form a continuous flat support surface both on the top side bottom sides of the support frame. The junctions between the individual support plates 1130 are intentionally offset from each other (e.g., zigzagged) in order not to create a line running parallel to the length of the blanket 1102. Electrical heating elements 1132 are inserted into transverse holes in the plates 1130 to apply heat to the plates 1130 and through the plates 1130 to the blanket 1102. Other means for heating the blanket will occur to the person of skill in the art and may include heating from below, above of within the blanket itself.

Also mounted on the blanket support frame are two pressure or nip rollers 1140, 1142. The pressure rollers are located on the underside of the support frame in gaps between the support plates 1130 covering the underside of the frame. Pressure rollers 1140, 1142 are aligned respectively with impression cylinders 1502, 1504 of the substrate transport system. Each impression cylinder and corresponding pressure roller, when engaged as described below, form an impression station.

Each of the pressure rollers 1140, 1142 is mounted so that it can be raised and lowered from the lower run of the blanket. In one embodiment each pressure roller is mounted on an eccentric that is rotatable by a respective actuator 1150, 1152. When it is raised by its actuator to an upper position within the support frame, each pressure roller is spaced from the opposing impression cylinder, allowing the blanket to pass by the impression cylinder without making contact with neither the impression cylinder itself nor with a substrate carried by the impression cylinder. On the other hand, when moved downwards by its actuator, each pressure roller 1140, 1142 projects downwards beyond the plane of the adjacent support plates 1130 and deflects the blanket 1102, forcing it against the opposing impression cylinder 1502, 1504. In this lower position, it presses the lower run of the blanket against a final substrate being carried on the impression roller.

In embodiments of the present invention, it is optional for a pressure or nip roller to be disengageable from its impression cylinder. In embodiments using a seamed blanket, it is either possible to use a disengageable nip roller to assist in allowing the seam to pass between the nip roller and the impression cylinder, or one may rely solely on the passage of the seam being timed to coincide with an optional recess in the surface of the impression cylinder that can for instance be used to accommodate grippers for holding the substrate sheets in position on the impression cylinder. In an alternative embodiment, the blanket may be seamless and the impression cylinder continuous, for instance when printing on a web substrate. The rollers 1104 and 1106 are connected to respective electric motors 1160, 1162. The motor 1160 is the more powerful and serves to drive the blanket clockwise as viewed in FIGS. 7 and 8. The motor 1162 provides a torque reaction and can be used to regulate the tension in the upper run of the blanket. The motors 1160, 1162 may operate at the same speed in an embodiment in which the same tension is maintained in the upper and lower runs of the blanket.

Alternatively, the motors 1160 and 1162 may be operated in such a manner as to maintain a higher tension in the upper run of the blanket where the ink image is formed and a lower tension in the lower run of the blanket. The lower tension in the lower run may assist in absorbing sudden perturbations caused by the abrupt engagement and disengagement of blanket 1102 with impression cylinders 1502 and 1504.

In an embodiment of the invention, a fan or air blower (not shown) is mounted on the frame to maintain a sub-atmospheric pressure in the volume 1166 bounded by the blanket and its support frame. The negative pressure serves to maintain the blanket flat against the support plates 1130 on both the upper and the lower side of the frame, in order to achieve good thermal contact. If the lower run of the blanket is set to be relatively slack, the negative pressure would also assist in maintaining the blanket out of contact with the impression cylinders when the pressure rollers 1140, 1142 are not actuated.

In an embodiment of the invention, each of the outriggers 1120 also supports a continuous track 1180, which engages formations on the side edges of the blanket to maintain the blanket taut in its width ways direction. The formations may be spaced projections, such as the teeth of one half of a zip fastener sewn or otherwise attached to the side edge of the blanket. Alternatively, the formations may be a continuous flexible bead of greater thickness than the blanket. The lateral track guide channel may have any cross-section suitable to receive and retain the blanket lateral formations and maintain it taut. To reduce friction, the guide channel may have rolling bearing elements to retain the projections or the beads within the channel.

To mount a blanket on its support frame, according to one embodiment of the invention, entry points are provided along tracks 1180. One end of the blanket is stretched laterally and the formations on its edges are inserted into tracks 1180 through the entry points. Using a suitable implement that engages the formations on the edges of the blanket, the blanket is advanced along tracks 1180 until it encircles the support frame. The ends of the blanket are then fastened to one another to form an endless loop. The rollers 1104 and 1106 can then be moved apart to tension the blanket and stretch it to the desired length. Sections of tracks 1180 are telescopically collapsible to permit the length of the track to vary as the distance between rollers 1104 and 1106 is varied. Further details on non limiting exemplary formations, corresponding tracks and methods of mounting a blanket are disclosed in PCT Application No. PCT/IB2013/051719.

In order for the image to be properly formed on the blanket and transferred to the final substrate, a number of different elements of the system must be properly synchronized. In order to position the images properly on the blanket, the position and speed of the blanket must be both known and controlled. In an embodiment of the invention, the blanket is marked at or near its edge with one or more markings spaced in the direction of motion of the blanket. The marking(s) may for example be applied to the surface of the blanket that may be sensed magnetically or optically by a suitable detector. Alternatively, a marking may take the form of an irregularity in the lateral projections that are used to tension the blanket, for example a missing tooth, hence serving as a mechanical position indicator. One or more sensors (not shown) senses the timing of these markings as they pass the sensor. The speed of the blanket and the speed of the surface of the impression rollers should be the same, for proper transfer of the images to the substrate from the transfer blanket. Signals from the sensor 1107 are sent to a controller 1109 which also receives an indication of the speed of rotation and angular position of the impression rollers, for example from encoders on the axis of one or both of the impression rollers (not shown). The sensor 1107, or another sensor (not shown), also determines the time at which the seam of the blanket passes the sensor. For maximum utility of the usable length of the blanket, it is desirable that the images on the blanket start as close to the seam as feasible.

The controller controls the electric motors 1160 and 1162 to ensure that linear speed of the blanket is the same as the speed of the surface of the impression rollers.

Because the blanket contains an unusable area resulting from the seam, it is important to ensure that this area always remain in the same position relative to the printed images in consecutive cycles of the blanket. Also, it is preferable to ensure that whenever the seam passes the impression cylinder, it should always coincides with a time when the recess in the surface of the impression cylinder that accommodates the substrate grippers faces the blanket.

Preferably, the length of the blanket is set to be a whole number multiple of the circumference of the impression cylinders 1502, 1504. In embodiments wherein the impression cylinder may accommodate two sheets of substrate, the length of the blanket may be a whole multiple of half the circumference of an impression cylinder. Since the length of the blanket may change with time and/or temperature, the position of the seam relative to the impression rollers is preferably changed, by momentarily changing the speed of the blanket. When synchronism is again achieved, the speed of the blanket is again adjusted to match that of the impression rollers, when it is not engaged with the impression cylinders 1502, 1504. The length of the blanket can be determined from a shaft encoder measuring the rotation of one of rollers 1104, 1106 during one sensed complete revolution of the blanket.

The controller also controls the timing of the flow of data to the print bars and may control proper timing of any optional sub-system of the printing system, as known to persons skilled in the art of printing.

This control of speed, position and data flow ensures synchronization between image forming system 1300, substrate transport system 1500 and blanket system 1100 and ensures that the images are formed at the correct position on the blanket for proper positioning on the final substrate.

As its length is a factor in synchronization, the blanket is required to resist stretching and creep. In the transverse direction, on the other hand, it is only required to maintain the blanket flat taut without creating excessive drag due to friction with the support plates 1130. It is for this reason that, in an embodiment of the invention, the elasticity of the blanket is intentionally made anisotropic.

Blanket Pre-Treatment

Figure 20:
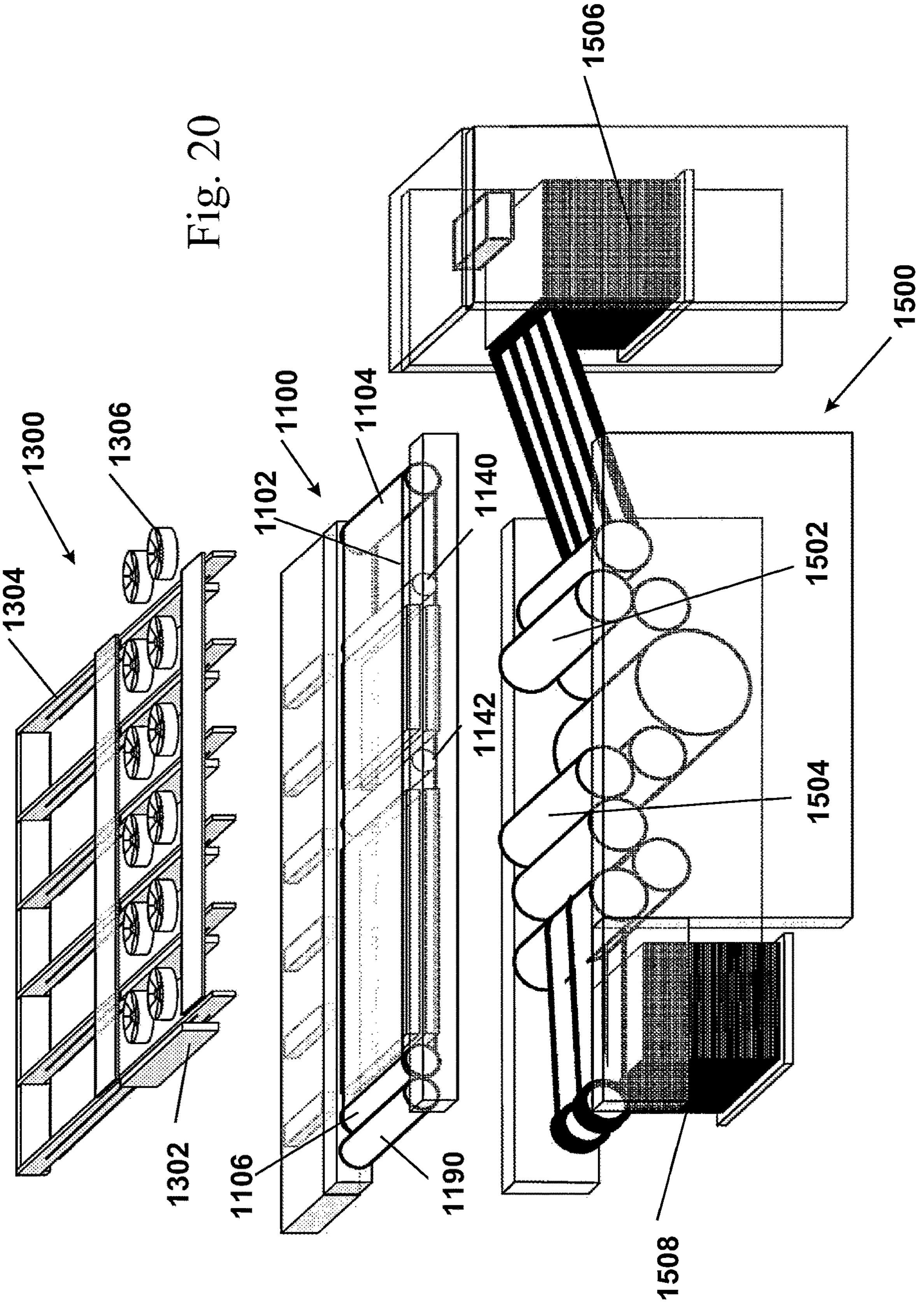
FIG. 20 is an exploded schematic perspective view of a printing system as described in PCT Application No. PCT/IB2013/051716.

FIG. 20 shows schematically a roller 1190 positioned externally to the blanket immediately before the roller 1106, according to an embodiment of the invention. The function of this roller is if required to apply a thin film of pre-treatment solution containing a chemical agent, for example a dilute solution of a charged polymer, to the surface of the blanket. The film is preferably, totally dried by the time it reaches the print bars of the image forming system, to leave behind a very thin layer on the surface of the blanket that assists the ink droplets to retain their film-like shape after they have impacted the surface of the blanket.

While a roller can be used to apply an even film, in an alternative embodiment the elective pre-treatment material is sprayed onto the surface of the blanket and spread more evenly, for example by the application of a jet from an air knife, a drizzle from sprinkles or undulations from a fountain. The pre-treatment solution may be removed from the transfer member shortly following its exposure therewith (e.g. using air flow).

The average thickness of the elective pre-treatment solution may vary between initial application, optional removal and dried stage and is typically below 1000 nanometers, below 800 nm, below 600 nm, below 400 nm, below 200 nm, below 100 nm, below 50 nm, below 20 nanometers, below 10 nanometers, below 5 nanometers, or below 2 nanometers.

The purpose of the optionally applied chemical agent is to counteract the effect of the surface tension of the aqueous ink upon contact with the hydrophobic release layer of the blanket. It is believed that such pre-treatment chemical agents, for instance some charged or chargeable polymers comprising amine nitrogen atoms in a plurality of functional groups each independently selected from linear, branched and cyclic, primary amines, secondary amines, tertiary amines, and quaternized ammonium groups and having a relatively high charge density and molecular weight (e.g. at least 10,000 g/mole), will bond (temporarily at least), with the silicone surface of the transfer member to form a positively charged layer. Suitable conditioning agents include linear and branched polyethylene imine (PEI), modified polyethylene imine, guar hydroxylpropyltrimonium chloride, hydroxypropyl guar hydroxyl-propyl-trimonium chloride, vinyl pyrrolidone dimethylaminopropyl methacrylamide copolymer, vinyl caprolactam dimethylaminopropyl methacrylamide hydroxyethyl methacrylate, quaternized vinyl pyrrolidone dimethylaminoethyl methacrylate copolymer, poly(diallyldimethyl-ammonium chloride), poly(4-vinylpyridine) and polyallylamine.

However, the amount of charge that is present in such layer is believed to be much smaller than that in the droplet itself. The present inventors have found that a very thin layer, perhaps even a layer of molecular thickness will be adequate. This layer of pre-treatment of the transfer member, if required, may be applied in very dilute form of the suitable chemical agents. Ultimately this thin layer may be transferred onto the substrate, along with the image being impressed. Further details on exemplary pretreatment solutions are disclosed in PCT Application No. PCT/IB2013/000757.

When the droplet impinges on the transfer member, the momentum in the droplet causes it to spread into a relatively flat volume. In the prior art, this flattening of the droplet is almost immediately counteracted by the combination of surface tension of the aqueous droplet and the hydrophobic nature of the surface of the transfer member.

The shape of the ink droplet is preferably “frozen” such that at least some and preferably a major part of the flattening and horizontal extension of the droplet present on impact is preserved. It should be understood that since the recovery of the droplet shape after impact is very fast, the methods of the prior art would not effect phase change by agglomeration and/or coagulation and/or migration.

Without wishing to be bound by theory, it is believed that, on impact, van der Waals forces acting between the molecules of the polymer and/or pigment particles in the ink and molecules residing on the surface of the hydrophobic release layer (stemming either from the composition of the release layer and/or from the composition of the pretreatment solution) act to resist the beading up of the droplets under the action of surface tension.

The amount of charge on the surface of the intermediate transfer member is too small to adhere more than a small number of particles, so that, it is believed, the concentration and distribution of particles in the drop is not substantially changed. Furthermore, since the ink is aqueous, the effects of the positive charge are very local, especially in the very short time span needed for freezing the shape of the droplets (at most few seconds and generally less than one).

However, it has been surprisingly found that this attraction has a profound effect on the shape of the droplets after they stabilize. It is believed that the attractive force acts to counteract the repelling of the water in the ink by the silicone. The result is that a relatively flat droplet film of ink of greater extent than would be present in the absence of the charge on the silicone surface is formed on the transfer member. Furthermore, since in areas that are not reached by the droplet the effective hydrophobic nature of the transfer member is maintained, there is little or no spreading of the droplet above that achieved in the initial impact and the boundaries of the droplet are distinct.

While applicants have found that coating or spraying the transfer member with a chargeable polymer is an effective method for fixing the droplets, it is believed that otherwise transferring positive charge to the transfer member is also possible, although this is a much more complex process. Other effects that may contribute to the shape of the droplet remaining as a flattened film are quick heating of the droplet that increases its viscosity, a barrier (the polymer coating) that reduces the hydrophobic effect of the silicone coating and a surfactant that reduces the surface tension of the ink.

The residue film may have an average thickness below 1500 nanometers, below 1200 nm, below 1000 nm, below 800 nanometers, below 600 nm, below 500 nm, below 400 nm, below 300 nm, below 200 nm, and of at least 50 nm, at least 100 nm, or at least 150 nm.

Ink Image Heating

The heaters 1132 inserted into the support plates 1130 are used to heat the blanket to a temperature that is appropriate for the rapid evaporation of the ink carrier and compatible with the composition of the blanket. For blankets comprising for instance silanol-, sylyl- or silane-modified or terminated polydialkylsiloxane silicones in the release layer, heating is typically of the order of 150° C., though this temperature may vary within a range from 120° C. to 180° C., depending on various factors such as the composition of the inks and/or of the pre-treatment solutions if needed. Blankets comprising amino silicones may generally be heated to temperatures between 70° C. and 130° C. When using the illustrated beneath heating of the transfer member, it is desirable for the blanket to have relatively high thermal capacity and low thermal conductivity, so that the temperature of the body of the blanket 1102 will not change significantly as it moves between the optional pre-treatment station, the image forming system and the impression station(s). To apply heat at different rates to the ink image carried by the transfer surface, external heaters or energy sources (not shown) may be used to apply additional energy locally, for example prior to reaching the impression stations to render the ink residue tacky, prior to the image forming system to dry the optional pre-treatment agent and at the image forming system to start evaporating the carrier from the ink droplets as soon as possible after they impact the surface of the blanket.

The external heaters may be, for example, hot gas or air blowers or radiant heaters focusing, for example, infra red radiation onto the surface of the blanket, which may attain temperatures in excess of 175° C., 190° C., 200° C., 210° C., or even 220° C.

If the ink contains components sensitive to ultraviolet light then an ultraviolet source may be used to help cure the ink as it is being transported by the blanket.

Substrate Transport System

In FIGS. 5 and 6, individual sheets are advanced, for example by a reciprocating arm, from the top of an input stack 1506 to a first transport roller 1520 that feeds the sheet to the first impression cylinder 1502.

Though not shown in the drawings, but known per se, the various transport rollers and impression cylinders may incorporate grippers that are cam operated to open and close at appropriate times in synchronism with their rotation so as to clamp the leading edge of each sheet of substrate. In an embodiment of the invention, the tips of the grippers at least of impression cylinders 1502 and 1504 are designed not to project beyond the outer surface of the cylinders to avoid damaging blanket 1102.

After an image has been impressed onto one side of a substrate sheet during passage between impression cylinder 1502 and blanket 1102 applied thereupon by pressure roller 1140, the sheet is fed by a transport roller 1522 to a perfecting cylinder 1524 that has a circumference that is twice as large as the impression cylinders 1502, 1504. The leading edge of the sheet is transported by the perfecting cylinder past a transport roller 1526, of which the grippers are timed to catch the trailing edge of the sheet carried by the perfecting cylinder and to feed the sheet to second impression cylinder 1504 to have a second image impressed onto its reverse side. The sheet, which has now had images printed onto both its sides, is advanced by a belt conveyor 1530 from second impression cylinder 1504 to output stack 1508.

Figure 24:
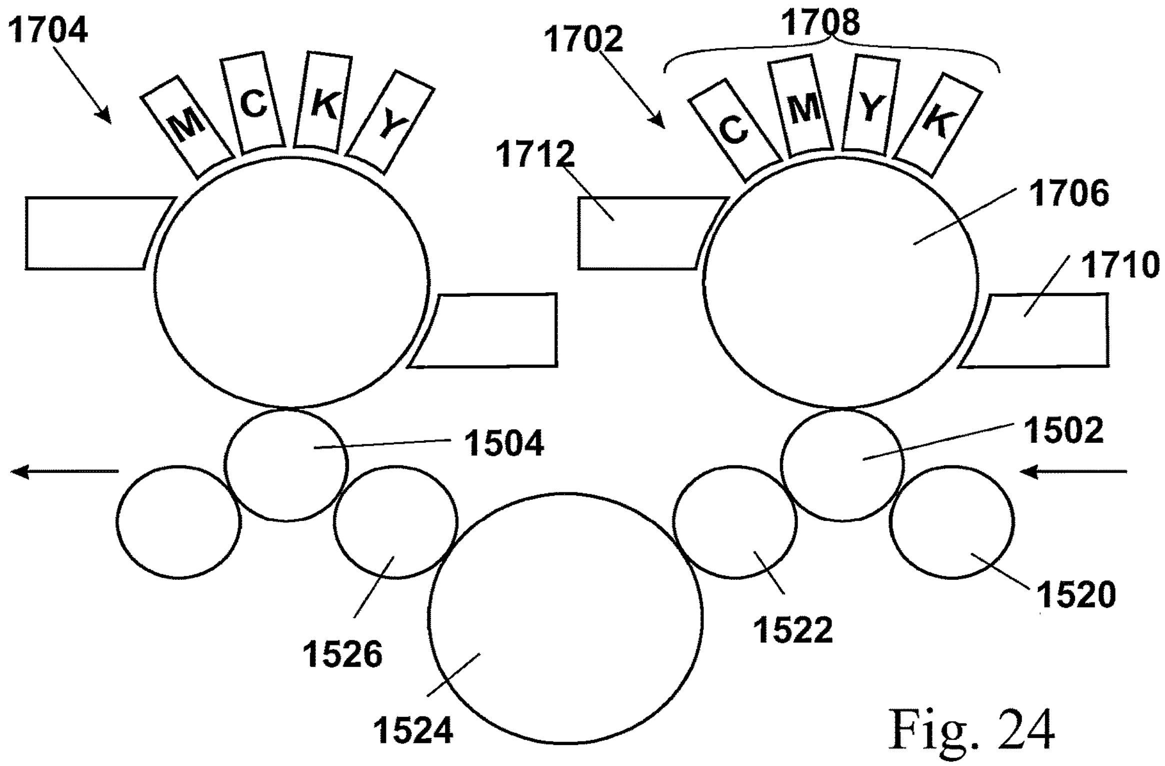
FIG. 24 is a schematic representation of a third embodiment of the invention when operating in duplex perfecting mode.
Figure 25:
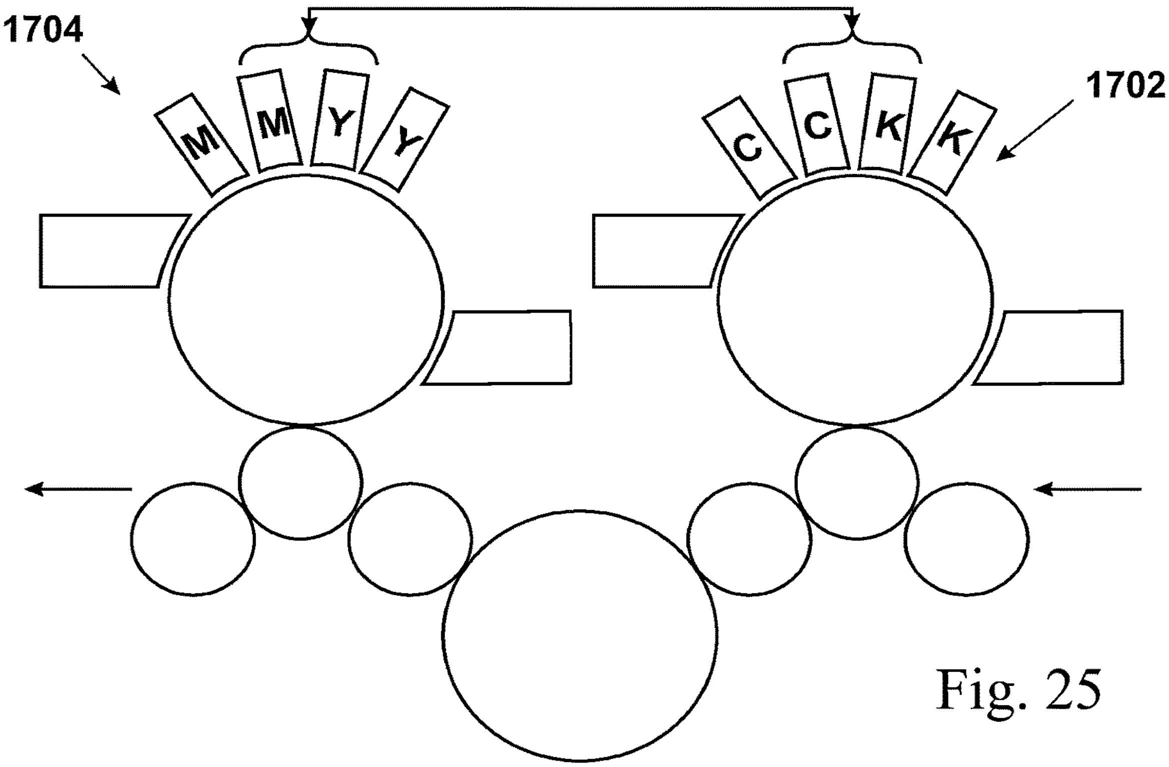
FIG. 25 is a similar schematic representation of the embodiment of FIG. 24, when operating in simplex full color mode.
Figure 26:
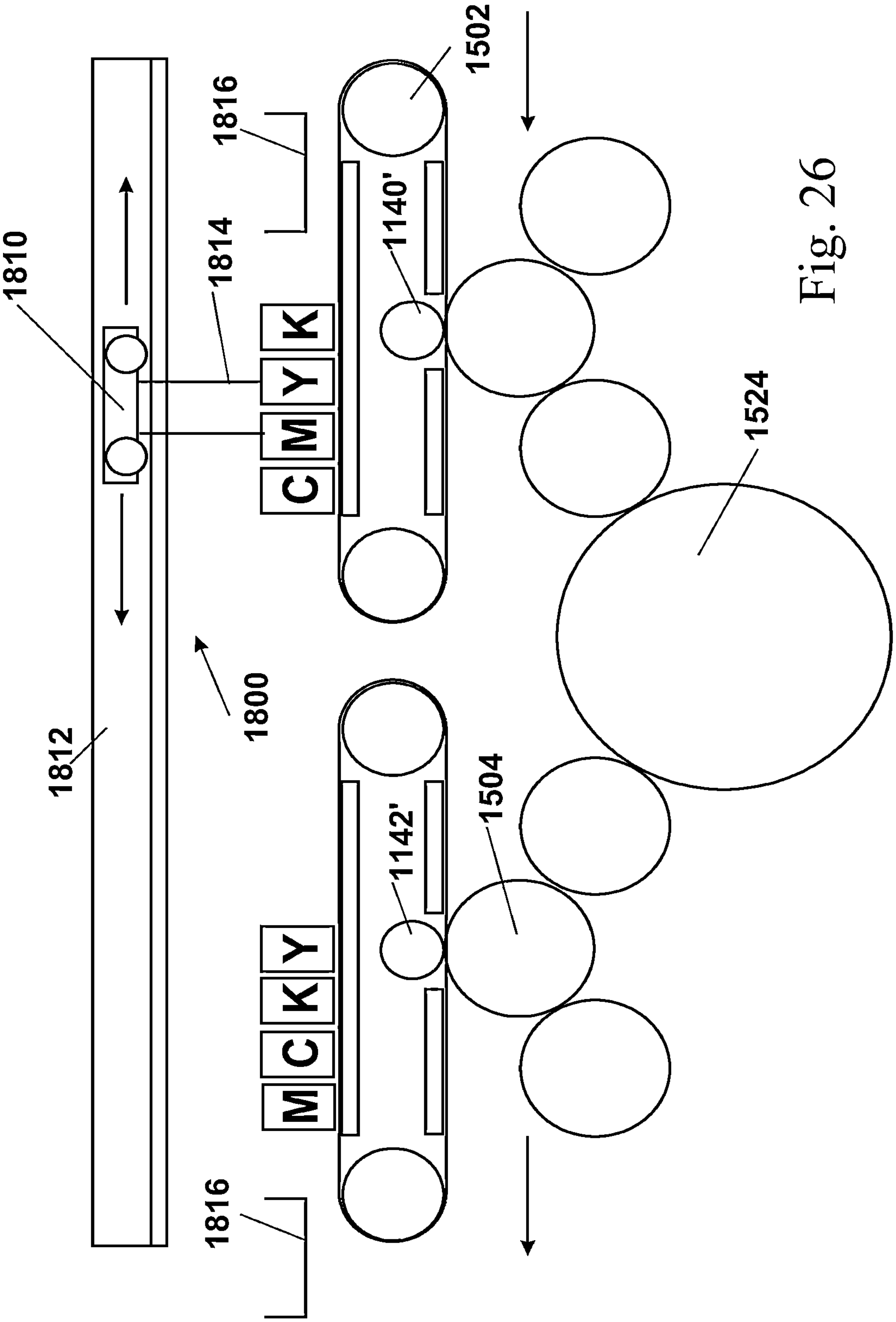
FIG. 26 is a schematic representation of a fourth embodiment of the invention, generally similar to the embodiment of FIG. 24, save that the intermediate transfer member is constructed as a blanket instead of a drum and an automated print bar positioning system is provided.

Discussion of FIGS. 24 to 26

Figure 21:
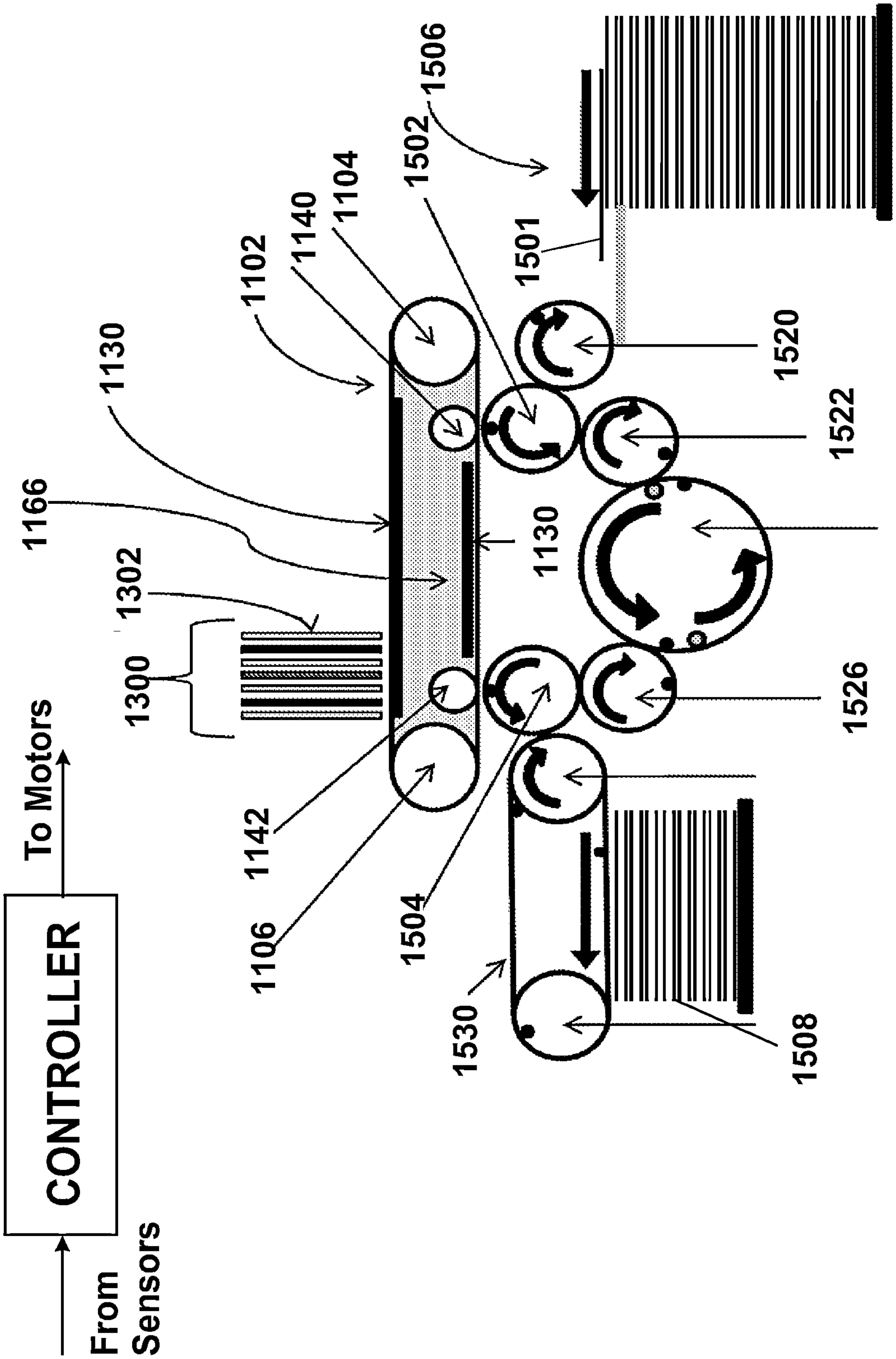
FIG. 21 is a schematic vertical section through the printing system of FIG. 20, in which the various components of the printing system are not drawn to scale.
Figure 22:
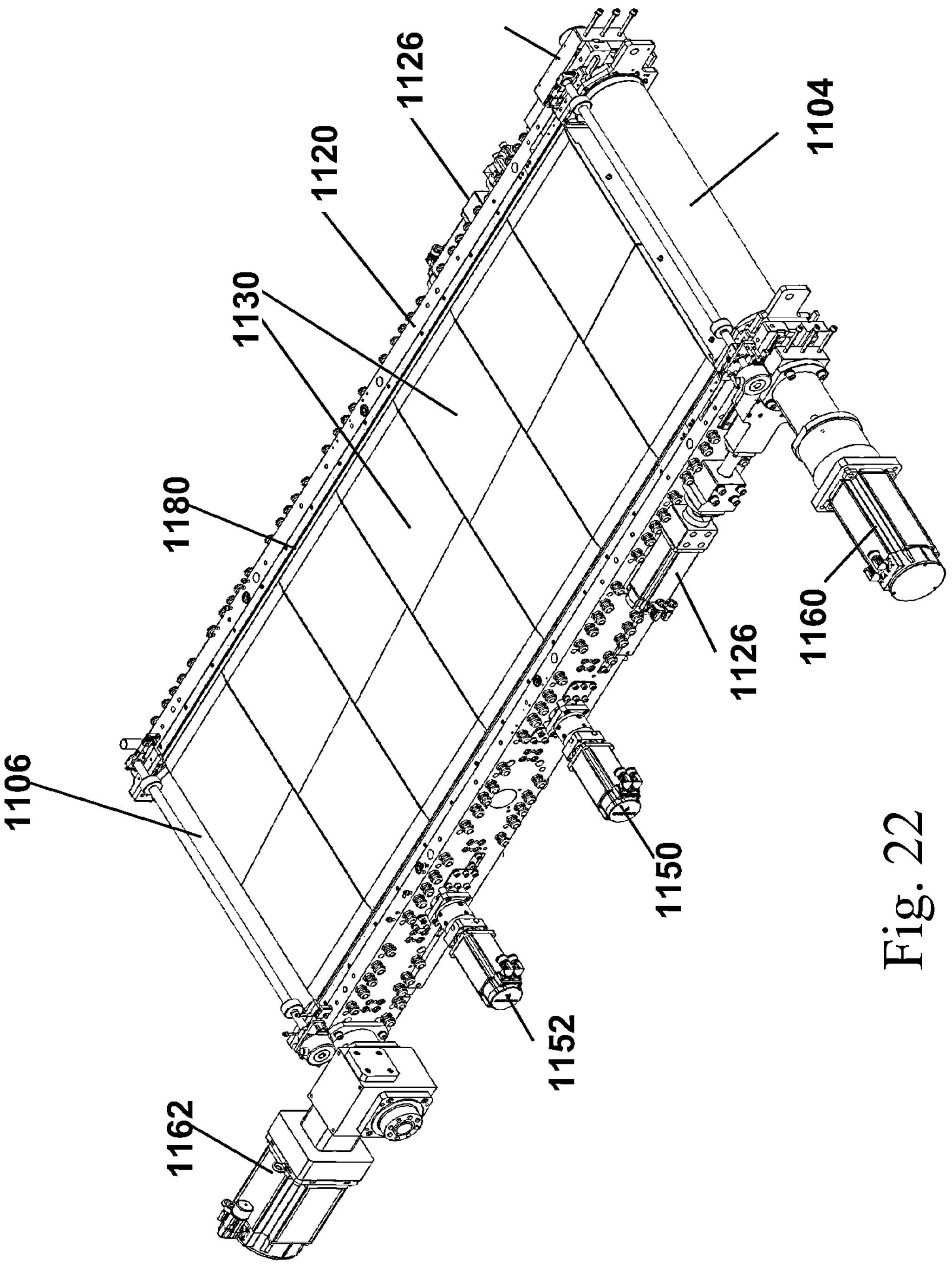
FIG. 22 is a perspective view of a blanket support system of FIGS. 20 and 21 with the blanket removed.
Figure 23:
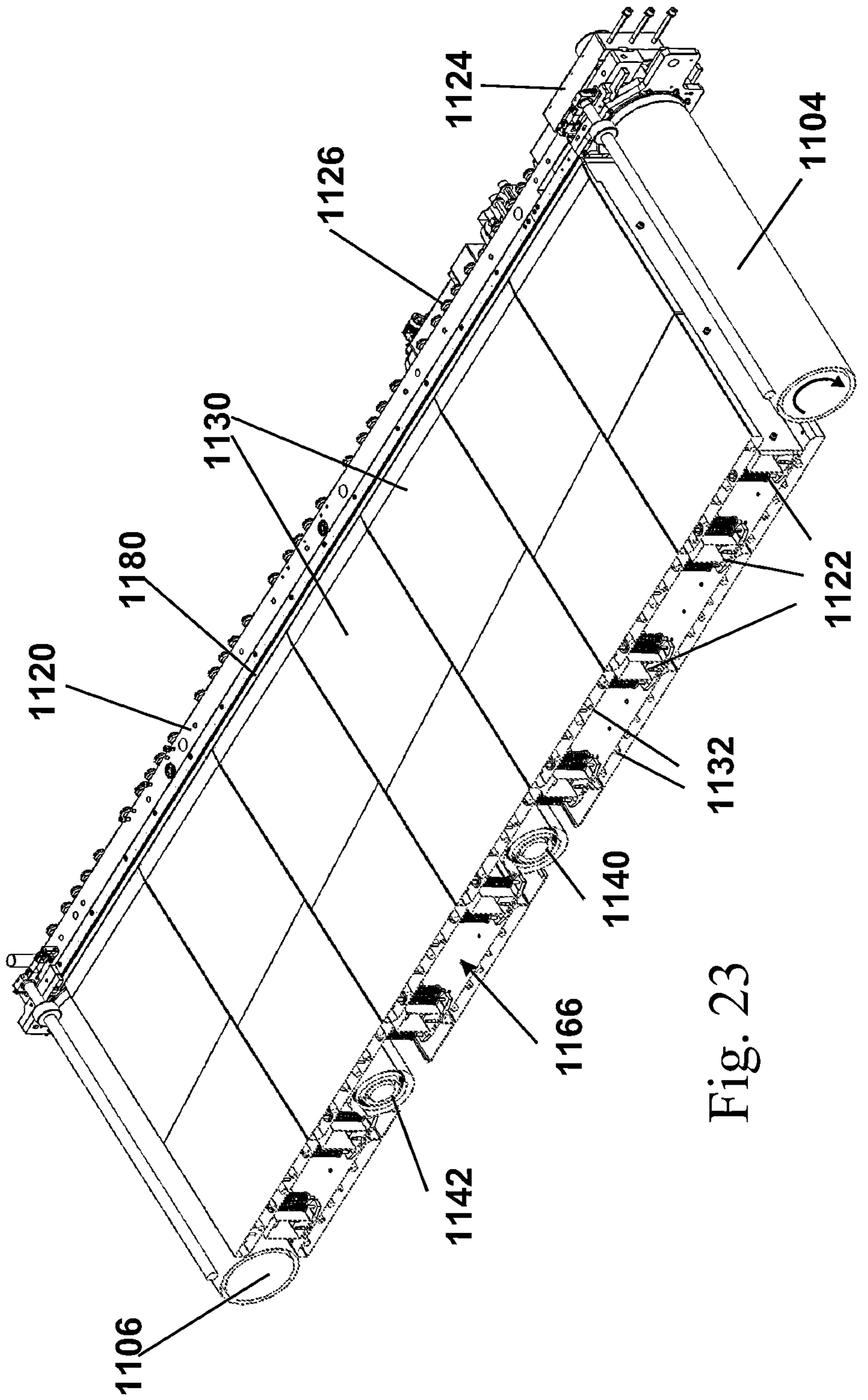
FIG. 23 shows a section through the blanket support system of FIG. 22 showing its internal construction.

Referring now to the embodiment of the invention shown in FIGS. 9 and 10, it will be seen that the substrate transport system is essentially the same as already described by reference to FIG. 21 and the same reference numerals have been used in order to avoid repetition of their description.

The ensuing description of the embodiment of FIGS. 9 and 10 will concentrate on the features that differ from what has previously been taught in U.S. Provisional Patent Application No. 61/606,913 and described above by reference to FIGS. 20 to 23.

The printing system comprises two printing towers 1702 and 1704. The tower 1702 comprises an image transfer drum 1706, an image forming system 1708 including four print bars (it can have more), a heating station 1710 following the image forming system 1708 in the direction of rotation of the drum 1706 and a pre-treatment station 1712 preceding the image forming system 1708, the pre-treatment being optional. In addition to external heating station 1710, the drum 1706 may be internally heated. The drum, which may be internally heated, carries a blanket of which the water impervious outer surface is optionally pre-treated in the pre-treatment station 1712 before it arrives at the image forming system 1708. The image forming system 1708 forms an image made up of ink droplets on the surface of the blanket. The image is dried and rendered tacky as it travels around the axis of the drum 1706 to form a thin residue film that is impressed onto a sheet substrate passing between the drum 1706 and the impression cylinder 1502.

Other than the blanket being wrapped around a drum 1706, instead of being guided over rollers, and interacting with only one impression cylinder 1502 instead of two, the printing system operates in the same way as already described with reference to FIGS. 20 to 23. In the light of the preceding description of FIGS. 20 to 23, it is believed that the construction and operation of the embodiment of the invention in FIGS. 9 and 10 will be self-evident and in no need of detailed explanation. In particular, the function served by the optional pre-treatment station 1712, the blanket surrounding the drum 1706 and the heating station 1710 and their construction are essentially as earlier described and further detailed in the referenced PCT Applications.

The use of a drum in place of guide rollers to support the blanket simplifies the control system as the blanket is not prone to stretching and the large moment of inertia of the drum reduces fluctuations in speed. The exact determination of the position of the blanket therefore requires fewer sensors and these may take the form of shaft encoders and/or sensors detecting one or more markings on the surface of the blanket.

In the illustrated configuration of the print bars in FIG. 24, the tower 1702 prints an image in full color onto one side of each substrate sheet. Each substrate sheet is then flipped over by the perfecting cylinder 1524, enabling a second image to be printed on its reverse side by the second tower 1704.

In the configuration shown in FIG. 25, each of the towers is configured to print a partial image comprising only two of the four required color separations. Thus, the tower 1702 printing only the Key (black) and Cyan color separations while the tower 1704 prints in the Magenta and Yellow color separations. The printing of the two towers is synchronized, as is known from offset lithography, so that the two partial images are in correct register with one another.

When operating in this manner, any tower serving to print only selected separations of an image, may include a plurality of print bars of the same color circumferentially spaced from one another along the image transfer surface. As each printing bar is limited as to the frequency with which it can direct ink droplets onto the intermediate transfer member, increasing the number of print bars of the same color permits a printing tower to operate at a higher speed while maintaining the same dot density in the image.

It would in principle be possible when operating in high speed simplex mode, for each tower to continue to print a full color partial image. However, achieving registration of dots of the same color printed by different towers is more difficult than registration of dots of different colors. It is therefore preferred when operating in simplex mode, to print each color separation using only one tower, so that for four color printing two colors are printed by the first tower and the other two by the second tower.

It will be noted that in FIG. 24, the order of the print bars in tower 1702 (CMYK) is different from the order in tower 1704 (MCKY). In particular, in each tower the colors of the two inner print bars match the colors of the two outer print bars of the other tower. The reason for this is that a changeover from perfecting mode to high speed simplex mode can be carried out interchanging only the inner pairs of print bars of the two towers, as represented by the arrows in FIG. 25.

The embodiment of FIG. 26 is generally similar to that of FIG. 25 save that the blanket, in common with the printing press shown in FIGS. 20 to 23, is guided around rollers instead of being wrapped around a drum. Each tower is therefore constructed in the same manner as described by reference to FIGS. 20 to 23, save that the blanket support system of each tower has only one pressure nip or roller 1140' or 1142'. In the case of the printing system described in FIGS. 20 to 23, the pressure rollers 1140, 1142 need to be disengageable from their impression cylinders to allow a film residue image intended for the second impression cylinder 1504 to pass unchanged over the first impression cylinder 1502. In the case of the embodiment of the invention in FIG. 26, as the two images are transported by different blankets, it is not essential for the nip rollers 1140', 1142' to be disengageable from their respective impression cylinders, though permitting movement of the nip rollers may be desirable to assist in allowing a belt seam to pass through the nip.

FIG. 26 also shows schematically an automated print bar positioning system 1800 that may be used to simplify changeover between the duplex and simplex modes. The system 1800 comprises a motorized carriage 1810 guided by rails 1812 and having lifting arms 1814 for raising printing bars and transferring them between towers. At least one parking station 1816 is also provided (two are shown in FIG. 26) for temporarily holding the print bars during the course of a changeover. Thus to convert from the illustrated CMYK, MCKY configuration to a CCKK, MMYY configuration, the carriage 1810 would first raise the MY print bars from the first tower and place them in a parking station 1816. Next the CK print bars would be raised from the second tower and transferred to the vacant intermediate positions in the first tower (hence forming a CCKK array). Finally, the MY print bars are transferred from the parking station 1816 to occupy the now vacant intermediate positions in the second tower (hence forming a MMYY array).

The contents of all of the above mentioned applications of the Applicant are incorporated by reference as if fully set forth herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the present disclosure has been described with respect to various specific embodiments presented thereof for the sake of illustration only, such specifically disclosed embodiments should not be considered limiting. Many other alternatives, modifications and variations of such embodiments will occur to those skilled in the art based upon Applicant's disclosure herein. Accordingly, it is intended to embrace all such alternatives, modifications and variations and to be bound only by the spirit and scope of the appended claims and any change which come within their meaning and range of equivalency.

In the description and claims of the present disclosure, each of the verbs "comprise", "include" and "have", and conjugates thereof, are used to indicate that the object or objects of the verb are not necessarily a complete listing of features, members, steps, components, elements or parts of the subject or subjects of the verb.

As used herein, the singular form "a", "an" and "the" include plural references and mean "at least one" or "one or more" unless the context clearly dictates otherwise.

Unless otherwise stated, the use of the expression "and/or" between the last two members of a list of options for selection indicates that a selection of one or more of the listed options is appropriate and may be made.

Unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

To the extent necessary to understand or complete the present disclosure, all publications, patents, and patent applications mentioned herein, including in particular the applications of the Applicant, are expressly incorporated by reference in their entirety by reference as is fully set forth herein.

While the invention has been described above by reference to printing on substrate sheets, it will be clear to the person skilled in the art that the invention is equally applicable to a printing system that prints on a continuous web. In this case, a web reversing mechanism may be used in place of the perfecting cylinder and once again the length of the web between the two impression stations needs to adjust, for example by the use of idler rollers, to correspond to the spacing of the front and reverse ink images on the belt.

In the description and claims of the present disclosure, each of the verbs "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "an impression station" may include more than one such station.

The invention claimed is:

1. A method of operating a printing system to print on substrate sheets, the printing system comprising a transport system for transporting the substrate sheets, the transport system comprising a perfecting system formed of transport cylinders and a perfecting cylinder each having grippers to grip edges of individual substrate sheets, the method comprising:

- depositing droplets of an ink onto an outer surface of a guided belt to form a series of an ink images thereon,
- drying the ink images on the belt to leave, for each ink image of the series of ink images, a respective ink residue film on the outer surface of the belt,
- operating first and second impression stations of the printing system to transfer the ink residue films to the substrate sheets such that some of the ink residue films are transferred from the belt outer surface at the first impression station and others of the ink residue films are transferred from the belt outer surface at the second impression station, each impression station having an impression cylinder for supporting the substrate sheets during the respective transfers thereto of the ink residue films;
- transporting the substrate sheets, by the transport system from the first impression station to the second impression station,
- operating the perfecting system to selectively invert the transported substrate sheets during transport between the first and second impression stations,
- wherein a phasing of the grippers during the operating of the perfecting system is such that a length of the path followed by the trailing edges of the substrate sheets through the perfecting system is a multiple of the circumference of the impression cylinder plus the offset between the first reserve ink images on the belt.

2. A method as claimed in claim 1, wherein, a lifting mechanism is provided to lower the pressure cylinder into the first position and to raise the pressure cylinder for into the second position.

3. A method as claimed in claim 2, wherein the lifting mechanism comprises eccentrics supporting opposite ends of an axle of the pressure cylinder and a motor for rotating the eccentrics to raise and the lower the pressure cylinder.

4. A method as claimed in claim 1, wherein a pressure cylinder carrying a blanket is present in each impression station, and wherein the blanket extends only partially around the circumference of the pressure cylinder to leave a gap between the ends of the blanket, the pressure cylinder being rotatable from the first position in which the blanket is aligned with and urged towards the impression cylinder and the second position in which the gap between the ends of the blanket is aligned with the impression cylinder.

5. A method as claimed in claim 4, wherein the length of the blanket is equal to or greater than the maximum size of ink images formed on the intermediate transfer member.

6. A method as claimed in claim 4, wherein the blanket of each impression station extends over less than half of the circumference of the pressure cylinder.

7. A method as claimed in claim 1, wherein the belt is provided with formations along its lateral edges engageable in channels to guide the belt and maintain the belt in lateral tension.

8. A method as claimed in claim 1, wherein a pressure cylinder carrying a blanket is present in the first impression station, such that: (i) when the pressure cylinder is disposed in a first position, the belt is urged towards the impression cylinder to effect transfer of the ink residue films to substrate sheets that are supported by the impression cylinder and (ii) when the pressure cylinder is disposed in a second position in which the belt is spaced from the impression cylinder, ink residue films present on the belt pass through the first impression station and arrive in tact at the second impression station.

9. The method of claim 8 wherein the blanket is compressible.

10. The method of claim 9 wherein: (i) the belt is thin belt whose compressible layer has a thickness of at most 400 micrometers; and (ii) a thickness of the compressible blanket is at least 1 mm.

11. The method of claim 8 wherein the blanket is both compressible and continuous.

12. The method of claim 1 wherein a pressure cylinder carrying a compressible and continuous blanket is present at the first impression station and the transfers of ink residue films at the first impression station is performed by pressured contact between the pressure cylinder and the impression cylinder via the blanket and substrate sheets present at the first impression station.

13. The method of claim 11 wherein a pressure cylinder carrying a compressible and continuous blanket is present at the second impression station and the transfers of ink residue films at the second impression station is performed by pressured contact between the pressure cylinder and the impression cylinder via the blanket and substrate sheets present at the second impression station.

14. The method of claim 1, wherein one or more gripper(s) are disposed at the second impression station, and wherein the relative phases of the impression cylinders of the first and second impression stations are controlled so that the gripper(s) at the second impression station coincide with an edge of the inverted substrate.

15. The m method of claim 1, further comprising apply a treatment agent comprising polyethylenimine (PEI) onto the outer surface of the belt after the belt outer surface passes through the impression stations, thereby pre-treating the belt outer surface before subsequent formation thereon of ink images.

* * * * *